United States Patent
Prigge

(10) Patent No.: US 8,429,597 B2
(45) Date of Patent: Apr. 23, 2013

(54) SOFTWARE FOR INTEGRATED MODELING OF USER INTERFACES WITH APPLICATIONS

(75) Inventor: Uta Prigge, Redwood City, CA (US)

(73) Assignee: SAP AG, Walldorf (DE)

( * ) Notice: Subject to any disclaimer, the term of this patent is extended or adjusted under 35 U.S.C. 154(b) by 928 days.

(21) Appl. No.: 12/276,135

(22) Filed: Nov. 21, 2008

(65) Prior Publication Data

US 2010/0131857 A1 May 27, 2010

(51) Int. Cl.
*G06F 9/44* (2006.01)
*G06F 3/048* (2006.01)

(52) U.S. Cl.
USPC .......................................... 717/104; 715/771

(58) Field of Classification Search .................. None
See application file for complete search history.

(56) References Cited

U.S. PATENT DOCUMENTS

| | | | |
|---|---|---|---|
| 5,754,857 A | 5/1998 | Gadol | |
| 6,934,931 B2 * | 8/2005 | Plumer et al. | 717/104 |
| 7,007,029 B1 * | 2/2006 | Chen | 717/104 |
| 7,171,647 B1 * | 1/2007 | Smith et al. | 717/104 |
| 7,233,952 B1 * | 6/2007 | Chen | 717/104 |
| 7,320,001 B1 * | 1/2008 | Chen | 717/104 |
| 7,404,176 B2 | 7/2008 | Reeder et al. | |
| 7,424,602 B2 | 9/2008 | Reiss et al. | |
| 7,454,399 B2 | 11/2008 | Matichuk | |
| 7,577,934 B2 * | 8/2009 | Anonsen et al. | 717/104 |
| 7,784,025 B2 * | 8/2010 | Challapalli et al. | 717/104 |
| 2003/0078008 A1 | 4/2003 | Gruhn et al. | |
| 2004/0181775 A1 * | 9/2004 | Anonsen et al. | 717/104 |
| 2007/0033571 A1 * | 2/2007 | Moore et al. | 717/104 |
| 2007/0156430 A1 | 7/2007 | Kaetker et al. | |
| 2007/0156475 A1 | 7/2007 | Berger et al. | |
| 2007/0156476 A1 | 7/2007 | Koegler et al. | |
| 2007/0156489 A1 | 7/2007 | Berger et al. | |
| 2007/0156490 A1 | 7/2007 | Faisst et al. | |
| 2007/0156493 A1 | 7/2007 | Tebbe et al. | |
| 2007/0156500 A1 | 7/2007 | Merkel et al. | |
| 2007/0156538 A1 | 7/2007 | Peter et al. | |
| 2007/0156550 A1 | 7/2007 | Von der Emde et al. | |
| 2007/0157170 A1 | 7/2007 | Reiss et al. | |
| 2007/0162893 A1 | 7/2007 | Moosmann et al. | |
| 2007/0168240 A1 | 7/2007 | Alfandary et al. | |
| 2007/0168303 A1 | 7/2007 | Moosmann et al. | |

(Continued)

OTHER PUBLICATIONS

SAP AG et al., PP—Work Centers, Apr. 2001, Release 4.6C, [Retrieved on Feb. 28, 2012]. Retrieved from the internet: <URL: http://help.sap.com/printdocu/core/print46c/en/data/pdf/PPBDWKC/PPBDWKC.pdf> pp. 1-146.*

(Continued)

*Primary Examiner* — Don Wong
*Assistant Examiner* — Anibal Rivera
(74) *Attorney, Agent, or Firm* — Fish & Richardson P.C.

(57) ABSTRACT

This disclosure provides various embodiments of software for providing a user interface (UI) model. In one aspect, the software identifies one or more components associated with a particular work center. The software then collects modeling information from the one or more components identified as being associated with the particular work center, and integrates the collected modeling information into a UI model associated with the particular work center. In some instances, the particular work center may be associated with or defined by a corresponding work center model illustrating the particular work center's UI layout, including at least a portion of components associated with the particular work center.

25 Claims, 22 Drawing Sheets

U.S. PATENT DOCUMENTS

| | | | |
|---|---|---|---|
| 2007/0174068 A1 | 7/2007 | Alfandary et al. | |
| 2007/0174811 A1 | 7/2007 | Kaetker et al. | |
| 2007/0186209 A1 | 8/2007 | Kaetker et al. | |
| 2007/0220046 A1 | 9/2007 | Moosmann et al. | |
| 2007/0233539 A1 | 10/2007 | Suenderhauf et al. | |
| 2007/0233581 A1 | 10/2007 | Peter | |
| 2007/0234282 A1 | 10/2007 | Prigge et al. | |
| 2007/0265814 A1* | 11/2007 | Moore et al. | 703/10 |
| 2007/0265862 A1 | 11/2007 | Freund et al. | |
| 2007/0266366 A1* | 11/2007 | Bucuvalas | 717/104 |
| 2008/0004856 A1 | 1/2008 | Avitzur et al. | |
| 2008/0028084 A1* | 1/2008 | Bloching et al. | 709/229 |
| 2008/0028328 A1* | 1/2008 | Hoizal et al. | 715/763 |
| 2008/0071839 A1 | 3/2008 | Sattler et al. | |
| 2008/0120593 A1 | 5/2008 | Keren et al. | |
| 2008/0126110 A1 | 5/2008 | Haeberle et al. | |
| 2008/0133299 A1 | 6/2008 | Sitarski | |
| 2008/0133303 A1* | 6/2008 | Singh et al. | 705/8 |
| 2008/0275713 A9 | 11/2008 | Alfandary et al. | |
| 2008/0301625 A1* | 12/2008 | Cook et al. | 717/104 |
| 2009/0006150 A1 | 1/2009 | Prigget et al. | |
| 2009/0007056 A1 | 1/2009 | Prigget et al. | |
| 2010/0070318 A1 | 3/2010 | Clemens et al. | |
| 2010/0070337 A1 | 3/2010 | Poth et al. | |
| 2010/0070555 A1 | 3/2010 | Duparc et al. | |
| 2010/0131916 A1 | 5/2010 | Prigge | |
| 2010/0153149 A1 | 6/2010 | Prigge et al. | |
| 2010/0153150 A1 | 6/2010 | Prigge et al. | |
| 2010/0153468 A1 | 6/2010 | Lange et al. | |

OTHER PUBLICATIONS

Piyawadee Sukaviriya et al., A Second Generation User Interface Design Environment: The Model and the Runtime Architecture, 1993, [Retrieved on Aug. 4, 2012]. Retrieved from the internet: <URL: http://dl.acm.org/citation.cfm?id=169299> 8 Pages (375-382).*

Paulo Pinheiro de Silva, User Interface Declarative Models and Development Environments: A Survey, 2001, [Retrieved on Aug. 4, 2012]. Retrieved from the internet: <URL: http://www.springerlink.com/content/6q0n3xw31deutjac/fulltext.pdf> 20 Pages (207-226).*

Office Action issued in U.S. Appl. No. 12/276,158 on Aug. 18, 2011; 20 pages.

Office Action issued in U.S. Appl. No. 12/333,874 on Aug. 15, 2011; 16 pages.

Office Action issued in U.S. Appl. No. 12/276,158 on Nov. 28, 2011; 21 pages.

Office Action issued in U.S. Appl. No. 12/333,944 on Mar. 15, 2012; 12 pages.

* cited by examiner

SOFTWARE FOR INTEGRATED MODELING OF USER INTERFACES WITH APPLICATIONS

TECHNICAL FIELD

The present disclosure relates to methods and software for software modeling, and, more particularly, to methods and software for modeling a common user interface landscape.

BACKGROUND

Enterprise software systems are generally large and complex. Such systems can require many different components, distributed across many different hardware platforms, possibly in several different geographical locations. In order to design, configure, update or implement an enterprise software system, one is generally required to understand details of the system at varying levels, depending on his role in designing, managing or implementing the system. For example, a systems administrator may need a high-level technical understanding of how various software modules are installed on physical hardware, such as a server device or a network, and how those software modules interact with other software modules in the system. A person responsible for configuring the software may utilize a high-level functional understanding of the operations that each functional component provides. An application designer may utilize a low-level technical understanding of the various software interfaces that portions of the application require or implement. And an application developer may utilize a detailed understanding of the interfaces and functionality he is implementing in relation to the remainder of the system. But the flow of a business process within an application today is typically hidden from a user. In some cases, it is possible to manually create a textual or graphical documentation of this process flow. However, this documentation is typically not detailed enough and can become quickly outdated since its consistency with the actual application software is not (initially) verified or maintained automatically.

Within a development environment, an application can be developed using modeling systems. In general, these models can specify the types of development objects or components that can be used to build applications, as well as the relationships that can be used to connect those components. In an object-oriented architecture, for example, a defined application can include a combination of various data objects and resources (i.e., development objects). In that example, relationships among the development objects can include a relationship indicating that one data object inherits characteristics from another data object. Another example architecture is the model-view-controller (MVC) architecture. Applications built using the MVC architecture typically include three different types of components—models, which store data such as application data; views, which display information from one or more models; and controllers, which can relate views to models, for example, by receiving events (e.g., events raised by user interaction with one or more views) and invoking corresponding changes in one or more models. When changes occur in a model, the model can update its views. Data binding can be used for data transport between a view and its associated model or controller. For example, a table view (or a table including cells that are organized in rows and columns) can be bound to a corresponding table in a model or controller. Such a binding indicates that the table is to serve as the data source for the table view and, consequently, that the table view is to display data from the table. Continuing with this example, the table view can be replaced by another view, such as a graph view. If the graph view is bound to the same table, the graph view can display the data from the table without requiring any changes to the model or controller. In the MVC architecture, development objects can include models, views, controllers, and components that make up the models, views, and controllers. For example, application data in a model can be an example of a component that is a development object.

To graphically model an application such that a combination of abstract, graphical representations represent the components of the application and the relationships between those components, a developer typically uses a drawing tool, such as Microsoft Visio, that provides abstract representations and tools for manipulating and/or generating abstract representations. For example, a user of the drawing tool (such as a developer) can choose to use a circle (or any other suitable abstract representation or model) to represent a class (such as a class defined in the C++ or other object-oriented programming language) of an application developed under the object-oriented architecture. The circle that represents a development object can include data from the development object. For example, a name of a class (i.e., data from a development object) can be entered in a text box that is part of the circle, and that name can be displayed in the center of the circle. In addition to drawing tools, the developer can also use other graphical tools to generate graphical representations and models (e.g., Unified Modeling Language (UML) diagrams or Business Process Execution Languages (BPEL)) from application code or vice versa.

SUMMARY

This disclosure provides various embodiments of software for providing a user interface (UI) model. In one aspect, the software identifies one or more components associated with a particular work center. The software then collects modeling information from the one or more components identified as being associated with the particular work center, and integrates the collected modeling information into a UI model associated with the particular work center. In some instances, the particular work center may be associated with or defined by a corresponding work center model illustrating the particular work center's UI layout, including at least a portion of components associated with the particular work center.

Specifically, this disclosure provides various embodiments of software for providing a user interface (UI) model that can be stored in a modeling environment, the modeling environment being connected, for example, to monitoring and/or information development systems. The UI model can illustrate or one or more of the primary UIs associated with a particular product, how those UIs are composed, as well as one or more navigation possibilities between the primary (as well as secondary) UIs. Additionally, the UI model can provide an understanding of the various models association with other models, as well as individual models' association with underlying software entities, for example, business objects, web services, and user tasks. Further, the UI model shows various configurations and configuration controls can activate or deactivate certain UIs based on various user roles, software activities, or events within the overall system. Further, this subject matter of this disclosure can be used by backend and UI developers to clearly understand how the functionality they are providing is used with respect to the underlying business model, by UI designers to define particular UI navigations, for developers and customers wanting to build new UIs, for extending currently-existing UIs, and for providing a holistic overview of a particular software product based on the combination of UI entities, business model entities, and configuration entities. Additionally, the subject matter of this disclosure can be used by support personnel to understand the effects of changes to a business model, UI model, or configuration model associated with the system. In other words, this disclosure can be used for operations within a large company, such that when a functionality must be changed, the correct resources for the business model, UI models, and configuration models can be automatically assigned, and the status of any such changes can be tracked.

While generally described as computer implemented software that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
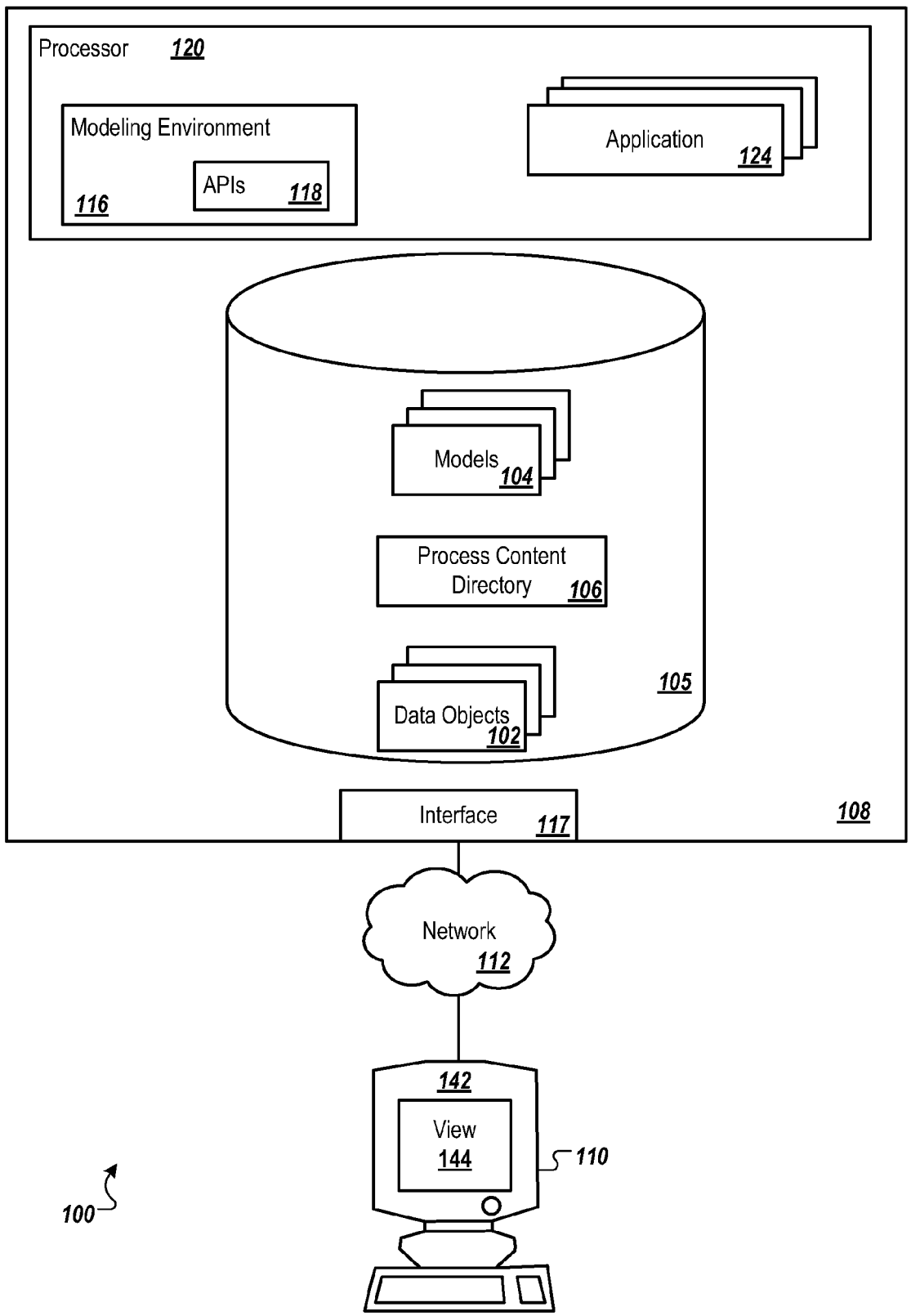
FIG. 1 illustrates an example system for producing a user interface model in accordance with one embodiment of the present disclosure.

This disclosure generally describes an example environment 100 for creating and navigating through a user interface (UI) modeling landscape comprising a plurality of models representing various functionality and structures of an enterprise system. At a high level, the model is a representation of a software system, part of a software system, or an aspect of a software system. The model can be associated with one or more views. A view of the model represents a subset of the information in the model. For purposes of discussion, the term "model" will be used to refer to both the model and a view of the model. The model, such as illustrated model 104, can be used in a software development process to describe or specify a software application, or parts or aspects of a software application, for developers implementing or modifying the application. The model specifies the design to a useful level of detail or granularity. In this way, a compliant implementation or deployment of the modeled functionality can conform to the specification represented by the model. For example, the model may represent a sequence of steps, executed to achieve a business result. According to the particular design, each step can result in the change of state of a business object. Business processes can be part of, triggered by, and superior to other business processes. Business processes can be modeled in a hierarchy. As described herein, the business process hierarchy includes a requirements definition, design specification, and implementation description level, but other ways of defining a business process or other view hierarchy are possible. Thus, the models described herein can be written in description notations appropriate for process modeling. As described in more detail below, the model may include any number of logical layers, each of which include one or more domains and represent a logical category of modeling such as high level business views, system independent process views, and implementation views. Each layer may be considered a sub-model or a model in its own right that can be bound with other layers/models. Moreover, each logical layer can—in some cases—be bound with a plurality of lower layers, such as one system independent process view being bound to a number of disparate, but similar, implementation views. Often, the domains in one layer substantially match the domains in other bound layers.

In this disclosure, techniques are provided to generate and modify (in some instances, automatically) one or more UI integration models that collect and integrate information from one or more defined models associated with one or more components. One advantage of the UI integration model is that development errors can be reduced due to the information from various models being presented in a single, common location—the UI integration model. For instance, changes to one model can be seen in and reflected by the UI integration model, allowing the developers and users of separate portions of a modeled application to quickly understand the effect a change in one portion of the application may have in another. Additionally, modifications to the application reflected in the UI integration model can be understood and acted upon prior to or without performing resource-heavy testing of the modeled application. Further, this disclosure provides techniques for generating and modifying one or more business task models that can describe one or more tasks performed by and associated with particular UI models and UI entities, as well as those tasks' connections to other entities within a particular modeling environment. The business task model allows developers and users to extend existing tasks and/or create new tasks for interacting with or performing certain operations defined in the application. Both techniques described herein can be used to provide a clear and transparent understanding of the operations of a particular modeled application such that developers, as well as technical and business users alike, are able to view, modify, and understand the details of a modeled application without the need for detailed written documentation on the various operations and interactions of the modeled application. Further, changes to one or more portions of the modeled application can be understood and illustrated within the modeled environment through intuitive use of the modeling tools and connections represented in the UI landscape. Still further, information defining the models can be exported to a documentation system, allowing documentation explaining or describing the models to be generated automatically or with minimal developer or user interaction.

With respect to example FIG. 1, environment 100 is typically a distributed client/server system that spans one or more networks such as 112. As described above, rather than being delivered as packaged software, portions of environment 100 may represent a hosted solution, often for an enterprise or other small business, that may scale cost-effectively and help drive faster adoption. In this case, portions of the hosted solution may be developed by a first entity, while other components are developed by a second entity. Moreover, the processes or activities of the hosted solution may be distributed amongst these entities and their respective components. In some embodiments, environment 100 may be in a dedicated enterprise environment—across a local area network or subnet—or any other suitable environment without departing from the scope of this disclosure.

Turning to the illustrated embodiment, environment 100 includes or is communicably coupled with server 108 and one or more clients 110, at least some of which communicate across network 112. Server 108 comprises an electronic computing device operable to receive, transmit, process and store data associated with environment 100. For example, server 108 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). But, more generally, FIG. 1 provides merely one example of computers that may be used with the disclosure. Each computer is generally intended to encompass any suitable processing device. For example, although FIG. 1 illustrates one server 108 that may be used with the disclosure, environment 100 can be implemented using computers other than servers, as well as a server pool. Indeed, server 108 may be any computer or processing device such as, for example, a blade server, general-purpose personal computer (PC), Macintosh, workstation, Unix-based computer, or any other suitable device. In other words, the present disclosure contemplates computers other than general purpose computers, as well as computers without conventional operating systems. Server 108 may be adapted to execute any operating system including Linux, UNIX, Windows Server, or any other suitable operating system. According to one embodiment, server 108 may also include or be communicably coupled with a web server and/or a mail server.

Illustrated server 108 includes example processor 120. Although FIG. 1 illustrates a single processor 120 in server 108, two or more processors may be used according to particular needs, desires, or particular embodiments of environment 100. Each processor 120 may be a central processing unit (CPU), a blade, an application specific integrated circuit (ASIC), or a field-programmable gate array (FPGA). The processor 120 may execute instructions and manipulate data to perform the operations of server 108, often using software. Regardless of the particular implementation, "software" may include computer-readable instructions, firmware, wired or programmed hardware, or any combination thereof on tangible medium as appropriate. Indeed, each software component may be fully or partially written or described in any appropriate computer language including C, C++, Java, Visual Basic, assembler, Perl, any suitable version of 4GL, as well as others. It will be understood that while the software illustrated in FIG. 1 is shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

In the illustrated embodiment, processor 120 executes model-driven development tool (or environment) 116 and modeled business application 124. At a high level, the modeling environment 116 and application 124 are operable to receive and/or process requests from developers and/or users and present at least a subset of the results to the particular user via an interface.

The GUI modeling environment 116 may be or implement any development tool, toolkit, application programming interface (API), application, or other framework that allows a developer to develop, configure, and utilize various business elements that can be more easily modeled during modeling (or during design time) of a particular business application. For example, the model-driven framework or environment may allow the developer to use simple drag-and-drop techniques to develop pattern-based or freestyle user interfaces and define the flow of data between them. Such drag and drop techniques may include selecting, inputting, identifying, or some other indication that the developer is interested in a particular object or element. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding; in other words, the modeling environment can be used to create, modify, and examine the model.

Further, the modeling environment 116 may include or be coupled with a modeling API 118. The modeling API 118 may be any API exposing the functionality of the modeling environment 116, as well as the information and data associated with or defined in the modeling environment. The modeling API 118 can be used by one or more external applications or entities to access and read information associated with one or more models 104 defined by or in the modeling environment 116. Information defining or associated with the relationships between two or more models 104, various entities in a single model 104, or associated or linked entities located in multiple 104, can be retrieved and incorporated with newly created and/or previously-defined models.

In some cases, this example modeling environment 116 may provide a personalized, secure interface that helps unify enterprise applications, information, and processes into a coherent, role-based portal experience. Further, the modeling environment may allow the developer to access and share information and applications in a collaborative environment. In this way, virtual collaboration rooms allow developers to work together efficiently, regardless of where they are located, and may enable powerful and immediate communication that crosses organizational boundaries, while enforcing security requirements. Indeed, the modeling environment 116 may provide a shared set of services for finding, organizing, and accessing unstructured content stored in third-party repositories, and content management systems across various networks 112. Classification tools may automate the organization of information, while subject-matter experts and content managers can publish information to distinct user audiences. Regardless of the particular implementation or architecture, this modeling environment 116 may allow the developer to easily model various elements using this model-driven approach. As described in more detail later, the model is deployed, and environment 100 may translate the model into the required code or data structures for at least one application 124 or web service. This deployed business application 124 may then be modified or enhanced, as appropriate, using the modeling environment 116.

More specifically, application 124 may represent any modeled software or other portion of business functionality or logic. A first instance of application 124 may represent a first application that is .NET-based, while a second instance of application 124 may be a similar hosted web-based solution. In yet another example, application 124 may be a modeled composite application with any number of portions that may be implemented as Enterprise Java Beans (EJBs), or the design-time components may have the ability to generate run-time embodiments into different platforms such as J2EE, ABAP (Advanced Business Application Programming) objects, or Microsoft's .NET. In a further example, application 124 may merely be a modeled and published web service. Further, while illustrated as internal to server 108, one or more processes associated with modeling environment 116 or application 124 may be stored, referenced, or executed remotely. For example, a portion of an application may be a web service that is remotely called, while another portion of the application may be an interface object bundled for processing at remote client 110. Moreover, modeling environment 116 or application 124 may each be a child or submodule of other respective software modules or enterprise applications (not illustrated) without departing from the scope of this disclosure.

Figure 2A:
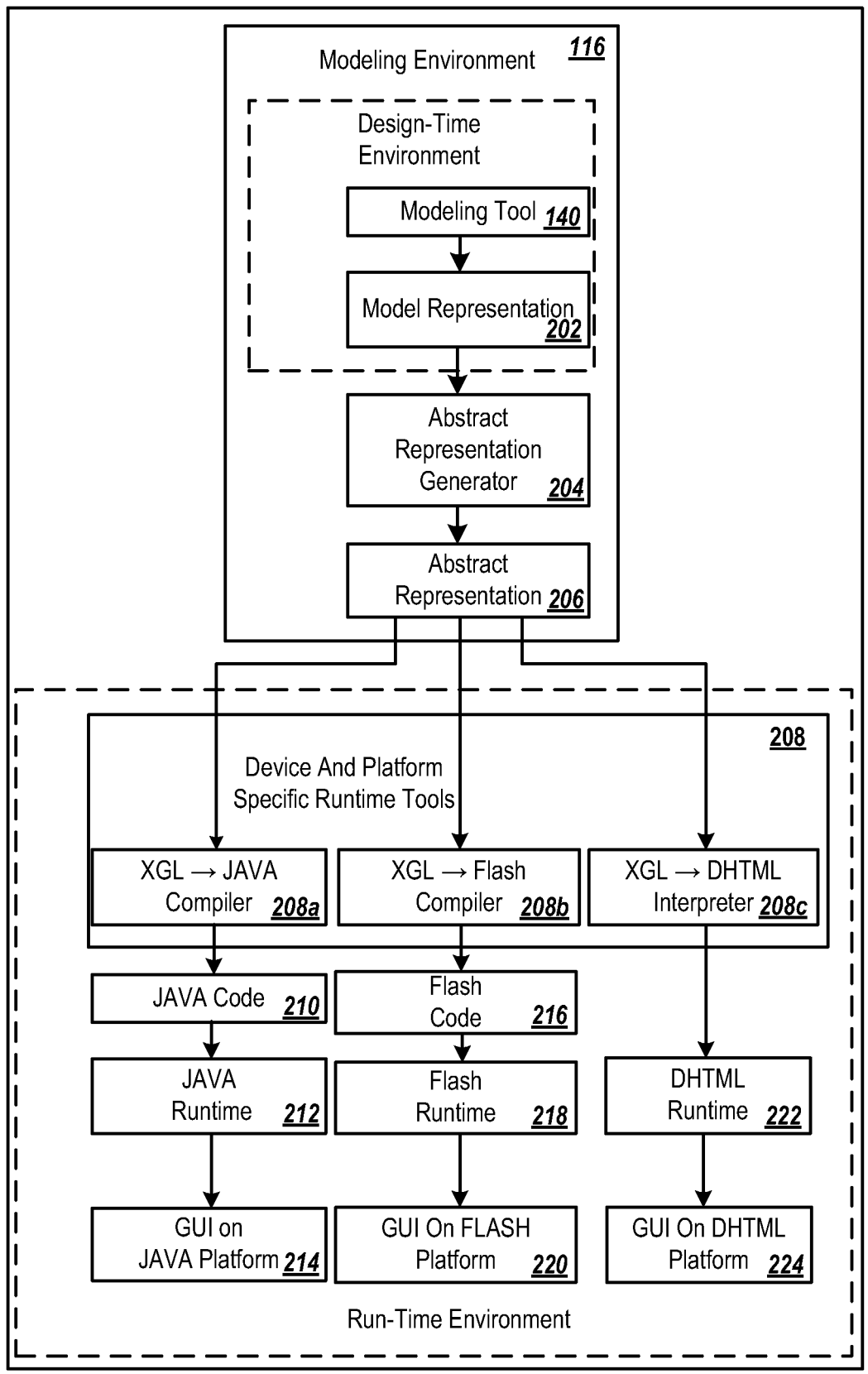
FIG. 2A depicts an example modeling environment in accordance with one embodiment of FIG. 1.

FIG. 2A depicts a more detailed example modeling environment 116, in accordance with one embodiment of the present disclosure. Such a modeling environment 116 may implement techniques for decoupling models created during design-time from the runtime environment. In other words, model representations for GUIs created in a design-time environment are decoupled from the runtime environment in which the GUIs are executed. Often, in these environments, a declarative and executable representation for GUIs for applications is provided that is independent of any particular runtime platform, GUI framework, device, or programming language.

In certain embodiments, the modeling environment 116 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and, therefore, can unambiguously encapsulate execution semantics for the GUI described by a model representation. In short, models of different types can be transformed to XGL representations.

The XGL representation may be used for generating representations of various different GUIs and supporting various GUI features, including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 2A, modeling tool 140 may be used by a GUI designer or business analyst during the application design phase to create a model representation 202 for a GUI application. It will be understood that modeling environment 116 may include or be compatible with various different modeling tools 140 used to generate model representation 202. This model representation 202 may be a machine-readable representation of an application or a domain specific model. Model representation 202 generally encapsulates various design parameters related to the GUI such as GUI components, dependencies between the GUI components, inputs and outputs, and the like. Put another way, model representation 202 provides a form in which the one or more models can be persisted and transported, and possibly handled by various tools such as code generators, runtime interpreters, analysis and validation tools, merge tools, and the like. In one embodiment, model representation 202 maybe a collection of XML documents with a well-formed syntax.

Illustrated modeling environment 116 also includes an abstract representation generator (or XGL generator) 204 operable to generate an abstract representation (for example, XGL representation or XGL-compliant representation) 206 based upon model representation 202. Abstract representation generator 204 takes model representation 202 as input and outputs abstract representation 206 for the model representation. Model representation 202 may include multiple instances of various forms or types, depending on the tool/language used for the modeling. In certain cases, these various different model representations may each be mapped to one or more abstract representations 206. Different types of model representations may be transformed or mapped to XGL representations. For each type of model representation, mapping rules may be provided for mapping the model representation to the XGL representation. 206. Different mapping rules may be provided for mapping a model representation to an XGL representation.

This XGL representation 206 that is created from a model representation may then be used for processing in the runtime environment. For example, the XGL representation 206 may be used to generate a machine-executable runtime GUI (or some other runtime representation) that may be executed by a target device. As part of the runtime processing, the XGL representation 206 may be transformed into one or more runtime representations, which may indicate source code in a particular programming language, machine-executable code for a specific runtime environment, executable GUI, and so forth, that may be generated for specific runtime environments and devices. Since the XGL representation 206, rather than the design-time model representation, is used by the runtime environment, the design-time model representation is decoupled from the runtime environment. The XGL representation 206 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 206 generated for a model representation 202 is generally declarative and executable in that it provides a representation of the GUI of model 202 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 206 is also not GUI runtime platform-specific. The abstract representation 206 provides a self-contained, closed, and deterministic definition of all aspects of a graphical user interface that is device independent and language independent.

Abstract representation 206 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), and the GUIs generated by the devices are consistent with each other in their appearance and behavior.

Abstract generator 204 may be configured to generate abstract representation 206 for models of different types, which may be created using different modeling tools 140. It will be understood that modeling environment 116 may include some, none, or other sub-modules or components as those shown in this example illustration. In other words, modeling environment 116 encompasses the design-time environment (with or without the abstract generator or the various representations), a modeling toolkit (such as 140) linked with a developer's space, or any other appropriate software operable to decouple models created during design-time from the runtime environment. Abstract representation 206 provides an interface between the design-time environment and the runtime environment. As shown, this abstract representation 206 may then be used by runtime processing.

As part of runtime processing, modeling environment 116 may include various runtime tools 208 and may generate different types of runtime representations based upon the abstract representation 206. Examples of runtime representations include device or language-dependent (or specific) source code, runtime platform-specific machine-readable code, GUIs for a particular target device, and the like. The runtime tools 208 may include compilers, interpreters, source code generators, and other such tools that are configured to generate runtime platform-specific or target device-specific runtime representations of abstract representation 206. The runtime tool 208 may generate the runtime representation from abstract representation 206 using specific rules that map abstract representation 206 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 206 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 2A, an XGL-to-Java compiler 208a may take abstract representation 206 as input and generate Java code 210 for execution by a target device comprising a Java runtime 212. Java runtime 212 may execute Java code 210 to generate or display a GUI 214 on a Java-platform target device. As another example, an XGL-to-Flash compiler 208b may take abstract representation 206 as input and generate Flash code 216 for execution by a target device comprising a Flash runtime 218. Flash runtime 218 may execute Flash code 216 to generate or display a GUI 220 on a target device comprising a Flash platform. As another example, an XGL-to-DHTML (dynamic HTML) interpreter 208c may take abstract representation 206 as input and generate DHTML statements (instructions) on the fly which are then interpreted by a DHTML runtime 222 to generate or display a GUI 224 on a target device comprising DHTML platform.

It should be apparent that abstract representation 206 may be used to generate GUIs for Extensible Application Markup Language (XAML) or various other runtime platforms and devices. The same model representation 206 may be mapped to various runtime representations and device-specific and runtime platform-specific GUIs. In general, in the runtime environment, machine executable instructions specific to a runtime environment may be generated based upon the abstract representation 206 and executed to generate a GUI in the runtime environment. The same XGL representation may be used to generate machine executable instructions specific to different runtime environments and target devices.

According to certain embodiments, the process of mapping a model representation 202 to an abstract representation 206 and mapping an abstract representation 206 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 206 rather than model representation 202 for runtime processing, the model representation 202 that is created during design-time is decoupled from the runtime environment. Abstract representation 206 thus provides an interface between the modeling environment and the runtime environment. As a result, changes may be made to the design time environment, including changes to model representation 202 or changes that affect model representation 202, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies, such as the target device platform or programming language dependencies.

Figure 2B:
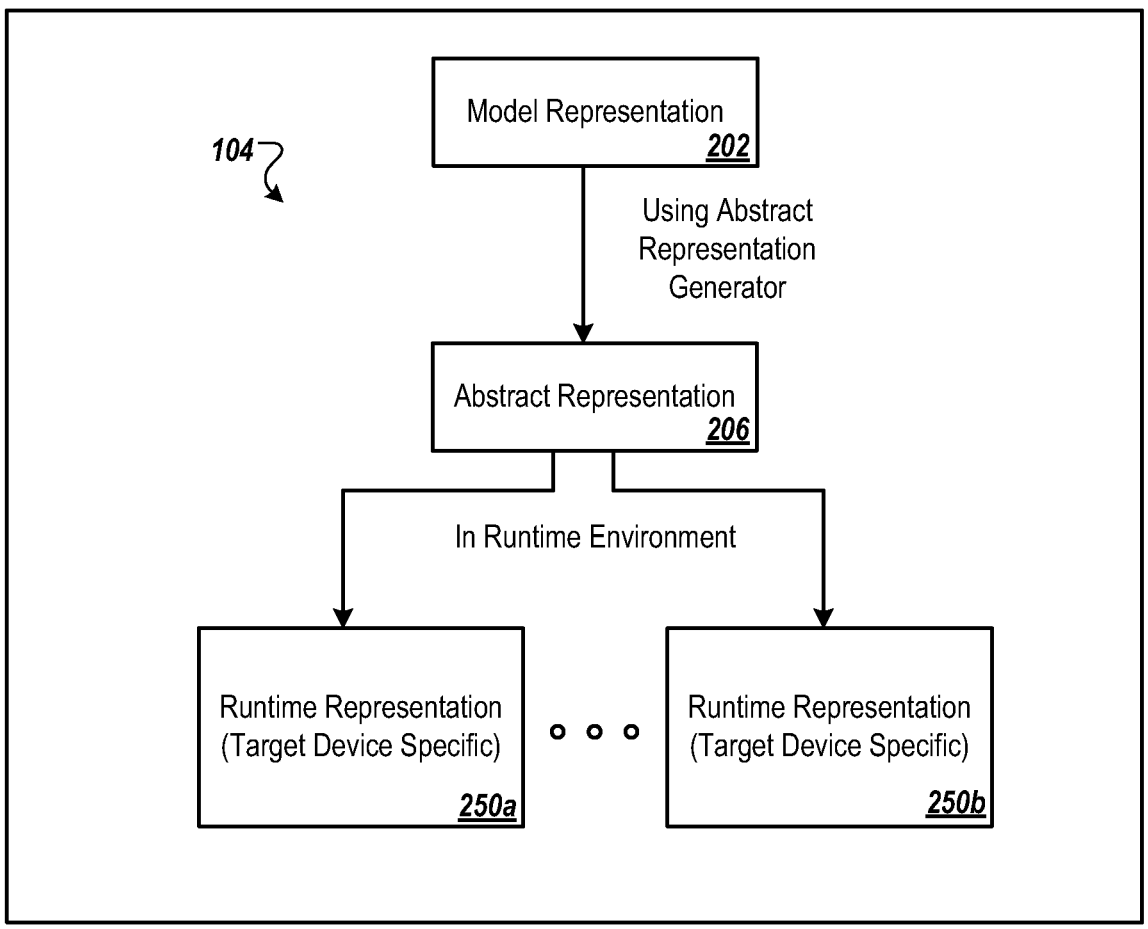
FIG. 2B depicts a simplified process for mapping a model representation to a runtime representation using the example modeling environment of FIG. 2A or some other modeling environment.

FIG. 2B depicts an example process for mapping a model representation 202 to a runtime representation using the example modeling environment 116 of FIG. 2A or some other modeling environment. Model representation 202 may comprise one or more model components 104 and associated properties that describe a modeling domain, such as interfaces, processes, and data. The abstract representation 206 is generated based upon model representation 202. Abstract representation 206 may be generated by the abstract representation generator 204. Abstract representation 206 comprises one or more abstract GUI components and properties associated with the abstract GUI components. As part of generation of abstract representation 206, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 250, including GUIs for specific runtime environment platforms, may be generated from abstract representation 206. A device-dependent runtime representation may be generated for a particular type of target device platform to be used for executing and displaying the GUI encapsulated by the abstract representation. The GUIs generated from abstract representation 206 may comprise various types of GUI elements such as buttons, windows, scrollbars, inputs boxes, etc. Rules may be provided for mapping an abstract representation to a particular runtime representation. Various mapping rules may be provided for different runtime environment platforms.

Figure 2C:
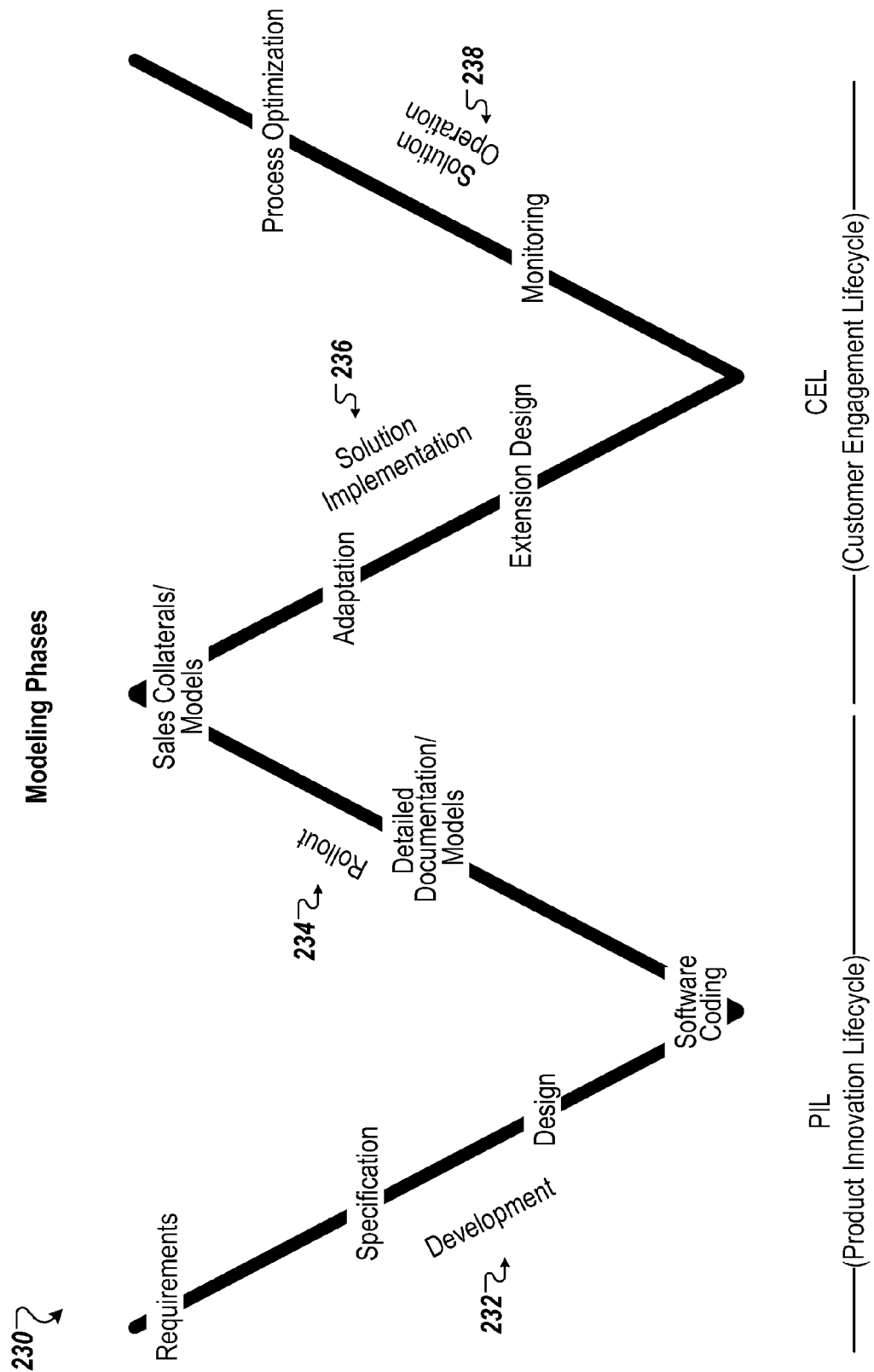
FIG. 2C illustrates example modeling phases using the example modeling environment of FIG. 2A or some other modeling environment.

As described with respect to FIG. 2A, modeling tool 140 may be used by a GUI designer or business analyst during the application design phase to create a model representation 202 for a GUI application. In addition, modeling tool 140 may be used during other modeling phases and by other types of users to create model representations 202 for a GUI application. FIG. 2C illustrates example modeling phases 230 using the example modeling environment 116 of FIG. 2A or some other modeling environment. Modeling phases 230 may include development 232, rollout 234, solution implementation 236, and solution operation 238. In some implementations, development 232 and rollout 234 represent a product innovation lifecycle, while solution implementation 236 and solution operation 238 represent a customer engagement lifecycle. Development 232 may include, for example, determining requirements of a product or application, writing a specification for the product or application, designing the product or application, and writing software code for the product or application. Rollout 234 may continue with software coding, and also includes generating detailed documentation and/or detailed models, as well as sales collaterals and/or sales models. Solution implementation 236 may continue with generation of sales collaterals and/or models, and also includes adapting the product or application, as well as extending the design of the product or application. Solution operation 238 may include, for example, monitoring the product or application and optimizing processes in the product or application.

Returning to FIG. 1, server 108 often includes local memory 105. Memory 105 may include any memory or database module and may take the form of volatile or non-volatile (tangible) memory including, without limitation, magnetic media, optical media, random access memory (RAM), read-only memory (ROM), removable media, or any other suitable local or remote memory component. Illustrated memory 105 includes one or more data objects 102, a process content directory 106, and, at some point, one or more modeled elements 104. Memory 105, however, may also include any other appropriate data such as HTML files or templates, data classes or object interfaces, software applications or subsystems, additional repositories for storing backend information associated with and/or defining the one or more modeled elements 104, and others (whether illustrated or not). For example, memory 105 may include pointers or other references to data objects 102 that were published to a location remote from server 108. In this way, a local developer or non-technical business analyst may use a remote model 104 or modeling domain to efficiently supplement the particular aspect that he is modeling or viewing.

Data objects 102 are elements for information storage in object-oriented computing systems. Data objects can describe the characteristics of an item using a series of data fields that, for example, can correspond to described characteristics. Typically, a programmer will predefine standard object classes, referred to in the present specification as object types, that are hardcoded into a set of machine-readable instructions for performing operations. Object types are blueprints for describing individual objects using a defined set of class attributes (or properties). Instantiated objects that are members of such standard object types can be applied in a variety of different data processing activities by users, for example, customers who are largely unaware of the structure of the standard object types. Put another way, the data objects 102 are generally logical structures that can be modeled and then instantiated upon deployment to store particular data. In some instances, the data objects 102 may represent one or more business objects associated with the application 124 as described above. The data objects 102 may also be related to or store information related to the additional architectural elements of the application 124 described above.

According to some embodiments, the developer (or other analyst) may use a model-driven development environment 116 to compose an application using models 104 of business logic or processes, data objects 102, user interfaces, and so forth without having to write much, if any, code. Moreover, these models can include or be different logical layers of abstraction including system-specific, system-independent, business-independent instances. Indeed, one of these logical layers may represent actual code or modules, whether source or executable, to assist developers. These layers of abstractions can include different domains that provide different views on the particular abstraction, including graphical interfaces, business processes or logic, and data flow. In some circumstances, some or all of these models 104 may conform to a particular metamodel or metadata infrastructure. To aid the developer, analyst, or other user working with the model 104, portions may be extracted from the (perhaps very large) model 104. A view of this extracted portion can then be presented to the requesting or another user, often via interface 142. The extracted portion of model 104 can be intersected or aggregated with extracted portions to generate a unified view on the subset. For example, the user may utilize a filter provided by modeling environment 116 to drill down to a more manageable subset. This example user may then provide customized criteria to focus on particular portions of this subset.

Memory 105, whether local or distributed, can also store a process content directory 106. The process content directory 106 can store detailed relationship and connection information defined between the models and entities designed in the modeling environment 116, as well as provide the data and other information needed to allow for the automated addition of model-related and model-defining information into high-level models created by business users and technical developers. For example, the directory 106 may store detailed information regarding additional and/or more detailed connections defined for the high-level elements created or modeled in the modeling environment 116. The process content directory 106 can store information used to define previously-generated models, including the connections and operations included in and associated with various modeled entities. Therefore, the information stored in the directory 106 can be used for the automatic generation of later-developed or updated models when one or more elements added to a particular model have previously been used or modeled in earlier-defined models. Additionally, changes to one or more of the models associated with the directory 106 can be reflected in the data stored therein. Models 104 defined or generated using information from the directory 106 can be automatically updated by reloading or re-analyzing the modified information stored within the directories.

In some instances, the process content directory 106 can store information defining which entities are available for a particular process, business area, or work center, among others. For instance, where a particular component has already been defined in the modeling environment 116, information stored in the process content directory 106 can be used to describe a set of entities to which that particular component can navigate to or be associated with. Using information retrieved from the process content directory 106, a model describing the navigation available from a particular component can be at least partially generated or described.

Some or all of the data objects 102, models 104, and information associated with or stored in the process content directory 106 may be stored or referenced in a local or remote development or metamodel repository. This repository may include parameters, pointers, variables, algorithms, instructions, rules, files, links, or other data for easily providing information associated with or to facilitate modeling of the particular object. More specifically, each repository may be formatted, stored, or defined as various data structures in eXtensible Markup Language (XML) documents, text files, Virtual Storage Access Method (VSAM) files, flat files, Btrieve files, comma-separated-value (CSV) files, internal variables, one or more libraries, or any other format capable of storing or presenting all or a portion of the interface, process, data, and other models or modeling domains. In short, each repository may comprise one table or file or a plurality of tables or files stored on one computer or across a plurality of computers in any appropriate format as described above. Indeed, some or all of the particular repository may be local or remote without departing from the scope of this disclosure and store any type of appropriate data.

Server 108 may also include interface 117 for communicating with other computer systems, such as clients 110, over network 112 in a client-server or other distributed environment. In certain embodiments, server 108 receives data from internal or external senders through interface 117 for storage in memory 105 and/or processing by processor 120. Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals. Interface 117 may allow communications across network 112 via a virtual private network (VPN), SSH (Secure Shell) tunnel, or other secure network connection.

Network 112 facilitates wireless or wireline communication between computer server 108 and any other local or remote computer, such as clients 110. Network 112 may be all or a portion of an enterprise or secured network. In another example, network 112 may be a VPN merely between server 108 and client 110 across wireline or wireless link. Such an example wireless link may be via 802.11a, 802.11b, 802.11g, 802.20, WiMax, and many others. While illustrated as a single or continuous network, network 112 may be logically divided into various sub-nets or virtual networks without departing from the scope of this disclosure, so long as at least a portion of network 112 may facilitate communications between server 108 and at least one client 110. In other words, network 112 encompasses any internal or external network, networks, sub-network, or combination thereof operable to facilitate communications between various computing components in environment 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 112 may be a secure network associated with the enterprise and certain local or remote clients 110.

Client 110 is any computing device operable to connect or communicate with server 108 or network 112 using any communication link. At a high level, each client 110 includes or executes at least GUI 142 and comprises an electronic computing device operable to receive, transmit, process and store any appropriate data associated with environment 100. It will be understood that there may be any number of clients 110 communicably coupled to server 108. Further, "client 110," "developer," and "user" may be used interchangeably as appropriate without departing from the scope of this disclosure. Moreover, for ease of illustration, each client 110 is described in terms of being used by one user. But this disclosure contemplates that many users may use one computer or that one user may use multiple computers. As used in this disclosure, client 110 is intended to encompass a personal computer, touch screen terminal, workstation, network computer, kiosk, wireless data port, smart phone, personal data assistant (PDA), one or more processors within these or other devices, or any other suitable processing device. For example, client 110 may be a PDA operable to wirelessly connect with external or unsecured network. In another example, client 110 may comprise a laptop that includes an input device, such as a keypad, touch screen, mouse, or other device that can accept information, and an output device that conveys information associated with the operation of server 108 or clients 110, including digital data, visual information, or GUI 142. Both the input device and output device may include fixed or removable storage media such as a magnetic computer disk, CD-ROM, or other suitable media to both receive input from and provide output to users of clients 110 through the display, namely, the client portion of GUI or application interface 142.

GUI 142 comprises a graphical user interface operable to allow the user of client 110 to interface with at least a portion of environment 100 for any suitable purpose, such as viewing transformed application, model, or model subset (view) data 144. As the models 104 are filtered, at least a viewable portion of the results 144 are presented using GUI 142. Generally, GUI 142 provides the particular user with an efficient and user-friendly presentation of data provided by or communicated within environment 100. More specifically, GUI 142 can include a modeling editor that presents views of models 104 based upon filters. The modeling editor can be connected with the modeling environment 116 (or other development environment) such that the modeling editor and/or the modeling environment 116 can automatically generate an application model (e.g., a model of an application that is being developed) from a graphical model and/or vice versa. The modeling editor can allow a user to freely choose graphical objects that can represent one or more development objects, or no development objects at all. The modeling editor can support representing different abstraction levels that correspond to a graphical model. For example, this modeling editor can support modeling a detailed view or an abstract view of a graphical model. Typically, the information that is represented in a graphical model can be freely edited. For example, a graphical model can be edited to include user-descriptions or business information that is not part of the development objects and/or relationships among development objects. Changes to development objects and/or relationships among development objects can be automatically reflected in an associated graphical model, and/or vice versa. Accordingly, GUI 142 may comprise a plurality of customizable frames or views having interactive fields, pull-down lists, and buttons operated by the user. GUI 142 may also present a plurality of portals or dashboards. For example, GUI 142 may display a portal that allows developers or information managers to view, create, and manage data objects 102 or models. GUI 142 is often configurable, supporting a combination of tables and graphs (bar, line, pie, status dials, etc.) and is able to build real-time dashboards. It should be understood that the term "graphical user interface" may be used in the singular or in the plural to describe one or more graphical user interfaces and each of the displays of a particular graphical user interface. Indeed, reference to GUI 142 may indicate a reference to the front-end or a component of any application or software, as well as the particular interface accessible via client 110, as appropriate, without departing from the scope of this disclosure. Therefore, GUI 142 contemplates any graphical user interface, such as a generic web browser or touchscreen, that processes information in environment 100 and efficiently presents the results to the user. Server 108 can accept data from client 110 via the web browser (e.g., Microsoft Internet Explorer or Mozilla Firefox) and return the appropriate HTML or XML responses to the browser using network 112.

While FIG. 1 is described as containing or being associated with a plurality of components, not all components illustrated within the illustrated implementation of FIG. 1 may be necessary in each alternative implementation of the present disclosure. Additionally, one or more of the components described herein may be located external to environment 100, while in other instances, certain components may be included within or as a portion of one or more of the other described components, as well as other components not described. Further, certain components illustrated in FIG. 1 may be combined with other components, as well as used for alternative or additional purposes in addition to those purposes described herein.

Figure 3A:
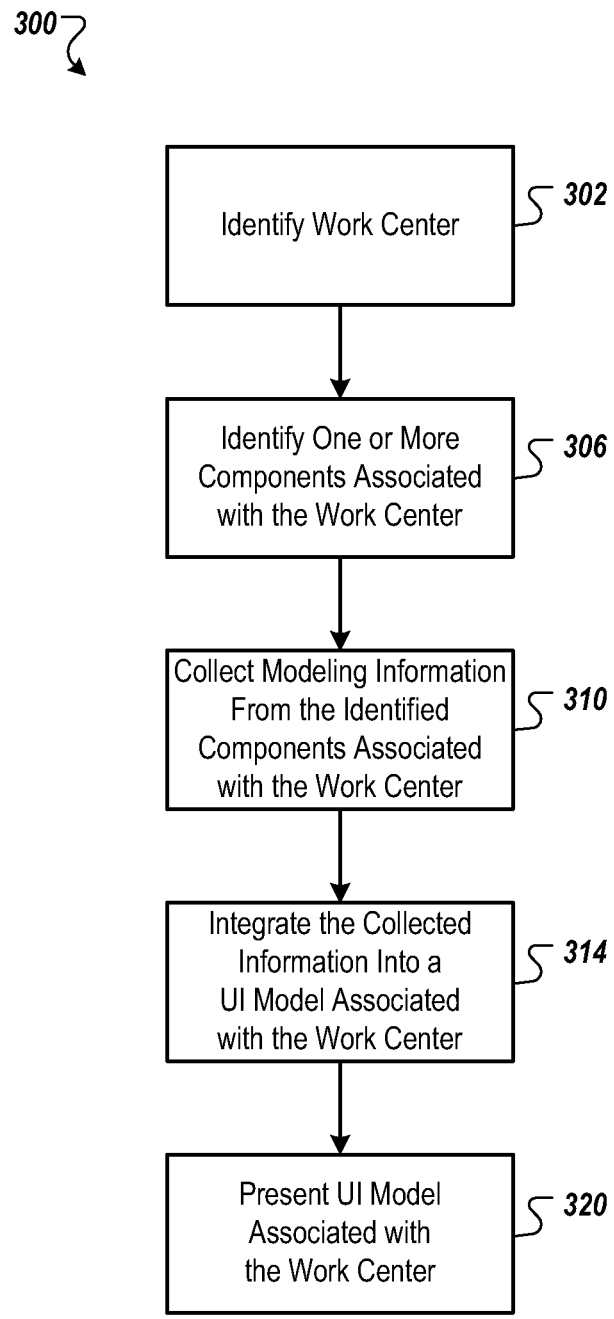
FIG. 3A is a flowchart illustrating an example method for generating a UI model integrating information associated with a particular component from a plurality of models.

FIG. 3A is a flowchart illustrating one example of a method 300 for generating a UI model integrating information relating to a particular work center into a common modeling environment. At a high level, method 300 can access known models defining various modeled portions and attributes of an application (such as modeled application 124), as well as the information defining and connecting those models, in order to create a new model that integrates the various connections and relationships present throughout the modeled application 124 as they are associated with a particular entity. Further, new models developed within the modeling environment 116 that have defined connections with or between one or more of the known models or entities therein can be dynamically added to the integrated model, allowing for an up-to-date and current view of the various connections between different software and models within an application 124 designed or available in a particular modeling environment 116. The integrated model generated by method 300 can be used to describe and illustrate the connections to a particular entity (i.e., a work center) in the modeling environment 116 in a transparent manner, and without the need for detailed written documentation to be created for each generated model. Examples of method 300 may be described in terms of the software environment 100. However, it should be understood that any other suitable system or environment may also be used to perform the method 300 or techniques or processes similar thereto.

At 302, a work center is identified. Generally, a work center is a collection of UI interfaces (i.e., screens, windows, etc.) available to a user or developer for a particular business area based on that user or developer's role or authorized level of access. Each work center can inherit administration functionality, rights management, packaging, and deployment from a particular portal associated with the user or developer, and can be mapped in some instances to permission containers (not shown), which can provide access-based permissions for users and developers to various backend entities and other elements. In some instances, work centers can be assigned and/or available to users and developers through roles or access levels. For instance, if the user has a limited role in an organization, or is not a trusted developer, fewer work centers may be displayed to that user. In other instances, the user may only view or have access to a portion of a particular work center. In some examples, a particular work center can comprise one or more work center views, which are views on particular areas of interest for a user allowing for the display of information regarding the particular areas, as well as to insert, change, or delete data within the area. These work center views can contain floor plans which represent one or more UIs (or other pages or screens of a modeled application 124) that are predefined by patterns and adapted to one or more business objects. In some instances, this may mean that the business objects define the subset of attributes that can be or are displayed on the associated floor plan. In some instances, attributes are needed that can only be derived from a combination of attributes of one or more business objects. In those cases a controller object can be bound to or associated with the particular floor plan which define that particular attribute and allow a meaningful value to be derived at runtime from the associated attributes of the underlying business object(s).

Work centers can provide several advantages to users and developers of an enterprise application, including upgrade-safe adaptation and verticalization support. Upgrade-safe adaptation support allows for various customizations to be performed on a particular work center without affecting or modifying an original version of the work center. To provide the update-safe environment, any changes to a work center initially provided by a particular application 124 can be saved or stored as a copy of the original work center. In that sense, updates to the original work center provided by the application publisher during the lifecycle of the application 124 (and after the user or developer modifies the previous version of the work center) will not overwrite changes made to the work center by the user or developer. Instead, changes to work center content made by the application's publisher can be merged or integrated into the customized copies of the original work center in order to provide consistent performance throughout the application's lifecycle. Verticalization support means that various adaptations and modifications to the application 124 can be expressed as a hierarchy of adaptations for "vertical niches," such as an industry, region, customer, and so forth. When an upgrade to the application 124 is deployed by the application's publisher, the vertical hierarchy of adaptations and modifications is taken into account, again such that any modifications in the various adaptations are not lost or damaged by the upgrade. Instead, any changes to the base content of the application 124 are merged or integrated into the vertical niches of the application. In some cases, the merging and integration of the updates into the modifications and adaptations created by users and developers may be performed automatically using the inherent functionality of the application 124, an update or integration software module (not shown) associated with the application 124, or through other suitable means (e.g., third-party integration software, additional software developed and provided by the application publisher specifically for integrating updates and upgrades, etc.).

Returning to 302, identifying a particular work center may comprise the selection (by a user or developer) of a particular work center model from a list or set of predefined work center models. In other instances, identifying a work center may comprise the creation and modeling of a new work center model by the user or developer using the modeling tool 140 (or any other suitable software associated with the modeling environment 116). In still other instances, the work center can be created or defined (in some cases, automatically) using one or more work center model templates available in the modeling environment 116. By selecting a work center model template, and defining one or more attributes specific to the desired work center in the model, a new work center may be defined. Each work center can be defined by a work center model that describes the layout of a UI design for each particular work center, which can comprise one or more components included within or associated with the work center.

Figure 4A:
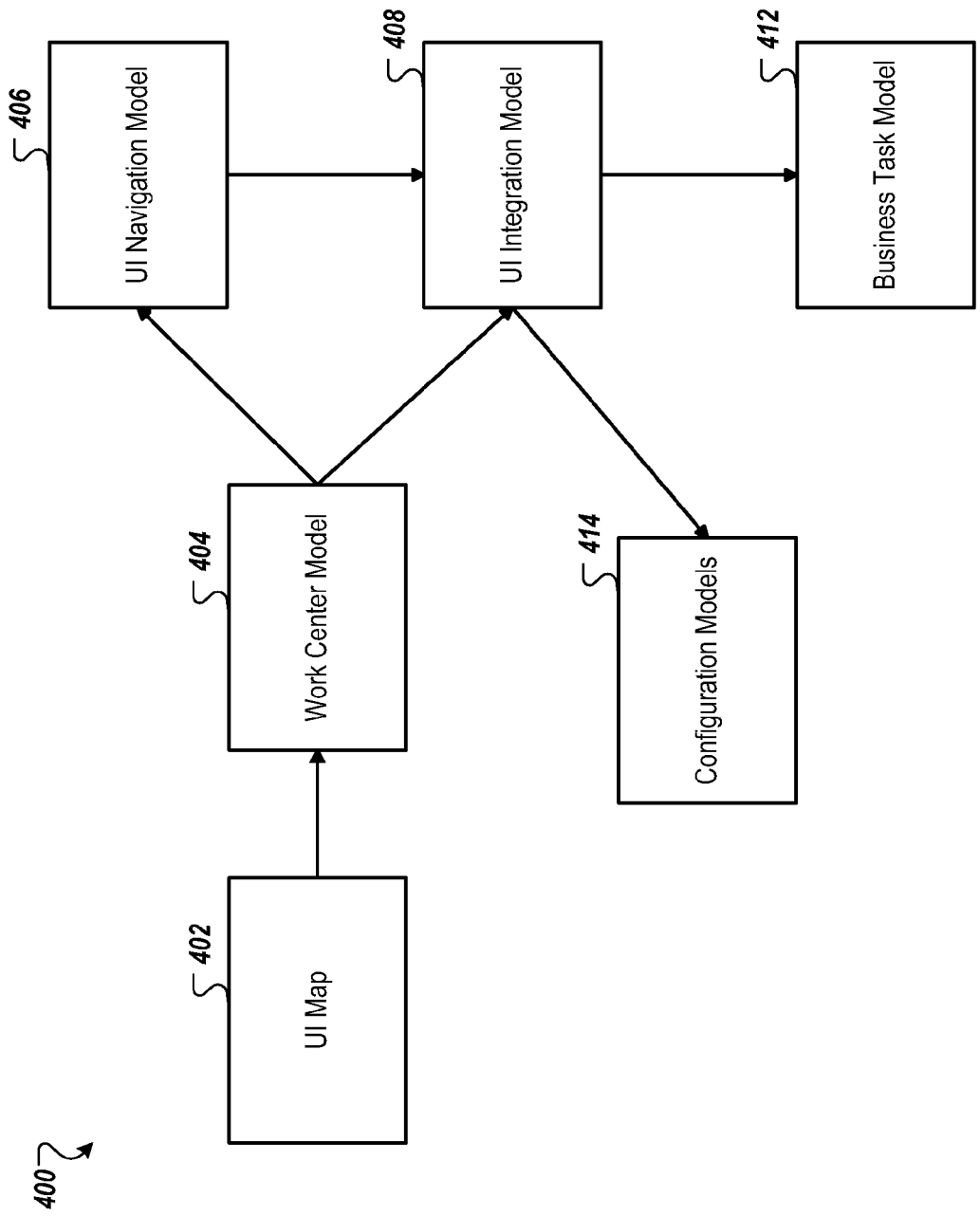
FIG. 4A illustrates an example UI modeling landscape including one or more navigation possibilities, illustrating at least a portion of the models associated with the example environment of FIG. 1.
Figure 4B:
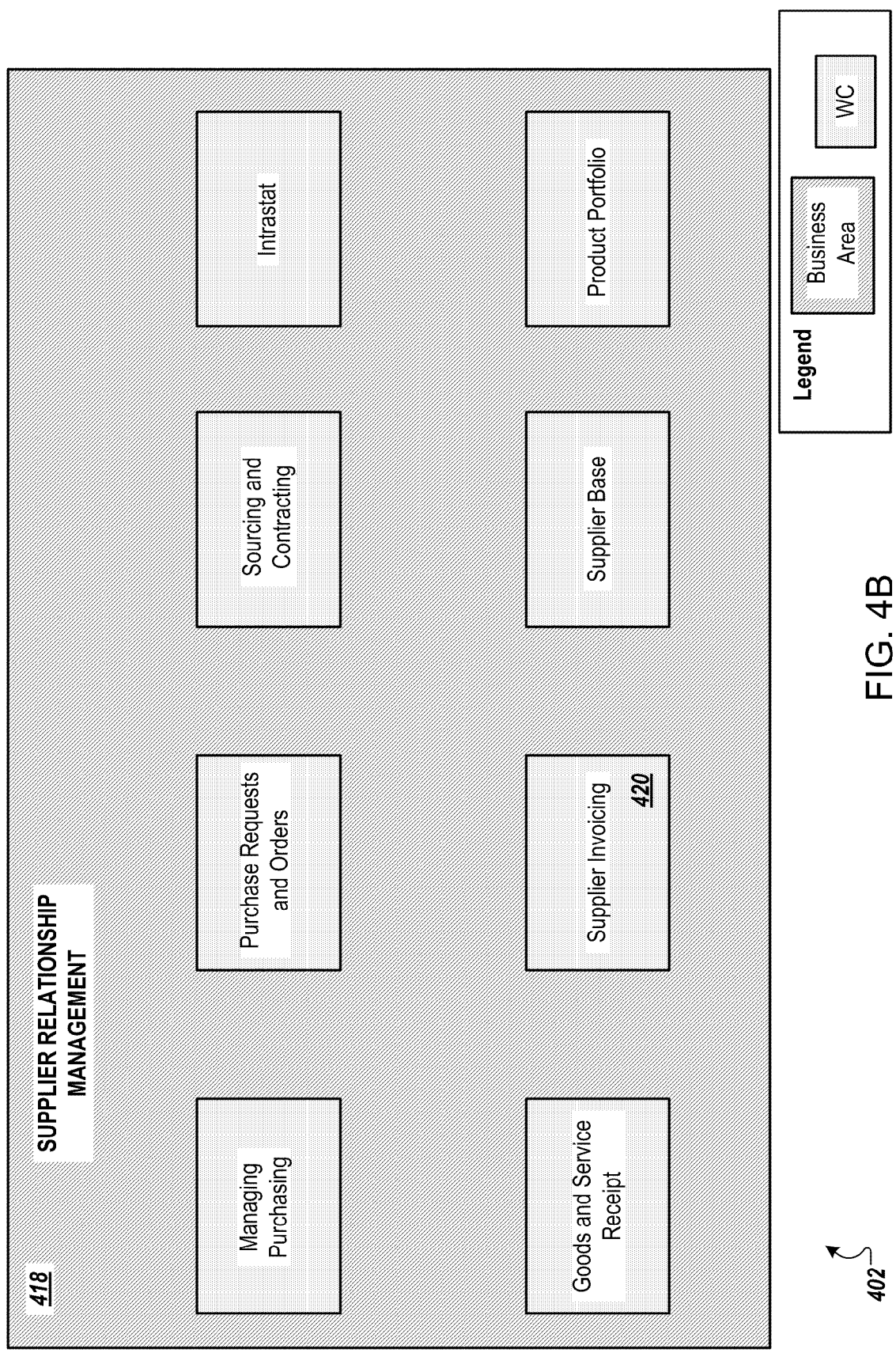
FIGS. 4B-G illustrate particular examples of the models included within the example UI modeling landscape of FIG. 4A.

In general, a work center can be associated with or included in one or more business areas (as illustrated in UI Map 402 of FIG. 4A). A business area may represent a logical grouping of related application modules or sub-modules, models, work centers, operations, or other relevant entities that are related to a particular business function or area. For example, FIG. 4B illustrates that the Supplier Invoicing work center 420 is associated with the Supplier Relationship Management business area 418. An application 124 can be separated into any number of business areas as is appropriate for the breadth and functionality of the application 124. For instance, business areas may represent the various entities, divisions, and/or business-related groups operating within or associated with a particular business, each logically separated based on their purpose, processes, and operations within the business. Work centers (and their related models) can be associated with a business area manually by the user or developer by, for instance, using drag-and-drop functionality associated with the modeling environment 116 to place the work center within a defined business area. A plurality of related work centers can be added to or associated with a single business area. Based on those associations, the modeling environment 116 (or a developer/user thereof) can generate a model of the business area depicting the plurality of work centers related to or associated with a particular business area (such as in UI Map 402 of FIG. 4B). In some instances, when a work center is first developed, attributes associated with and defining a particular work center may be defined to represent the work center's association with a particular business area. Where a work center has previously been developed and, in some cases, has already been associated with a particular business area, the user or developer can modify the attributes defining the work center's relationship with a particular business area, including changing the business area in which the work center resides or with which the work center is associated. One example of modifying the associated business area for a work center is to drag a UI element representing the work center into a new or different business area of the UI Map 402 (illustrated in FIG. 4B), while in another example, an attribute defining the work center's relationship to a particular business area can be updated, modified, or cleared. When a work center is dragged-and-dropped into a new business area, the modeling environment 116 and application 124 may automatically update the attributes defining the work center to reflect the new or modified relationship between the work center and its related business area.

At 306, one or more components (or entities) associated with the work center are identified. In some instances, identifying the one or more components associated with the work center may comprise a user or developer creating or developing one or more work center views and/or floor plans and associating them with the work center. Additionally, representations of the associated components can be added to or included in a model of the work center, as illustrated in the modeled work center 404 in FIG. 4C. When added to or included in the work center model, the work center views and floor plans represent one or more UI elements or activities accessible in or via the work center, as well as a particular layout or design of a UI associated with the work center. Additionally, some components may be associated with the work center through one or more indirect connections to the associated work center model. For instance, if a work center model is modeled or defined to represent a work center, and a particular work center view model (which may define or represent a particular work center view) is included within or associated with that work center model, then one or more models or entities directly associated with or included within that particular work center view model may be indirectly connected to or associated with the work center and the work center model. For example, a work center view (and/or a model representing the work center view) may be defined or modeled such that the work center view is connected or associated with a specific controller object (or a model representing the specific controller object) or a particular business task (or a business task model, such as the example business task models illustrated in FIGS. 7A-7D). In those instances, the work center model can be considered to be indirectly connected to or associated with the specific controller object or the particular business task (or the models representing them), and directly connected to or associated with the work center view model representing the work center view. When modeling a task, the floor plan known to complete the task may be associated with the task, for instance, by adding the task as an attribute of the floor plan or by associating the task with the particular floor plan. In some instances, each floor plan may be assigned or associated with at least one controller or business object. Further, each illustrated attribute in the floor plan may be bound to an attribute from a controller or business object associated with the floor plan. Additionally, each floor plan can be assigned one or more services that are bound to the associated controller or business object, where the service allows the floor plan to read the attribute values at runtime and/or to change the business object's (or objects') attributes at runtime. If a service or the controller is used in a floor plan, that service or controller may be associated with at least one service of the associated business object(s). These connections may be depicted, for example, in FIG. 3B. Further, if a particular business object has many attributes (e.g., 200 or more), a node can be added to the business object in order to bundle attributes and their related services.

Figure 4C:
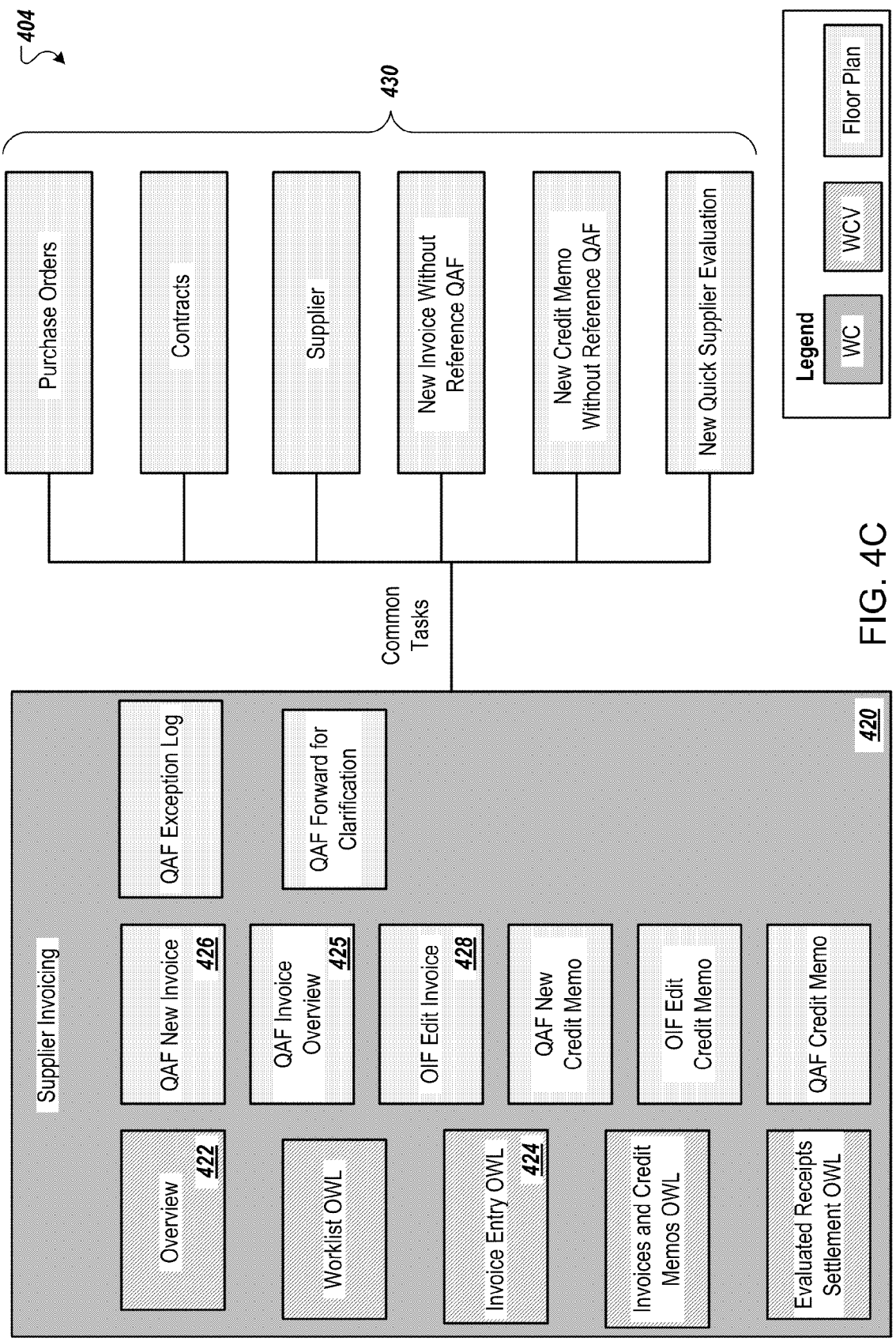
Figure 4D:
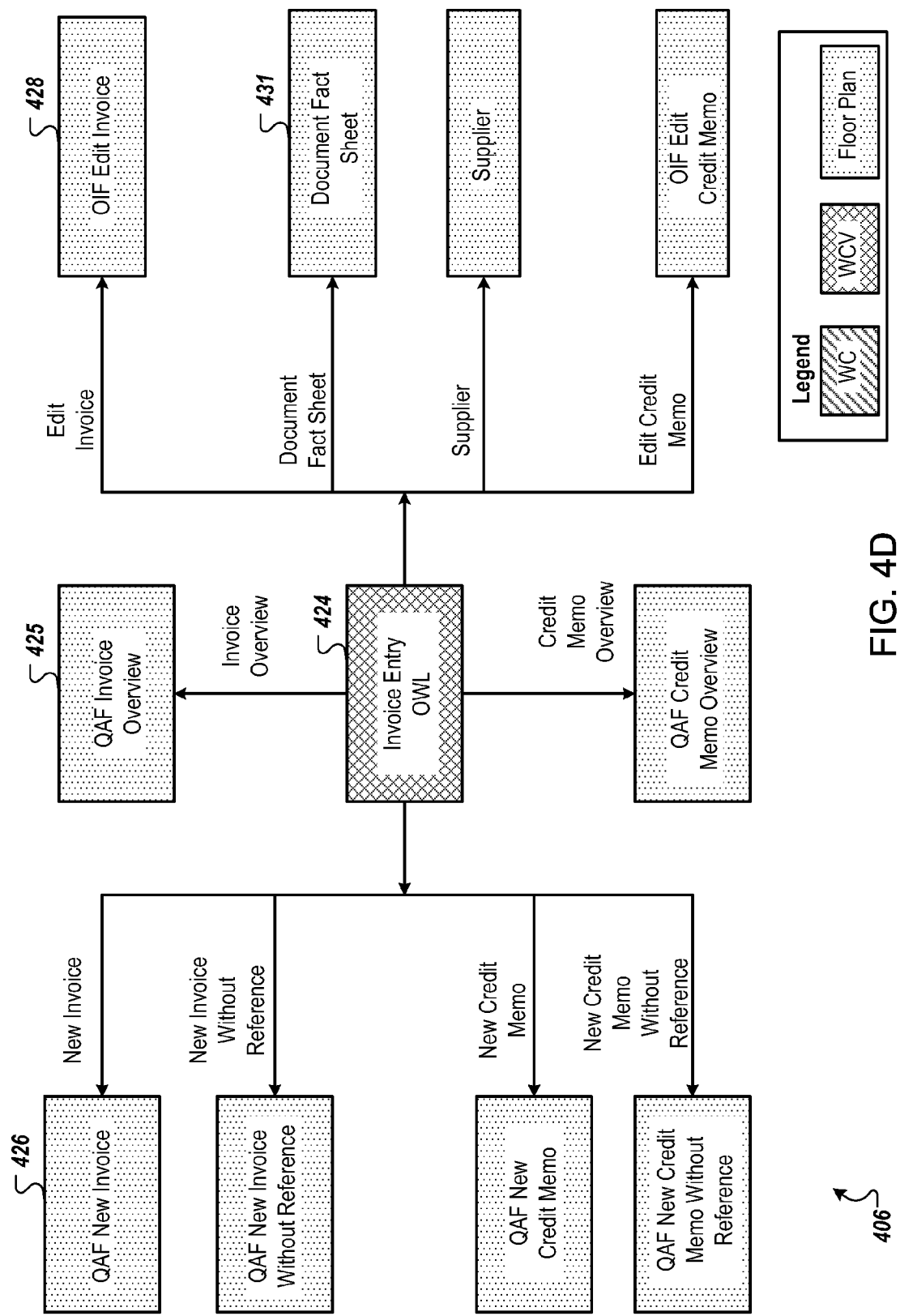

Identifying the components, entities, or models associated with the work center may be performed using the modeling tool 140 to manually add or associate certain UI elements and/or components with a work center model representing the identified work center. As illustrated in FIG. 4C, a plurality of UI elements or components (i.e., work center views and floor plans) can be associated with the work center model. Each of these UI elements can also be associated with a particular UI navigation model (as illustrated in FIG. 4D) which describes the various links and connections within a particular work center view or floor plan. The UI navigation models associated with the particular components and providing the links and connections to the models of other components may represent one or more of the components that are identified as associated (indirectly in some cases) with the work center. In one example, the UI navigation models can provide a landscape of UIs to an end user, customer, or developer, indicating the potential navigations between one or more of the UIs. One advantage of the UI navigation model is that non-technical or business users may be able to easily understand the ease with which the overall system can be used and navigated through. In one instance, the UI navigation model can illustrate (e.g., during development) the number or types of "clicks" (e.g., links) a user will need to reach a particular set of functionality within the system, and may further provide users the ability to modify the connections to improve or change the navigation. For example, normally navigation between two or more UIs are depicted in multiple UI navigation models. However, some areas may be inherently important to certain work centers, such that a one-click or immediate navigation to those areas (or common tasks 430) is necessary. As an example, FIG. 4C depicts the possibility of navigating from the Supplier Invoicing Work Center 420 directly to one or more common tasks 430, including purchase orders or contracts associated with the one or more supplier invoices.

Still further, each UI and/or UI element included in a particular UI navigation model can be associated with or connected to certain controllers, tasks, and other elements as appropriate for a particular application 124. These components and their associated models, as well as the connections defined for each component, may also be considered to be associated with the work center. For instance, certain UI elements may be associated with one or more tasks. Tasks may be modeled in one or more business task models (as described in FIGS. 6A-6B, with example business task models illustrated in FIGS. 7A-7D) which can be used to define the operations of tasks and associated task agents, as well as those tasks' relationships and connections to various interfaces and business objects. As defined by each task's connection with certain UI elements, certain business tasks (and the model defining or associated with those tasks) model may also be (indirectly) associated with the work center, and included as one of the identified components associated with the work center.

At 310, information represented in one or more models defining the components identified at 306 is collected. In one example, the collection may be a manual process, wherein one or more UI developers refer to each of the models representing an identified component to determine the relationships and connections between the various entities of those models and the work center. In another example, the process of collecting information defining or related to the identified components of 306 may comprise the automated step of collecting information regarding the models of the identified components. For instance, the modeling API 118 may be used by application 124 or modeling tool 140 (as well as any other suitable software) to access the components and their related models within the modeling environment 116 such that modeling information defining and related to those components is automatically collected. Information defining the components themselves, or the connections between various identified components, can be accessed and read from the modeling environment 116 (and the models 104 therein) using the modeling API 118 (or another suitable API) to access and read information from the associated models 104, or, in some cases, one or more repositories storing information defining the connections between and entities and components comprising those models.

Figure 3B:
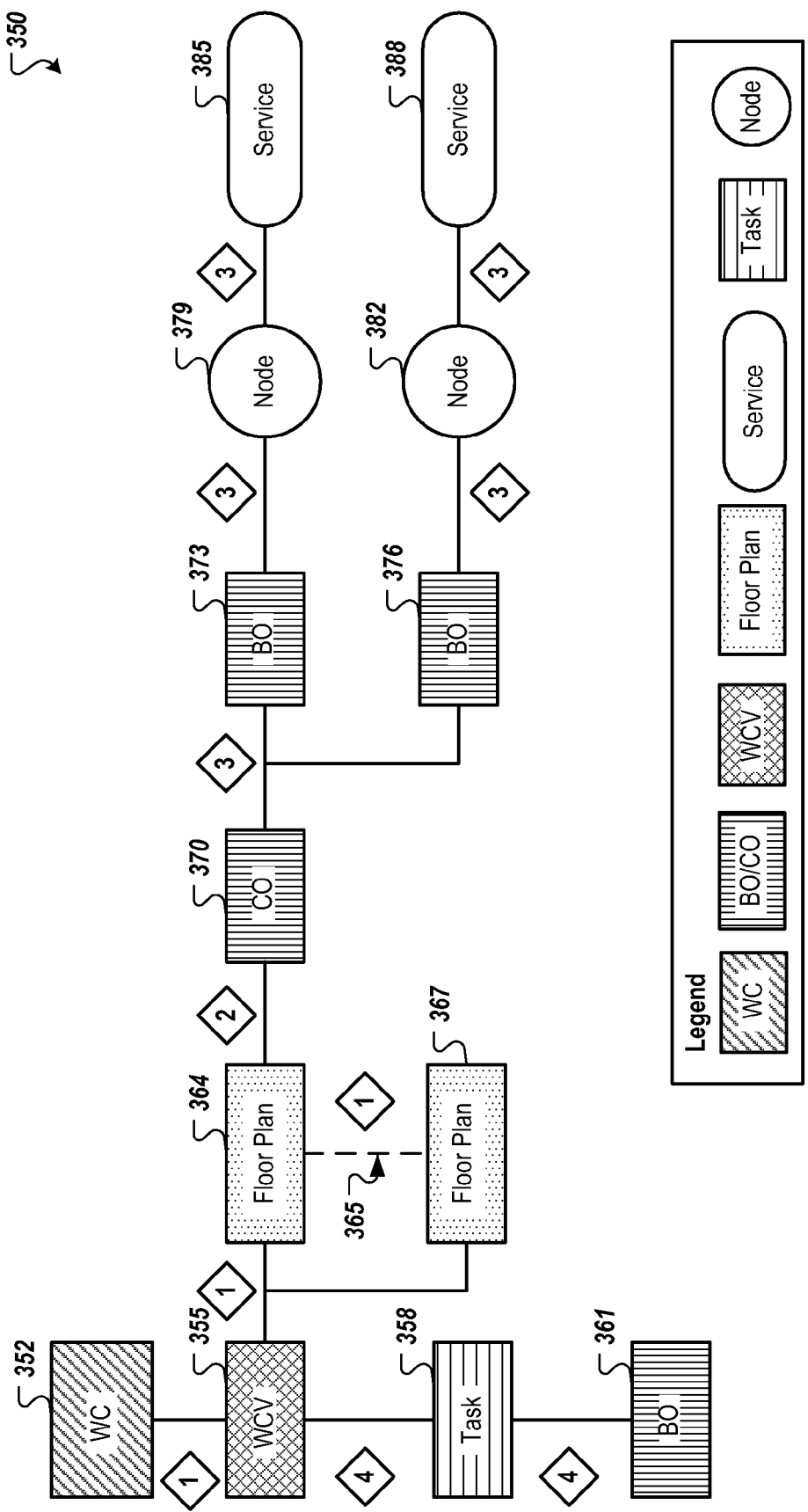
FIG. 3B illustrates one generic example of an integrated UI model created in accordance with the flowchart of FIG. 3A or methods similar thereto.

In one example, and as described/illustrated in FIG. 3B, a work center can be identified. Using the information retrieved from one or more models defining the identified components or entities (and/or repositories storing the same information), connections between the work center and one or more work center views and/or floor plans can be established. In some instances, this information can be retrieved from the UI navigation model associated with the work center view or floor plan. Further, information identifying additional associations or connections of the one or more identified work center views and/or floor plans with other components and/or their models can also be read from the modeling environment 118, and the information defining or representing those associations collected by the application 124 or modeling tool 140 (or other suitable software). For example, a particular work center view or floor plan may be associated with one or more tasks. In those instances, business task models associated with those tasks can be identified, and information defining those tasks can be collected from the identified business task models defining the associated tasks. In some instances, work centers, work center views, and floor plans may each have or can be associated with one or more attributes. In some instances, one attribute associated with these entities may be an Object Work List (OWL). Each OWL may provide a list of the tasks associated with a specific area or element. In some instances, each OWL may typically be assigned to one or more tasks, such that at runtime, the OWL may contain several entries related to a plurality of active task instances associated with the OWL.

In some instances, information defining how particular work center views and/or floor plans operate can be retrieved from the appropriate repositories or models associated with those UI elements (i.e., the work center views and floor plans). In those instances, information defining the modeled UI elements' connections to one or more controller objects can be collected, and, in some instances, additional information defining the controller object's connections to or associations with one or more business objects, nodes, and/or services. In general, any number of components and associated models associated (either directly or indirectly) with the work center can be identified and used to collect information related to the work center.

At 314, the modeling information collected from the identified components can be integrated into a single UI model associated with the work center, illustrated in the present application as the UI integration model. Example UI integration models, as well as details on how the model may be generated, are described and illustrated in FIGS. 3B, 4F and 4G. One example of the integration of information associated with a particular work center into a single UI model will be described in detail in FIG. 3B below. While FIG. 3B illustrates one example of a UI integration model 350, the connections and elements illustrated in and related to the UI integration model may be much more detailed and numerous in some implementations. Further, although particular models associated with the work center have been identified and described, additional or other models not described herein may also be relevant to and associated with the work center, with information defining those additional or alternative connections and relationships to the work center identified at 306, and collected and integrated into the UI integration model at 310 and 314, respectively.

At 320, the UI integration model associated with the work center (or at least a portion thereof) is presented. In one instance, the UI integration model (e.g., UI integration model 350) can be presented to a user via GUI 142. Where the UI integration model is too detailed to be presented in its entirety, a selected or relevant portion of the UI integration model may be presented in a particular view 144 to client 110. Further, presenting the UI integration model may include storing the UI integration model in memory 105 along with the other models 104. In still other instances, presenting the UI integration model at 320 may comprise exporting the information defining the UI integration model into a documentation system. For instance, the information and models representing the UI integration model may be used to automatically create documents explaining or describing the components and interactions of the modeled application 124 as illustrated in the generated UI integration model. The UI integration model may also be used to define the organization of documents within the documentation system based upon the connections and relationships of various components and models within the modeled application 124. Further, the UI integration model, along with the models used to define the UI integration model, may be used to create or generate figures for the documentation system, such as flowcharts, illustrations, and examples of the various connections and relationships within the UI integration model and/or the process associated with a particular UI element included within the UI integration model.

FIG. 3B provides an example UI integration model 350 illustrating the connections and information collected from one or more components (or models defining the components) associated with a particular work center. Those components and their models may have been identified, collected, and integrated by process 300 (or another similar or suitable method) to create the example UI integration model 350. Additional examples of example UI integration models are illustrated and described in FIGS. 4F and 4G It is first noted that the example UI integration model of FIG. 3B illustrates a single work center view 355 as being associated with the work center 352, and two floor plans 364 and 367 associated with that work center view 355. Persons of ordinary skill in the art will understand that in alternative examples and implementations, the work center 352 may be directly connected to and/or associated with a plurality of work center views and/or floor plans. For instance, the work center model 402 in FIG. 4C illustrates five (5) work center views and eight (8) floor plans included within the Supplier Invoicing work center 420. A UI integration model associated with the Supplier Invoicing work center 350 may include connections from the work center 420 to each of the additional components illustrated in FIG. 4C. Therefore, the examples of FIGS. 3B, 4F, and 4G are not intended to limit the scope, size or number of connections and/or relationships that can be represented in any particular UI integration model, and are merely meant to illustrate several examples of possible UI integration models.

Turning to the UI integration model 350 of FIG. 3B, work center 352 represents the work center identified in block 302 of FIG. 3A. Once work center 352 has been identified, a set of components (and/or models related to those components) are identified at 306. The connections identified by diamonds 1-4 illustrate the connections created by both direct and indirect associations with the work center 352. For instance, connections identified by diamond 1 may be created or defined by information retrieved from the process content directory 106, or another appropriate repository, including connections defined within one or more models 104 associated with the work center 352 (such as the models illustrated in FIGS. 4A-4G). Specifically, connections from the work center 352 to a work center view 355 and two floor plans 364 and 367 can be retrieved from the process content directory 106 of FIG. 1. Specifically, the application 124, modeling tool 140, or other software in modeling environment 116 can use one or more APIs to communicate with and read information from the process content directory 106. Information on elements or models related to the particular work center 352 of FIG. 3B can be requested from the process content directory 106 (via a database query, web service, or access via an API) such that information defining the relationships between one or more models (and their related entities) to the particular work center 352 is read and returned to the modeling environment 116. In some instances, the information returned may be inserted directly into the UI integration model 350, while in others, the integration model 350 may not be generated until all (or some portion) of the relevant information has been retrieved. In some instances, immediately after a work center (here, work center 352) is identified, the application 124 can perform the initial read and collection of information from the process content directory 106. Alternatively, information defining or associated with the connections to the work center 352 may be retrieved directly from one or more models 104 available in the modeling environment 116 that represent the relationships between the work center 352 and its related components. For instance, the work center model 404 may be read and accessed using the modeling API 118 to determine which components are associated with the particular work center 352. That information can, if necessary, then be supplemented by retrieved additional information from the process content directory 106 to further define the connections to the work center 352 and the one or more related components.

The information retrieved from the process content directory 106 or modeling environment 116 (as illustrated by diamond 1) may provide connections from the work center 352 to work center view 355 and to floor plans 364 and 367. In some instances, the information received from the process content directory 106 defining the work center's 352 connections may only include the direct connection from the work center 352 to the work center view 355. In those instances, after the work center view 355 (or another component) is identified as related to the work center 352 (and its model), the process content directory 106 may be further accessed to determine any additional connections associated with the work center view 355 (or the other components returned in the initial read of components directly associated with the work center 352). In other words, the connection between the work center 352 and the two floor plans 364 and 367 (as well as between other non-illustrated components) may not be explicitly defined in the process content directory 106, and instead may be the result of one or more indirect connections defined via the work center view 355 (and/or the other components returned by the initial API read). By performing additional reads of the process content directory 106 for the one or more components directly connected to the work center 352, additional indirect connections and relationships to the work center 352 (e.g., via the work center view 355) may be identified and can be added to the UI integration model 350 as illustrated in FIG. 3B.

Information on the connections and relationships between one or more of the retrieved elements can also be represented in the UI integration model 350. For instance, dashed line 365 illustrates a connection or link between floor plan 364 and floor plan 367 that may be determined when the additional indirect connections (at least with respect to the work center 352) are read and/or retrieved from the process content directory 106 or modeling environment 116. In one example, the dashed line 365 may indicate or represent that floor plan 367 is related to or associated with floor plan 364. For instance, the UI navigation model (an example UI navigation model 406 is illustrated in FIG. 4D) for floor plan 364 may define or include a link to floor plan 367, such that floor plan 367 can be accessed directly from floor plan 364. Additionally, in some implementations, the connections between work center view 355 and floor plan 367 may not be explicitly defined in the process content directory 106 or in the models defining the work center view 355. In those instances, dashed line 365 may represent an indirect relationship or connection between floor plan 367 and work center 352, where the connection is indirect to both the work center view 355 and the work center 352. In some instances, process 300 can continue identifying indirect relationships until all such relationships have been identified, while in other instances, certain parameters can be set or defined for process 300 that limit the number of indirect connections defined or the time spent searching for indirect connections. Those parameters may be manually set by a user or developer, predefined for the modeling environment 116 in general, or dynamically determined by the application 124, modeling environment 116, or modeling tool 140 as information is collected.

Once the relevant information is accessed and read from the process content directory 106 or modeling environment 116, additional detailed information associated with each of the retrieved elements can then be read from one or more of the models 104 or from another repository associated with the modeling environment 116. As described with regards to FIG. 1, the modeling environment 116 and the models 104 themselves can store information associating certain UI entities or components (such as those retrieved from the process content directory 106, including work centers, work center views, and floor plans) with controllers and other operating elements which define the actions performed or able to be performed by the modeled entities. In the illustrated example of FIG. 3B, only information associated with floor plan 364 has been retrieved using the modeling API 118. In alternative examples, both floor plan 367 and work center view 355 may also include certain connections retrieved using the modeling API 118. Similar to the process described above for reading information from the process content directory 106, the application 124, modeling tool 140, or other software associated with the modeling environment 116 can use the modeling API 116 to access modeling information relevant to or defining the plurality of models 104 associated with the identified components. The modeling API 118 can be used to access and read information associated with the one or more entities or components identified in and/or retrieved from the process content directory 106, and the retrieved information can define the operations and activities of the components themselves. Diamond 2 in FIG. 3B illustrates that information collected using the modeling API 118 defines a relationship between floor plan 364 and a particular controller object 370. Using that retrieved information, the relevant controller object 370 may be inserted into the UI integration model 350 for work center 352.

In some instances, the modeling API 118 may be used to access or retrieve information further describing the controller object 370, such as information describing which business objects are associated with the controller object 370, and further, which business object nodes and services are associated with the controller object 370 (either directly or indirectly). Alternatively, and as illustrated in the present example by diamond 3, information defining the business objects 373, 376 associated with and related to the controller object 370 may be contained in and retrieved from a service adaptation directory, which can be accessed using one or more APIs defined specifically to expose the functionality and information associated with the service adaptation directory, for instance, to allow for information associated with a particular controller object 370 to be accessed and collected for the generation of one or more UI integration models. Once that information is collected, it may be inserted into the UI integration model 350 for the associated work center. In one example, the connections between the particular controller object 370 and the one or more business objects 373, 376 may be defined by an additional model 104 specific to the controller object 370 (not illustrated herein). Further, connections between the business objects 373, 376 and their respective nodes 379, 382 and services 385, 388 may be modeled or represented in a business object model, as well as in any other appropriate repository or model.

FIG. 3B also illustrates that task 358 is associated with the work center view 355, with task 358 being associated with and related to business object 361. The relationship between the work center view 355 and the task 358 can be modeled in a business task model (i.e., business task model 412) that describes and defines the operations, agents, and process components associated with task 358, as well as the operations performed by task 358 on a particular business object, in this case, business object 361. Methods and examples for creating and modifying the business task model are illustrated and described in relation to FIGS. 6A-7D. In general, the connection between a particular task and UI element or component can be defined in or by the business task model, and integrated into the UI integration model 350 similar to the information retrieved from the other models and repositories. As shown in FIGS. 6A-7D, the business task model defining the task 358 may include one or more interfaces with which the task 358 is associated. One or more of those interfaces may be included within or associated with a particular UI element or component included in the UI integration model 350 (in this particular case, the work center view 355) and thus, associated with work center 352. Additionally or alternatively, the work center view 355 may be associated with one or more business objects defined in the business task model as triggering or associated with the task 358. The business task model (and/or one or more repositories storing the information defined by the business task model) can be accessed and read to determine which tasks are relevant to any of the UI elements or other components included in the UI integration model 350 or associated (either directly or indirectly) with the work center 352. Information regarding the relevant tasks can be retrieved from the business task model via the modeling API 118 (or another API defined to access and read information from the business task model or a repository storing business task model-related information).

In general, the UI integration model 350 provides developers and users with an overall view of the various entities and connections associated with a particular work center in an application. Specifically, the UI integration model 350 provides a common modeling environment that can (in some cases, automatically) provide a view of the integrated nature of a plurality of related models. Additionally, by automating the integration process, modifications made to certain portions or elements within a common UI landscape can be quickly and easily reviewed and any irregularities or defects in a design can be corrected. Further, changes to one or more portions of the UI landscape, such as a change to the business task model or to the links between particular UI elements or components, can be automatically modified in the UI integration model by regenerating the UI integration model 350 and reviewing the changes or updates. For instance, if a new task is associated with work center view 355, developers and business users alike will be able to quickly review that change without requiring a detailed manual analysis of the effects that changes to a particular model may cause to other models. Further, the defined integrations between the various UI elements and entities allows business users and technical developers to perform detailed analysis of a design or application before that design is put into production. Errors that would normally not be identified until well after the modifications cause problems in a production or testing system can be understood and corrected while the system is still in its design phase, and prior to use of the system in testing and/or production environment. Still further, the UI integration model 350 provides increased transparency to business users, technical developers, and all other individuals involved with the application 124. By providing clear and easily understandable models representing the interactions of the various entities, as well as the navigation through which those models can be accessed, the need for detailed and intricate documentation is lessened and, in some cases, removed, such that the operations of the application 124 and related models 104 can be easily understood by any business user, regardless of their level of technical skill in programming the application 124. In some cases, the UI integration model 350 can be used to automatically generate documentation describing the modeled application 124, either by describing the various components included or connected in the model, or by organizing pre-existing documentation according to its role or connection in the UI integration model.

FIGS. 4A through 4G illustrate and describe portions of a general UI modeling landscape used to create and populate one or more UI integration models. In many cases, the various models in the landscape may be created by UI and application developers. Importantly, prior to creation of a UI integration model for a particular UI modeling landscape, no common modeling environment exists for users to easily understand how each of the models interact and are used together.

FIG. 4A depicts an example UI modeling landscape 400 that provides users and developers with an overall view of the various models 104 included or associated with a particular modeled application 124. In some situation, the UI modeling landscape 400 can include:

a UI map 402 providing a visual representation, or model, of one or more business areas (and the work centers associated with those business areas) present in a particular modeled application 124;

a work center model 404 illustrating the various UIs and components associated with and available from a particular work center;

a UI navigation model 406 illustrating the various navigations and links from a particular component within the work center model 404 to one or more elements or components (i.e., UIs, menus, and screens) within the UI modeling landscape 400;

a UI integration model 408 (as described in FIGS. 3A-B);

a business task model 412 illustrating one or more tasks associated with a particular process component, as well as those tasks connections with particular UI entities and other components in a modeled application 124; and one or more configuration models 414 defining or illustrating one or more configurations of the modeled application 124 or portions thereof, as defined for a particular customer, event, or situation, or related application.

For reference, FIGS. 4B-4G and 6A-7D provide examples and further details for the models included in the UI modeling landscape 400. In general, the UI modeling landscape 400 illustrates one or more models 104 stored in memory 105 that are used to define a particular modeled application 124. The plurality of models 104 available in the modeling landscape 400 can describe and identify the interactions, relationships, and navigations to, from, and between various models 104 in a manner transparent to users and developers alike, allowing for simplified and streamlined UI and application development. Further, by allowing users and developers to work with and modify or add to the models 104, less work will be required to update or modify a modeled application 124. For instance, a business user (other than a technical user or developer), can add to or modify one or more of the models 104 to fit a preferred or desired configuration, such as by modifying certain components included in one or more models 104 in order to present information differently than as originally presented in the modeled application 124 distributed by an application developer. When those changes are made, data associated with and related to the components of the added and/or modified models 104 can be updated in memory 105 in order to reflect the changes to the particular configuration. Changes to certain models 104 are then propagated throughout the modeled application 124 such that any model or information related to the modified model or data can be reflected or acknowledged throughout the application 124. This solution allows business users to easily understand, and in some cases manipulate and/or modify the models 104 defining a modeled application 124, as well as the underlying data represented by those models 104, without obtaining detailed technical knowledge as to the data used to create the models.

FIG. 4B represents a portion of the UI Map 402 illustrated in FIG. 4A. The UI Map 402 provides a visual representation, or model, of one or more business areas associated with a particular UI modeling landscape 400. While only an example Supplier Relationship Management business area 418 is illustrated here, the UI Map 402 may represent or include additional business areas relevant to the particular user or developer interacting with the modeling environment 116. For instance, in the present case, the user or developer's role may be limited to actions related to the Supplier Relationship Management business area 418. In alternative situations, the user or developer's role may include additional business areas, such as Customer Relationship Management, Human Resource Management, and any other business area relevant to the user or developer's role.

In general, the UI Map 402 provides the user or developer with a general model of the UI's relevant to the role(s) of the user or developer accessing the UI Map 402 associated with a particular modeled application 124. In particular, the UI Map 402 can present the user or developer with models for one or more business areas associated with the application 124, as well as the various work centers available in or associated with each such business area. For example, in the portion of the UI Map 402 illustrated in FIG. 4B, the example Supplier Relationship Management business area 418 is shown as including eight (8) work centers: Managing Purchasing, Purchase Requests and Orders, Sourcing and Contracting, Intrastat, Goods and Services Receipts, Supplier Invoicing, Supplier Base, and Product Portfolio. The user or developer can activate (i.e., single-click, double-click, mouse-over, etc.) one of the modeled components or UI elements representing a particular work center, such as the element associated with the Supplier Invoicing work center 420, to navigate to or be presented with the work center model 404 associated with the Supplier Invoicing work center 420 (illustrated in FIG. C).

FIG. 4C depicts the work center model 404 for the Supplier Invoicing work center 420. In particular, the work center model 404 is meant to provide an overview of all UIs and screens available from a particular work center, as well as how the UIs and screens are available from the particular work center. Generally, a work center model 404 illustrates the UIs available in or from a particular work center. For instance, FIG. 4C illustrates several types of UI entities or components available from the Supplier Invoicing work center 420. As shown, an Overview work center view 422 may be provided that represents the UI or screen viewed by the user or developer when initially accessing or logging into the particular work center 420. In some instances, the Overview work center view 422 may provide a generic background for the other UIs within the work center. In other instances, the Overview work center view 422 may represent an initial landing page or UI for users or developers working within or accessing the Supplier Invoicing work center 420. Additionally, a plurality of other UIs available from the work center 420 are also illustrated, and may comprise, for example, one or more work center views and/or floor plans.

As illustrated in the Supplier Invoicing work center 420 of FIG. 4C, four (4) work center views (other than the Overview work center view 422) are shown: Worklist OWL, Invoice Entry OWL 424, Invoices and Credit Memos OWL, and Evaluated Receipts Settlement OWL. As defined by the inclusion of the term "OWL" in the name, each of these work center views represent a particular object worklist (OWL). Generally, an OWL is a list of business object instances which are to be displayed in the content area of a work center. The set of business object instances is relevant to the activity or task associated with the particular work center (here, the Supplier Invoicing work center 420) or OWL, and each item of a particular OWL may contain a link to various details about the particular business object instances. By activating a particular work center view (i.e., through a single-click, double-click, mouse-over, etc.), the details of that work center view can be viewed.

The Supplier Invoicing work center 420 also comprises eight (8) floor plans in the example work center model 404 of FIG. 4C: QAF New Invoice 426, QAF Invoice Overview 425, OIF Edit Invoice 428, QAF New Credit Memo, OIF Edit Credit Memo, QAF Credit Memo Overview, QAF Exception Log, and QAF Forward for Clarification. Each floor plan can define a particular type of UI screen. Generally, a floor plan defines the composition of a set of user interface building blocks that will be displayed on the screen. Further, the floor plan represents the general behavior, data flow, and visual layout of a pattern-based application or activity. As with other UI building blocks, the floor plan may be configurable and adaptable to specific uses. Modeling the relations between UI building blocks in a floor plan provides the configuration of the floor plan itself. In some instances, depending on the type of floor plan and the access level of the user or developer, only certain user interface building blocks and sequences may be allowed in a floor plan. In the present example, three (3) types of floor plans are contemplated (which may be stored via attributes in the model)—a Quick Activity Floor Plan (QAF), an Object Instance Floor Plan (OIF), and a Guided Activity Floor Plan (GAF)—although additional floor plans may also be used in other implementations. In the example of FIG. 4C, six (6) floor plans (i.e., common tasks 430) can be accessed directly (i.e., via one click or a single activation) from this work center despite the fact that they are contained in another work center, and in some instances, even another business area. This is due to the fact that the common tasks 430 are typical or common links from the work center. In this particular instance, when a user works on invoices, one common task is to investigate the purchase orders, contracts, or suppliers associated with that invoice. Therefore, the illustrated Supplier Invoicing work center 420 enables navigation to these common tasks 430 via object—based navigation, or an association of the underlying business object invoice associated with the Supplier Invoicing work center 420 to the underlying business objects purchase order, contract and supplier associated with the illustrated floor plans.

Floor plans can embed three UI building blocks: a title, a content pattern with the core functionality of the floor plan, and a navigation pattern providing a contextual panel to find the navigation targets for a user or developer in the context of the floor plan. In general, a QAF can be used (1) when displaying the most important attributes of a business object and its related functionality, (2) when creating, editing, and acting on an object where all fields of the object can be displayed on a single page, (3) when the activity can be completed immediately and quickly within a single screen, and (4) when the business activity can be executed quickly with direct, incremental input. The QAF may be less effective (1) when the information associated with the business object does not fit on a single screen, (2) when editing, configuring, or reviewing an object requires a number of screens or steps to complete the activity, or (3) when the data displayed must be layered using tabs (e.g., above a table, etc.). For instance, the QAF may be defined for or associated with an invoice business object, and the QAF can provide all information regarding the invoice along with the ability to modify or edit the invoice's information.

An OIF is generally used for more complex objects, particularly (1) when editing complex objects whose contents cannot be displayed on a single screen, (2) when editing objects with complex data relationships (e.g., a purchase order that has suppliers, bills of materials, contract information, etc.), (3) when editing a plurality of properties for a complex business object, or (4) when displaying the results of an object search. The OIF may be less effective (1) when an object or activity can be edited or created using a single screen (a QAF may be preferred), or (2) when an object or activity is edited or created in a specific, ordered format (a GAF may be preferred).

The GAF is similar to the OIF, but is best used (1) when creating a new, complex object, (2) when configuring multiple business objects in a single activity flow, (3) when an activity can be structured as a sequence of steps, (4) when the fields required to complete the activity cannot fit on a single screen, and (5) when the user guidance is required through a configuration sequence. The GAF is generally less effective, or should not be used, (1) when the fields needed to complete the activity can be configured in a single screen (a QAF may be preferred) or (2) when random access to all areas of a complex business object is necessary (a OIF may be preferred). In some instances, the substance and design of each floor plan does not differ between user roles. However, access to certain fields and activities within those floor plans may be determined based upon user roles or other permissions. For instance, one user may be able to add or edit all data associated with certain fields within an invoice QAF, while another user may only have access to read the data within the invoice QAF, or, in some instances, only to modify certain fields with the invoice QAF.

Returning to FIG. 4C, a set of additional floor plans 430 is shown on the right side of the figure, outside of the Supplier Invoicing work center 420. These represent common activities that may be associated with the Supplier Invoicing work center 420. For instance, when a user is working in the Supplier Invoicing work center 420, a related activity associated with that work may involve a purchase orders floor plan, a contracts floor plan, or a suppliers floor plan, among others. These common activities, while not necessarily included within the Supplier Invoicing work center 420 itself, may be included within the work center model 404 to represent one or more activities common to users and developers working with the Supplier Invoicing work center 420. For other work centers, relevant activities common to those specific work centers can be associated with the corresponding work center models (but not necessarily included within the work center model itself) to provide quick and easy navigation to the common activities. In some instances, these activities may not be included in any work center, but instead may act as standalone screens that are not tied to any one work center. In those instances, the common tasks can be reached from any work center modeled such that the standalone screens can be navigated to or activated from the work center (or other UI).

To navigate to the one or more UIs associated with one of the work center views or floor plans illustrated in the work center (here, Supplier Invoicing 420), the user or developer can activate (i.e., single-click, double-click, mouse-over, etc.) the appropriate or desired UI element or component. FIG. 4D shows where the user or developer has activated the Invoice Entry OWL 424 UI element of the Supplier Invoicing work center 420. By activating the Invoice Entry OWL 424, the user or developer may be directed to the UI navigation model 406 associated with the Invoice Entry OWL 424. The UI navigation model 406 illustrates the activated (or selected) UI element (Invoice Entry OWL 424) in the center of the model, with the available navigations from that UI element mapped in the model. For instance, in FIG. 4D, the arrows extending from the Invoice Entry OWL 424 UI element represent the available links and relationships in the Invoice Entry OWL 424 to a plurality of other components within the modeling landscape. In this example, the UI navigation model 406 shows that ten (10) floor plans are linked to the Invoice Entry OWL 424. Each of the links are associated with a particular name (shown adjacent to each arrow connecting the Invoice Entry OWL 424 to a particular floor plan). In some instances, these names can represent the title of the hyperlink, button, or other UI element used on the actual Invoice Entry screen to navigate to the associated floor plan. For instance, a button named "New Invoice" can be activated from the Invoice Entry screen to navigate to or activate the screens and activities associated with the QAF New Invoice floor plan 426. In still other instances, each link, button, or other UI element represented on the screen for each UI element associated with the Invoice Entry OWL may be named based upon the work center view or floor plan it represents. In those instances, the link or button associated with QAF New Invoice floor plan 426 will be identified as "QAF New Invoice."

A comparison of FIGS. 4C and 4D show a significant overlap in the illustrated floor plans. For instance, the Supplier Invoicing work center 420 includes a UI element for both the Invoice Entry OWL 424 and the QAF New Invoice 426, while the UI navigation model 406 for the Invoice Entry OWL 424 also includes a link to QAF New Invoice 426. In this instance, QAF New Invoice floor plan 426 is known at both the work center model level and at the UI navigation model level. In most cases, the elements associated with a particular UI navigation model 406 will be known (and therefore illustrated in) the work center 420 of the illustrated work center model 404. In some special cases, however, one or more floor plans and other UI elements will not be shown at the work center model level, but will be illustrated and available at the UI navigation model level 406. For instance, in FIG. 4D, the Document Fact Sheet floor plan 431 is shown only in the UI navigation model 406, and not in the work center model 404 for the Supplier Invoicing work center 420. This special case may occur in models where the floor plan or other component that is shown only at the UI navigation model level is a minor activity, or where the component, UI, or screen is not necessary from or important to the work center model 404. Further, the activities associated with these special cases may be performed using a child view from the work center view or floor plan they are associated with. In some instances, these child views may be represented as a pop-up screen during the actual use and navigation through the associated UIs and screens embodied by the models (as opposed to navigation to an entirely new screen or other UI). These special cases may be needed because the particular work center model 404 may become unreadable if all possible navigation paths were illustrated in the same model (or view thereof).

Figure 4E:
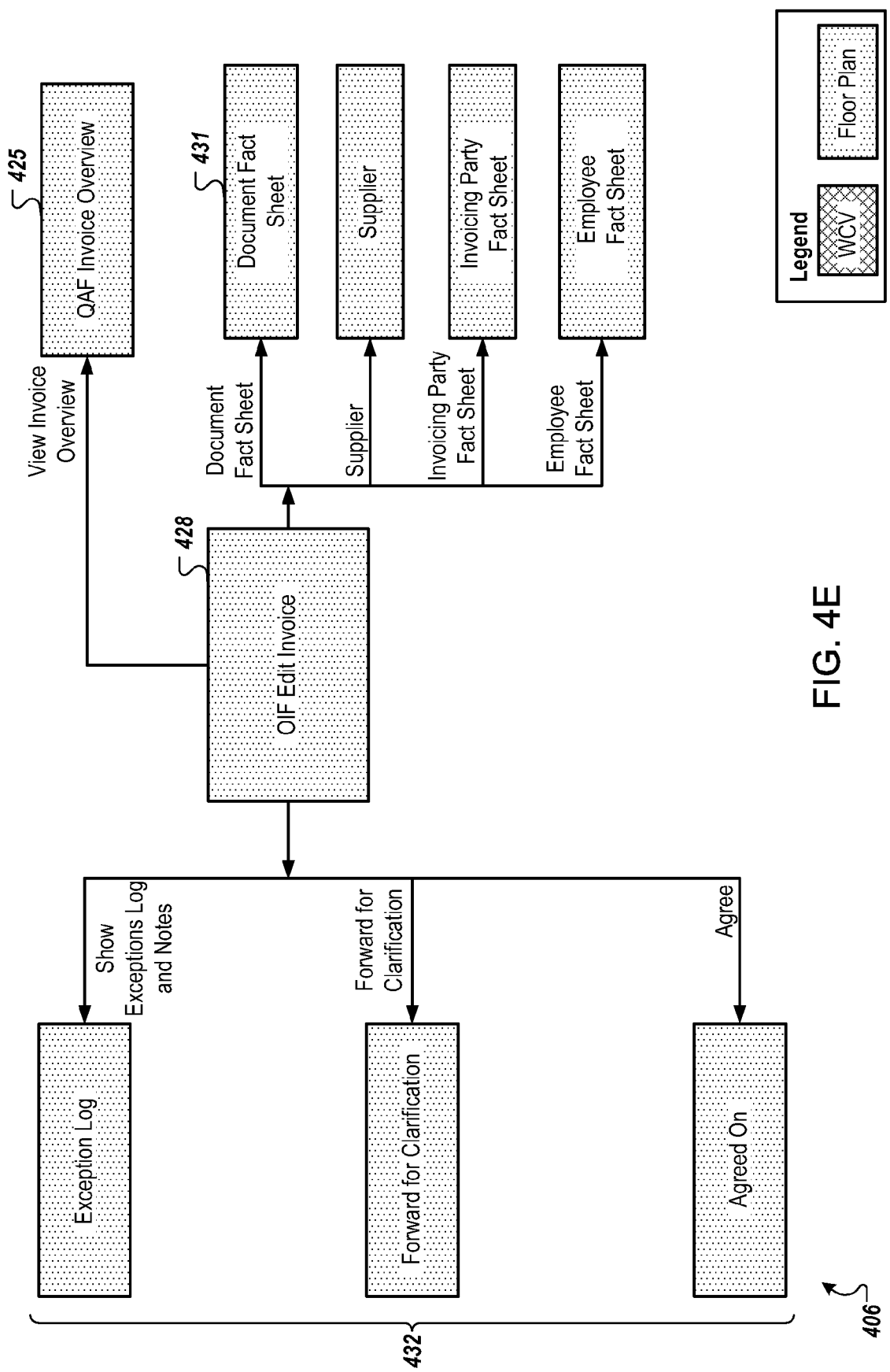
Figure 4F:
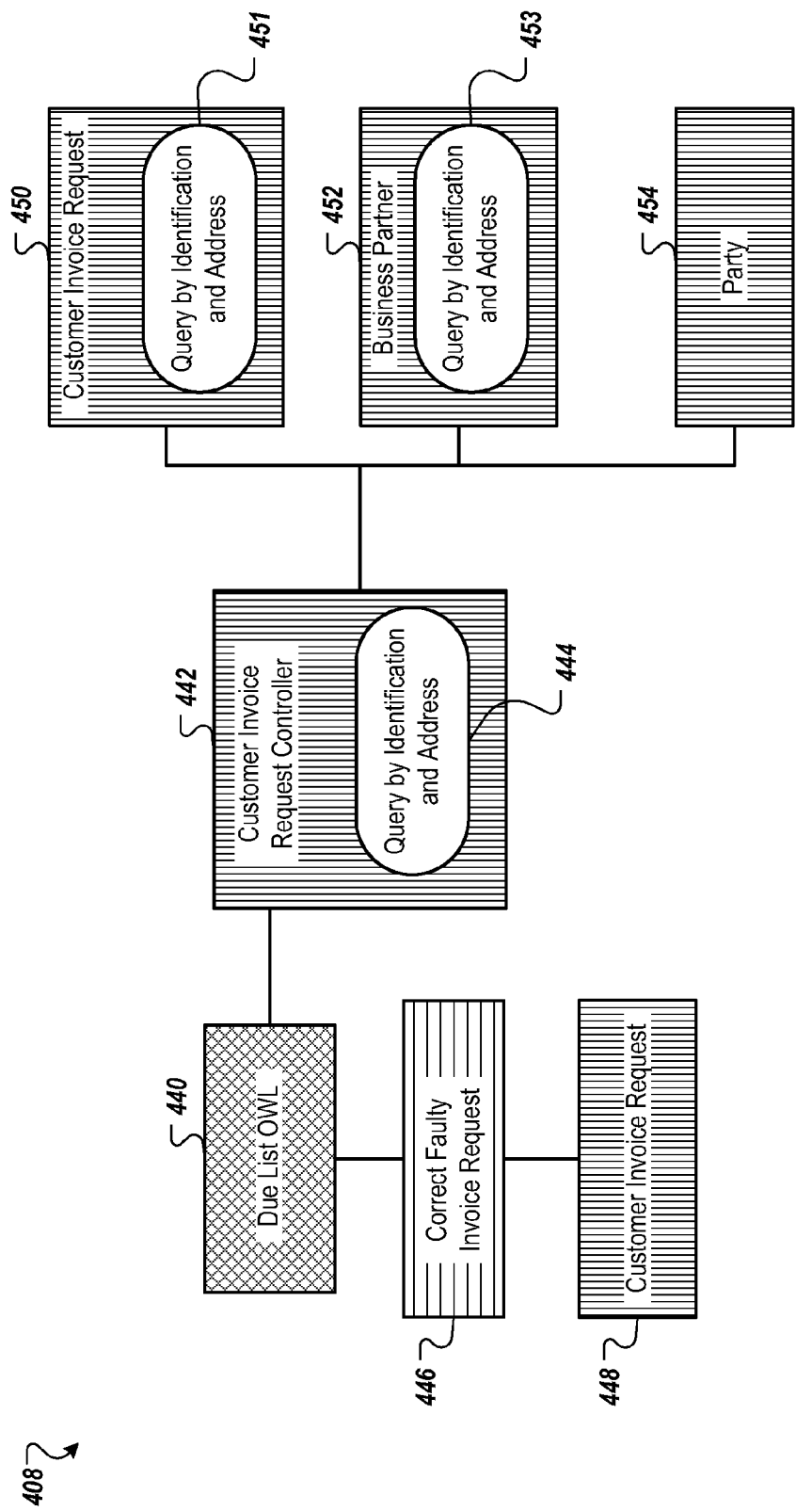
Figure 4G:
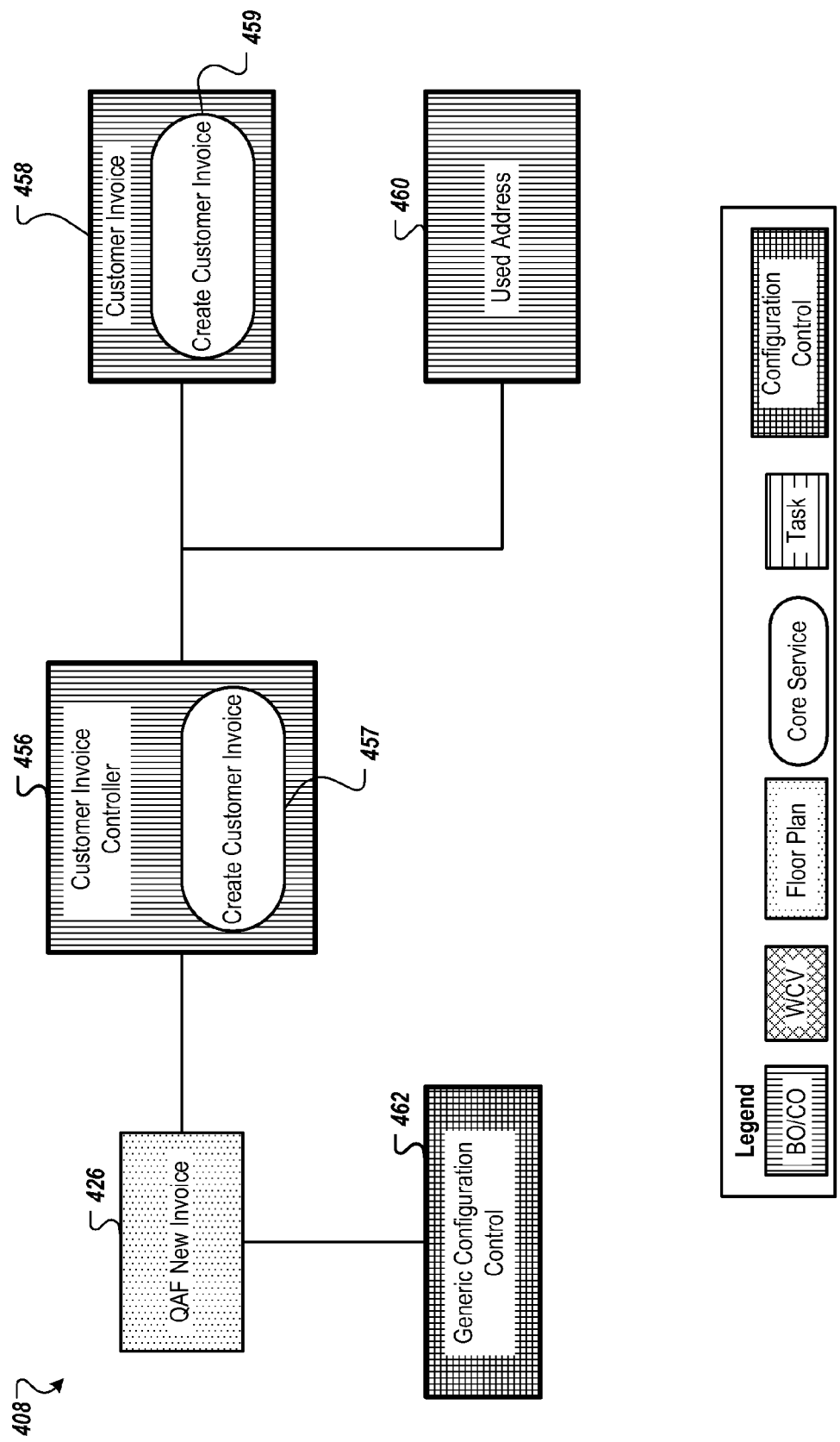

FIG. 4E is an illustration of an example UI navigation model 406 for the OIF Edit Invoice floor plan 428. In this example, the OIF Edit Invoice floor plan 428 is known both in the Supplier Invoicing work center model 404 as well as the UI navigation model 406 for the Invoice OWL entry 424. Therefore, the UI navigation model 406 for the OIF Edit Invoice floor plan 428 of FIG. 4E may be navigated to or accessed via either the work center model 404 of FIG. 4C, the UI navigation model 406 of FIG. 4D, or through any other connections or links with the OIF Edit Invoice floor plan 428 in the modeling landscape 400. For example, users or developers may access the OIF Edit Invoice floor plan 428 by activating the associated UI element from any model where the OIF Edit Invoice floor plan 428 is included or linked. As was the case in the UI navigation model of FIG. 4D, some portions (i.e., floor plans) common to the other models are included in FIG. 4E. For instance, the QAF Invoice Overview floor plan 425 is shown as a link for the OIF Edit Invoice floor plan 428 in FIG. 4E, as well as a link for the Invoice Entry OWL 424 in FIG. 4D. Similar to the Invoice Entity OWL UI navigation model 406 of FIG. 4D, the OIF Edit Invoice floor plan 428 includes a set of floor plans 432 that are not illustrated in the work center model 404: Exception Log floor plan, Forward for Clarification floor plan, and Agreed On floor plan. Again, these child views may generally represent UIs and other screens that are not important to the overall usage and activities of a particular work center, but that may be important or relevant to the particular work center view or floor plan where they are located. In some instances, these child views may represent pop-up windows or screens that appear on top of or in conjunction with the OIF Edit Invoice UI, but that will not cause the application 124 to navigate away from the OIF Edit Invoice UI.

The models illustrated in FIGS. 4C-4E explain the navigation inside and throughout the particular UIs associated with those figures. These models can be used, for example, to demonstrate to users, developers, and potential customers the possible navigations through all of the available UIs and related screens. In other instances, these models can be adapted via the modeling environment 116 by users and developers to perform or represent the navigations required or desired according to a particular design or for a particular solution. By providing users and developers with a set of easy to understand navigational models (such as those of FIGS. 4C-4E), the level of documentation required for a user, developer, or customer to understand an application is greatly reduced. Specifically, these models can allow business users (non-technical or non-design personnel) to review, understand, and/or modify the navigations in at least a portion of the modeled application 124 quickly and easily without requiring a detailed understanding of the navigational models.

FIGS. 4F and 4G illustrate example detailed UI integration models 408 for a Due List OWL (FIG. 4F) and for the QAF New Invoice 426 (FIG. 4G). The UI integration models were described in detail in FIGS. 3A and 3B, and will be briefly described for the following examples. As illustrated in FIG. 4A, the UI integration model 408 can be viewed or accessed via the work center model 404 or the UI navigation model 406 through activation of one or more of the modeled components in those models. In some instances, the user or developer may use an alternative activation method (i.e., mouse right-click and selection of UI integration model, etc.) as opposed to the activation methods used to connect or navigate between the work center model 404 and the UI navigation model 406. In other instances, activating a link in the work center model 404 may be the same regardless of whether the user or developer intends to view the UI navigation model 406 or the UI integration model 408 for a particular element. In those instances, after activating a particular UI element, the modeling environment 116 may provide the user or developer with a prompt or other method of inquiry at GUI 142 as to which of the two models are to be viewed. Still further, if the user or developer activates a particular component in the UI navigation model 406, the modeling environment 116 may navigate to the UI integration model 408 by default upon that component's activation.

In general, the UI integration model 408 provides a model view describing the details of a particular UI element (such as a work center view or floor plan) associated with a particular work center model 404 (and therefore, a particular work center as well). In some instances, the UI integration model 408 provides detailed information relevant to a developer, but which may not be interesting or relevant to a normal business user. However, the information included in the UI integration model 408 can be used to explain how various models and components within the modeled application 124 are related and interact, and which can be useful to any user or developer within the modeling landscape 400. Particularly, the UI integration model 408 can show which business objects are accessed by a particular UI element, as well as how they are accessed (i.e., which service and common controller object are used to access the business objects). For instance, the UI integration model 408 can incorporate certain aspects of a Model-View-Controller (MVC) pattern to describe a particular UI element, such as a work center view or a floor plan. An MVC pattern is used to isolate business logic from user interface considerations, and allows for the development of applications where modifications to either the visual appearance of the application or to the underlying business logic can be made without affecting the other. In FIG. 4F, the model (or data) is provided by business objects, services, and tasks, and represents the information associated with the application and the business rules used to manipulate the data in the Due List OWL 440. The view associated with the MVC pattern is the actual UI element associated with the UI integration model 408, in the case of FIG. 4F, the visual representation of the Due List OWL 440. Then, the controller for the MVC pattern is a controller object that defines the details and actions associated with the particular component, or in other words, how the UI behaves. The controller object for a particular component (i.e., the work center view or the floor plan) can be defined manually during the modeling or development of the component, or automatically based on certain information or data stored in or communicably coupled to the modeling environment 116, such as data stored in the one or more models 104 associated with the component (and therefore the work center). Once the information regarding the particular controller object associated with the component is known, the process for generating the UI integration model 408 can be activated via one or more automated processes as described in FIGS. 3A and 3B.

In general, a controller object is associated with predefined details and descriptions that define the associations to business logic and data and the various actions or processes used to access that data. In some instances, the component (i.e., a work center view or a floor plan) can be associated with a particular controller object after the component has been designed, such that the functionality associated with the controller object is then implemented in and/or associated with the particular component. In particular, the controller object can define the various business objects and services associated with the component. By associating a particular controller object with a component, the component itself is then associated (in some cases, indirectly) with the business objects and services related to a particular controller object. For instance, in FIG. 4F, the UI integration model 408 illustrates that the Customer Invoice Request Controller 442 includes or is associated with a Query by Identification and Address service 444, and has defined connections to and/or links with a Customer Invoice Request business object 450 (which includes or is associated with a Query by Identification and Address service 451), a Business Partner business object 452 (which includes or is associated with a Query by Identification and Address service 453), and a Party business object 454. In some instances, the connection between the component (i.e., the Due List OWL 440) and the particular controller object (i.e., the Customer Invoice Request Controller 442) can be used to automatically populate the UI integration model 408 with the business objects and services associated with the particular controller object. In doing so, the creation of the UI integration model 408, which provides a detailed analysis of the particular UI element, can be quickly and easily generated and developed. Further, changes to a controller object associated with a component can result in immediate and automatic updates to the UI integration model 408, and by inheritance, the UI Map 402, the work center model 404, and the UI navigation model 406.

The UI integration model 408 also allows users and developers to further investigate the additional components illustrated in the model 408. For instance, by activating a particular business object included in the UI integration model 408, a detailed business object model can be provided that provides a detailed mapping or model of the various attributes (i.e., fields, data, etc.) associated with the activated business object. Additionally, by activating a particular service illustrated in the UI integration model 408, a model representing the service, including the particular business object attributes it accesses, can be shown. However, while these additional details are available through the UI integration model 408, business users may not be interested in such detailed information, or in some instances, should not be provided access to that information. In some instances, the business user may either not have access to these additional models, while in others, the business user may have limited read-only access.

Certain portions of the UI integration model 408 can be developed manually by a developer. For instance, using the modeling environment 116, the user or developer may specify a particular task to be associated with the component described by the UI integration model 408. In the particular instance of FIG. 4F, the Correct Faulty Invoice Request task 446 is present. Because the Correct Faulty Invoice Request task 446 is included in the UI integration model 408, the task will be visible on the UI for the Due List OWL. For instance, a link to the Correct Faulty Invoice Request task 446 will be available to users on the UI when working in the Due List OWL 440. As shown, the task is created and modeled to interact with and access the Customer Invoice Request business object 448. When the task 446 is activated on the UI screen, information from the Customer Invoice Request business object 448 can be accessed and the Correct Faulty Invoice Request task 446 can be performed. In some instances, the Correct Faulty Invoice Request task 446 can be performed automatically based on certain parameters associated with a received invoice. In other instances, the Correct Faulty Invoice Request Task 446 may be manually activated by a user working in the Due List OWL 440.

In another example, the Correct Faulty Invoice Request task 446, along with the Customer Invoice Request business object 448, can be automatically integrated into the UI integration model 408 based upon certain definitions and mappings included in a business task model 412. As will be described below with regards to FIGS. 6A-7D, as well as has already been described with regards to FIGS. 3A and 3B, the business task model 412 defines one or more tasks, as well as the interfaces and/or business objects that trigger those tasks. For instance, the Correct Faulty Invoice Request task 446 may be modeled to be associated with one or more of the business object instances associated with or referenced by the Due List OWL 440. For instance, if a Customer Invoice Request business object is associated with the Due List OWL 440, and the Correct Faulty Invoice Request task 446 is associated with and triggered by certain conditions associated with or linked to the Customer Invoice Request business object (through its definition in the business task model 412), then the UI integration model 408 will integrate the Correct Faulty Invoice Request task 446 into its model as described in FIGS. 3A and 3B. The Customer Invoice Request business object 448 is shown as connected to the Correct Faulty Invoice Request task 446 because it represents the business object on which the task 446 operates as defined in the business task model 412. Therefore, the connection between the task 446 and the business object 448 indicates that the Customer Invoice Request business object 448 will be modified or operated on when the Correct Faulty Invoice Request task 446 is performed.

When developing updates or modifying the modeled application 124, the UI integration model 408 and the connections it represents provide a clear view to developers of the consequences and effects of changes made to certain business logic (i.e., business objects, services, etc.) or other elements within the application 124. For instance, if each component is associated with a UI integration model 408, the effect of any change to a particular business object can be quickly and easily assessed. Because certain business objects are associated with and/or linked to certain controller objects, the UI integration models 408 can quickly provide developers with knowledge regarding which components (i.e., work center view, floor plans, etc.) have also been modified based on the business object change. If changes to a business object (i.e., the Business Partner business object 452) affect a particular component (i.e., the Due List OWL 440), developers will understand that change and be able to modify the necessary or related elements in the modeling environment 116 without requiring or performing a detailed analysis of written documentation or manual searching for the effect or result of a particular modification or design alteration. This enhanced change analysis provides for improved transparency for business users, technical users, and any other developers working with the application 124. Additionally, development quality can be improved because the UI navigation model 406 and the UI integration model 408 allow for easy testing of designs.

FIG. 4G depicts a second example UI integration model 408 for the QAF New Invoice floor plan 426 (previously shown in the work center model 404 of FIG. 4C and the UI navigation model 406 of FIG. 4D). The UI integration model 408 of FIG. 4G is similar to the integration model 408 of FIG. 4F in that the component associated with the integration model 408 is associated with a particular controller object (in FIG. 4G, the Customer Invoice Controller 456), which in turn is associated with particular business objects and services. In the example of FIG. 4G, the QAF New Invoice floor plan is associated with a Custom Invoice Controller 456 (which includes or is associated with a Query by Identification and Address service 457), with the controller 456 having connections and/or links to a Customer Invoice business object 458 (which includes or is associated with a Query by Identification and Address service 459), and a Used Address business object 460. Further, although no tasks are included in the UI integration model 408 for the QAF New Invoice floor plan 426, a generic configuration control 462 is shown as connected to the floor plan 426. In general, configuration controls allows certain UIs, UI elements, components, process components, business objects, and other elements within the modeled application 124 to be activated or deactivated based on certain situations, events, environments, and/or customer-specific configurations of the application 124. For instance, certain customer environments may not receive invoices, and may be limited to credit memos. The configuration control 462 may represent the parameters associated with whether or not the QAF New Invoice floor plan 462 is necessary or should be activated in a particular instance of the modeled application 124. Configuration entities may also be associated with work center views, other types of floor plans, business objects, and any other appropriate elements within the application 124 or modeling environment 116. By activating the generic configuration control 462, the user or developer can navigate to one or more configuration models 414. While the configuration models 414 are not described in detail in this disclosure, they are meant to represent models defining the various configurations and criteria for when and where a particular configuration control 462 activates or deactivates its associated component (here, the QAF New Invoice floor plan 426), as well as other configuration possibilities or criteria associated with the UI integration model 408 and the modeled application 124 in general. Generally, the configuration models 414 illustrate how a particular configuration of the application 124 will respond in a particular environment or to a particular event, and how that configuration affects the particular instance of the modeled application 124.

Although not illustrated in the UI integration models 408 of either FIG. 4F or 4G, each UI integration model 408 is associated with a work center (in these examples, the Supplier Invoicing work center 420). The association with the Supplier Invoicing work center 420 is implied in FIGS. 4F and 4G, and may be illustrated in alternative implementations, such as the UI integration model 350 described in FIG. 3B. FIGS. 4F and 4G may each be a view 144 of a larger and more complete UI integration model 408. For example, a complete UI integration model 408 for the Supplier Invoicing work center 420 would include information on and connections to each of the work center views and floor plans modeled in the work center model for the Supplier Invoicing work center 420 as illustrated in FIG. 4C, as well as the connections and links to various controller objects, business objects, tasks, and other relevant components for each of those work center views and floor plans. Therefore, the views 144 of FIGS. 4F and 4G limit the viewable portions of the UI integration model 408 to a single component. Some views 144 may show UI integration model representations for two or more components, while still other views may show modeled representations for all components associated with the work center and its work center model 404.

Figure 5A:
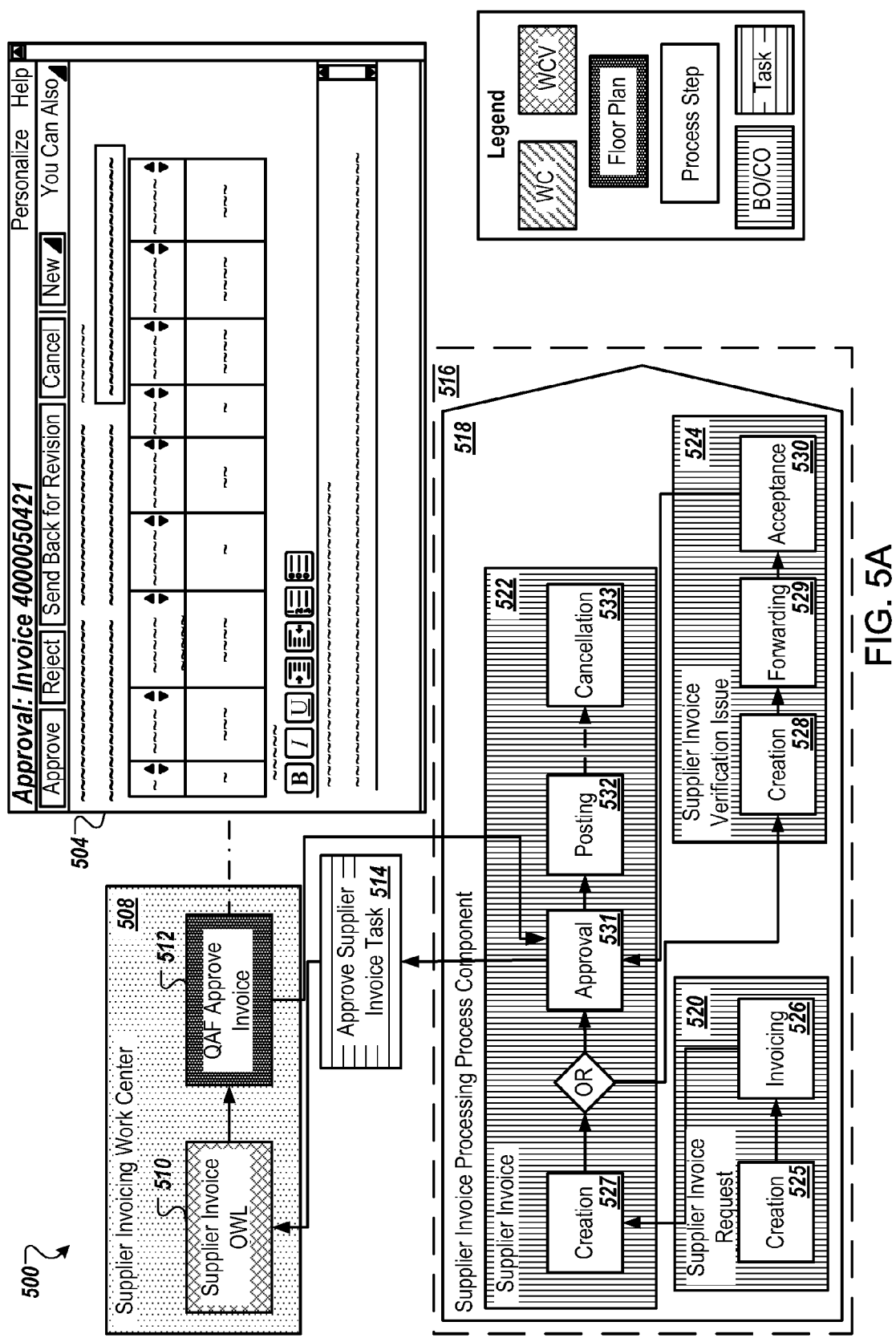
FIGS. 5A-B illustrate examples of process flow models integrated or enhanced with information defined in one or more generated UI integration models
Figure 5B:
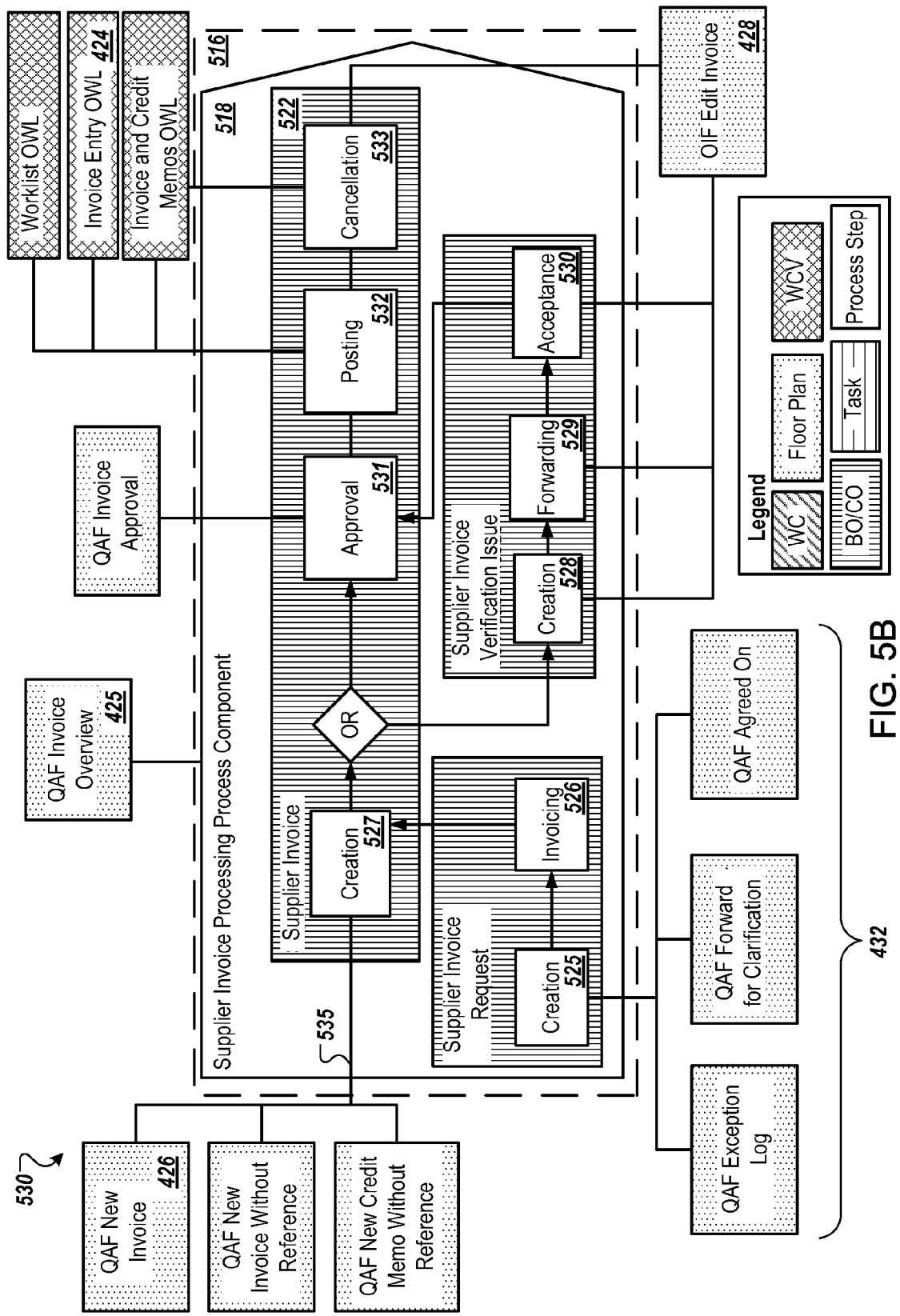
Figure 5C:
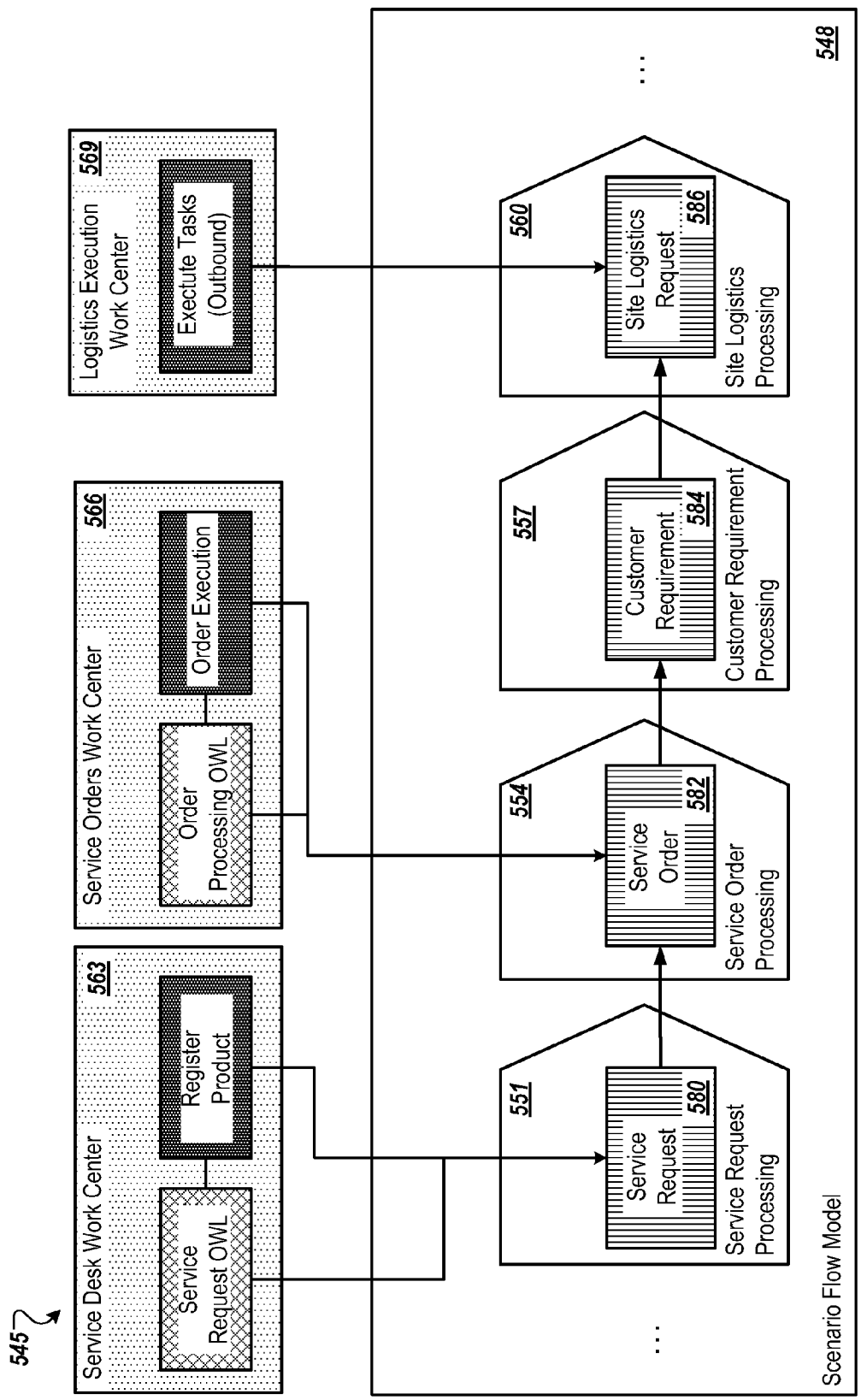
FIG. 5C illustrates an example of a scenario flow model integrated or enhanced with information defined in or more generated UI integration models.

FIGS. 5A-5C illustrate examples of how one or more UI integration models can be used to enhance several models currently provided to or generated by users and developers within a specific system to define a particular process or scenario associated with a modeled application 124. Specifically, FIGS. 5A and 5B illustrate how the UI integration model can be integrated into a process flow model 516, while FIG. 5C illustrates how the UI integration model (or a subset of information therefrom) can be associated with a scenario flow model 548.

Generally, a process flow model illustrates one or more process steps associated with and/or used in a particular process component to perform one or more processes. In FIGS. 5A and 5B, the process flow model for processing a supplier invoice is illustrated. As shown, three particular business objects are included within the Supplier Invoice Processing process component and used to process the supplier invoice: the Supplier Invoice Request business object 520, the Supplier Invoice business object 522, and the Supplier Invoice Verification Issue business object 524. In the Supplier Invoice Request business object, a supplier invoice is created at process step 525. The supplier invoice request is then invoiced at process step 526, also within the Supplier Invoice Request business object 520, which allows the request to be sent to the Supplier Invoice business object 522. At process step 527, the supplier invoice is created. Once created, the Supplier Invoice may be immediately approved at process step 531, or it may be provided to the Supplier Invoice Verification Issue business object 524 where the supplier invoice is to be verified. If sent to the Supplier Invoice Verification Issue business object 524, a verification issue is created at process step 528. The issue is then forwarded at process step 529, and accepted at process step 530. If the issues associated with the supplier invoice are fixed and/or approved, process step 530 sends the process flow model 516 back to the Supplier Invoice business object 522, where the supplier invoice is placed into approval at process step 531. Once approved, the supplier invoice can be posted at process step 532. In the final step of process flow model 516, the supplier invoice can be cancelled at process step 533. Additional steps may be included in the supplier invoicing process flow model 516, but may have been omitted in the present description. The process flow model 516 illustrated in FIG. 5A is meant to be an example process flow, and it should be understood that fewer or additional steps may be included in the process flow model, in addition to a different or modified order of those steps shown.

In general, each process step can be associated with or trigger one or more tasks to perform the defined process step within the process flow model. Because the UI integration model defines connections between one or more tasks and different components and UI entities within the modeling landscape 400 (as described in FIGS. 3A-3B and 4F-G), such as a specific work center view or floor plan, the tasks and their associated UI integration models can be added to or integrated with the process flow model. For instance, a task triggered by a process step can be displayed in the integrated process flow model. Using the information defined by the UI integration model, the components associated with the task, such as a work center view or floor plan, can be integrated into the process flow model as well. By combining the process flow model and the UI integration model, business users and develops can easily view the interaction between specific UIs defined in the modeling environment 116 and particular process flow models describing how a particular process is performed. The overall view of how these models interoperate provided by this integration can present all users (whether technical or not) a quick and transparent understanding of how the certain processes work together with one or more UIs.

As illustrated in FIG. 5A, the approval process step 531 is defined to trigger an Approve Supplier Invoice task 514 to perform the approval of the supplier invoice. The Approve Supplier Invoice task 514 is defined in a business task model, with the task being associated with a particular UI entity or component in a previously defined UI integration model. The appropriate UI integration model (or the relevant portion of a larger UI integration model) can be retrieved by the modeling tool 140 or other software in the modeling environment 116, and added to the process flow model 516. For example, the Approve Supplier Invoice task 514 is associated with the Supplier Invoice OWL 510 (which may be part of the Supplier Invoicing work center 420) as defined by the UI integration model associated with the Supplier Invoice OWL 510. The relevant UI integration model (or at least a portion thereof), including the Approve Supplier Invoice task 514, can then be automatically connected to approval process step 531 in the process flow model 516. The UI integration model further illustrates that the Supplier Invoice OWL 510 is connected to a QAF Approve Invoice floor plan 512, where the supplier invoice being processed by the process flow model at process step 526 can be modified. For instance, UI 504 can illustrate a particular UI presented to a user when working with a particular supplier invoice, and in some instances, allows the user to modify certain attributes of the particular instance of the Supplier Invoice business object 522 being modified by the process of the process flow model 516.

By adding (or integrating) the UI integration model into the process flow model, greater transparency for both the process flow model and the UI integration model are provided. For instance, if a particular process step in the process flow model is modified, then the UI integration model associated with that process step may be automatically modified or changed and displayed to the user interacting with the new process flow model. Further, if the UI integration model changes (based on a modification to the related business task model or one of the components within the work center), the process flow model can be updated then as well. Further, if a customer or developer elects to modify a process or UI entity/component, the integrated process flow model allows the consequences or results of each change to be quickly (and in some cases, immediately) apparent to the user or developer. Changes to either model can also result in an automatic notification being sent to users and developers associated with any of the entities, components, or models affected by the change. The information contained in these integrated models can be used in various ways by the customer depending on the infrastructure available. For example, coming from a UI entity, all process flow models and/or scenario flow models can be shown that are assigned to that UI entity. If the user chooses one of these models, the relation can be shown at various levels of detail. For example, a work center associated with a business object or process component of the process flow can be shown, as well as the work center views and floor plans associated with particular tasks, business objects, or even process steps within the process flow. Alternatively, coming from the process flow model or scenario flow model, a user can choose to see the work centers assigned to this model, and then the work center views and floor plan contained in those which are assigned to the appropriate flow. In more specific examples, selecting a particular process step may illustrate the floor plans which act on that particular process step and the work centers those floor plans are contained in. Similar indications can be performed for a selected business object or task.

FIG. 5B illustrates a variation on the integration between the process flow model and the UI integration model. In this instance, the integration of the process flow model and the UI integration model may be used to identify which UI entities or components are associated with certain process steps in the process flow model. The integrated process flow model of FIG. 5B may provide an interactive process flow model allowing users to expand or collapse views or representations of the connections between one or more of the process steps and their associated UI entities or components. Using the connections between one or more tasks and a particular process step as defined in the integrated process flow model of FIG. 5A, one or more UI entities or components may be associated with each process step. The integrated model 530 of FIG. 5B provides an illustration of the particular UI entities or components that are associated with each particular process step. For instance, the creation process step 527 of the Supplier Invoice business object 522 is illustrated as being connected to and/or associated with three particular components (as illustrated by connection 535)—the QAF New Invoice floor plan 426, the QAF New Invoice Without Reference floor plan, and the QAF New Credit Memo Without Reference floor plan. Those three floor plans (or UI entities or components) may be defined in the UI integration model associated with the creation process step 527 (via a particular task triggered by or associated with the creation process step 527). Because each of the those components are viewable or available for the particular process step, users and developers can use the integrated process flow model 530 of FIG. 5B to determine which screens or components are associated with each process step. As also illustrated in FIG. 5B, work center views (such as the Invoice Entry OWL 424) may also be associated with a particular process step, in addition to floor plans.

In some implementations, a particular user or developer viewing the integrated process flow model 530 of FIG. 5B may activate (i.e., single-click, double-click, mouse-over, etc.) one or more of the process steps illustrated for the particular process flow model 530 in order to expand or collapse the connections to the various UI entities or components associated with a particular process step. For instance, initially, the process flow model 530 may not show any of the UI entities or components for any of the process steps. Only by activating a particular process step would the related UI entities or components be shown. In other instances, upon initially viewing the process flow model, the UI entities or components associated with each process step may be available. Additionally, the user or developer may be able to elect to show all or none of the UI entities or components associated with the process steps at any particular instance. Further, in some instances, on the UI entities or components that are modified or used to perform a certain process step may be included in the process flow model 530 of FIG. 5B. The entities and components that merely present static information to a user may be omitted from the process flow model 530. Alternatively, all UI entities and components may be included in the process flow model 530, whether modified by a particular process step or merely presenting the information associated with that process step. In another example use of FIG. 5B, users and developers reviewing the integrated process flow model 530 may be able to view the UI navigation model, UI integration model, or other models associated with one or more of the illustrated UI entities or components by activating those components in the process flow model 530.

Turning to FIG. 5C, a scenario flow model 548 integrating one or more UI entities or components associated with various process components within a scenario flow to create an integrated scenario flow model 545 is illustrated. In general, a scenario flow model illustrates the interactions and connections between one or more process components that are used to perform a particular business scenario. For instance, the scenario flow model 548 illustrated in FIG. 5C describes a portion of a scenario for receiving and processing a service request from a customer. As is shown, the service request is received and processed using the Service Request Processing process component 551 and a Service Request business object 580. The information (or a message) from the Service Request Processing process component 551 is sent to the Service Order Processing process component 554, which uses an instance of a Service Order business object 582. The Service Order Processing process component 554 sends a message or other information to the Customer Requirement Processing process component 557 (which uses an instance of a Customer Requirement business object 584), which then sends a message or other information to a Site Logistics Processing process component 560 (which uses an instance of a Site Logistics Request 586 business object). Although not shown here, additional process components can be used to continue and complete the defined scenario.

As illustrated in FIG. 5C, the various business objects included within the process components of the scenario flow model 548 may be connected to or associated with one or more work centers. For instance, the Service Request business object 580 is associated with the Service Desk work center 563, the Service Order business object 582 is associated with a Service Orders work center 566, and the Site Logistics Request business object 586 is associated with the Logistics Execution work center 569. In some instances, the connections between these business objects and their associated work centers may be defined by or retrieved from one or more process flow models previously integrated with the one or more UI integration models (such as those illustrated in FIG. 5A). In those instances, integrated scenario flow models (such as integrated scenario flow model 545) may be generated by merely adding the integration information associated with each process component within the scenario flow model into the integrated scenario flow model 545. In some examples, only a subset of the UI entities or components (and/or work centers) associated with the process components of a scenario flow model may be illustrated. For example, certain work centers and/or components may be more important, or a parent to the other associated components, such that the subset of UI entities or components illustrated in FIG. 5C provides a general overview of the UIs and other components associated with a scenario, and not necessarily each and every UI entity or component available or used in the scenario flow model.

In some instances, the integrated scenario flow model 545 may be generated without using or previously generating integrated process flow models. In those instances, the connections between each process component, that process component's business objects, and the work centers may be dynamically (and/or automatically) defined when an integrated scenario flow model is requested or generated. Similar to the generation of the integrated process flow model 500 of FIG. 5A, the connections between the process components (and/or their associated business objects) and certain tasks defined in the modeling landscape 400 may be used to define the UI entities or components associated with each business object (and its related process steps).

The addition or integration of the UI integration models into both the process flow models (illustrated in FIGS. 5A-B) and the scenario flow model (illustrated in FIG. 5C) provides business users, developers, technical designers, and any other individual associated with the modeled application 124 with a clear and transparent understanding of the relationships between the backend processes and operations of the application 124 and the various UI entities and components created or defined for that application 124. Further, modifications to any portion of the application 124 (or the various models defining the application 124) can be immediately and quickly understood by a quick review of the new or updated connections in one or more of the models defined in FIGS. 5A-5C. The UI entities and components associated with or connected to a particular process component or process step can be understood by technical developers as well as business users, again providing a common modeling environment where even non-technical users can easily work with and modify the modeled application 124 to the requirements or demands of any implementation.

Figure 6A:
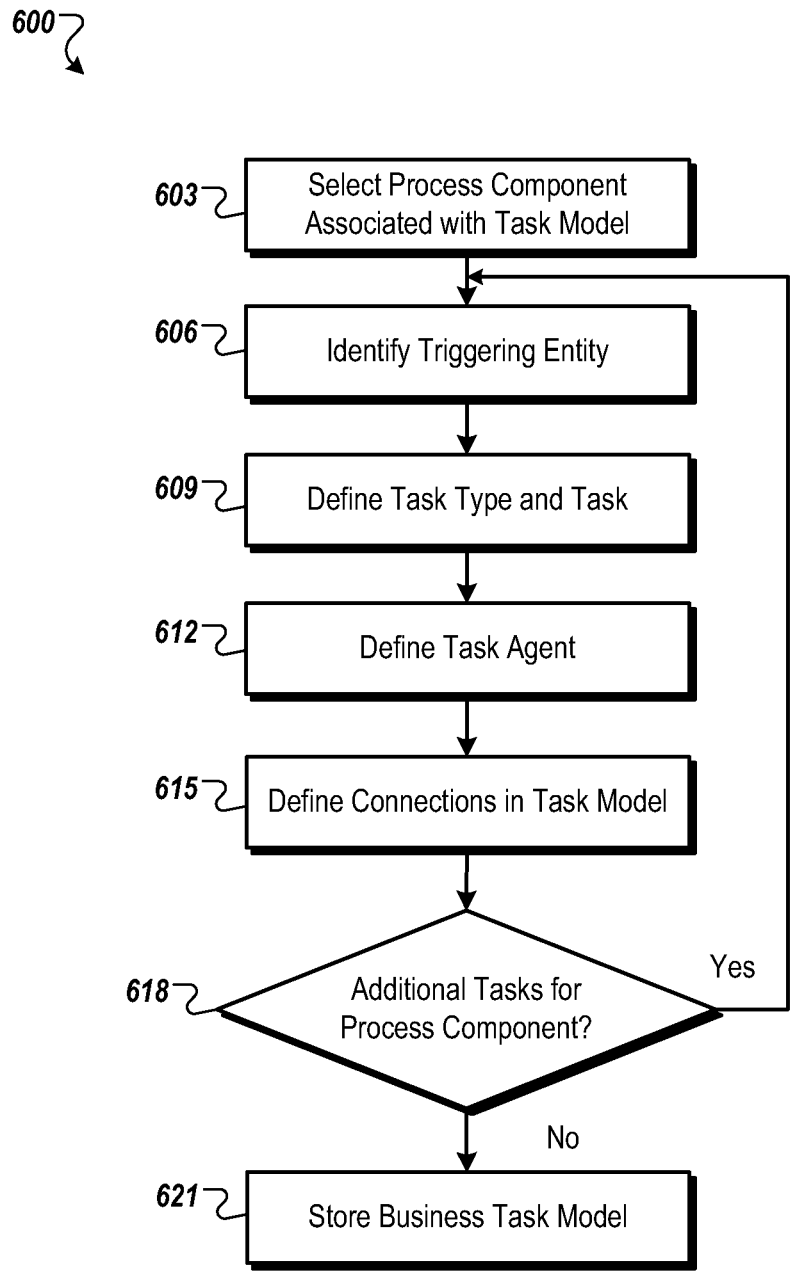
FIG. 6A is a flowchart illustrating an example method for generating a business task model defining one or more tasks associated with a particular process component.

The business task model 412 referenced in FIG. 4A is described in more detail throughout FIGS. 6A through 7B. For example, FIGS. 6A and 6B are flowcharts describing the process for creating and/or modifying one or more business task models 412 in the modeling environment 116, as well as the process for integrating the one or more business task models 412 into a UI modeling landscape 400 such as that illustrated in FIG. 4A. The integration of the business task model 412 into the overall UI modeling landscape 400 can provide additional transparency to the application 124 and its models 104, providing both business users and technical users with a transparent understanding and view of particular tasks integrated and associated with various components of the landscape 400 without requiring detailed and complicated written documentation describing each particular task. Further, the integration of the business task model 412 into the UI integration model 408 allows the tasks associated with a particular component (as shown in the UI integration model 408) to be easily understood and, if necessary, modified.

Figure 7A:
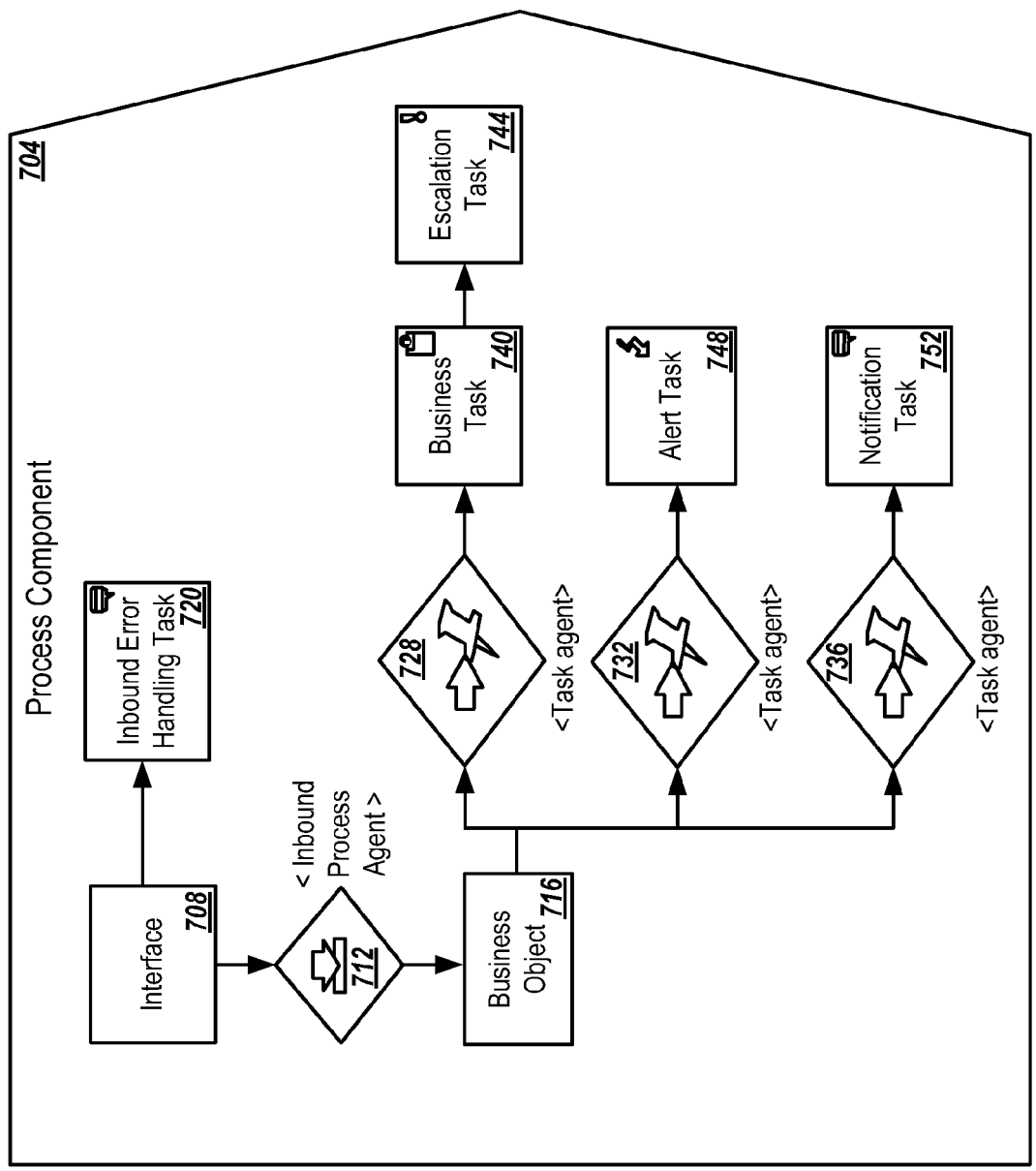
FIG. 7A-D illustrate examples of business task models generated in accordance with the steps of FIG. 6A.

FIG. 7A illustrates a generic example of a business task model 412. In general, a business task model 412 illustrates one or more task agents 728, 732, and 736 and tasks (or task types) 720, 740, 744, 748, and 752 for a single process component 704. Several different types of tasks can be included in the business task model 412, including a standard business task (i.e., business task 740, alert task 748, and notification task 752), an escalation task 744, and an inbound error handling task 720. Typically, these tasks are triggered by a task agent 728, 732, or 736. Inbound error handling tasks may be triggered by a generic task agent which, as is the case in FIG. 7A, may not be included in the business task model 412. Stated generally, the business task model represents software entities associated with a particular application 124 and provides a close link with the implementation of one or more tasks and/or process components.

A process component characterizes software implementing respective and distinct business processes and can define at least one process agent. Each such process agent enables communications between a business object associated with the corresponding process component and a business object associated with any other process component. The process component can characterize inbound operations to handle incoming messages associated with a modification or reading of data encapsulated in a business object associated with the process component. For instance, one or more of the inbound operations can be a synchronous operation operable to receive a synchronous message generated by an external synchronous outbound operation defined by an external process component. In some variations, one or more of the inbound operations is operable to receive a message of a first type and convert it into a message of a second type (see inbound process agent 712 of FIG. 7A). The process component can also characterize outbound operations (not illustrated in the business task model) to handle outgoing messages associated with a modification or reading of data encapsulated in at least one business object associated with another process component. The outbound operations can be called after the business object associated with a corresponding outbound operation is read or modified by a particular task. The outbound operations may be an asynchronous outbound operation operable to generate an asynchronous message for receipt by an asynchronous inbound operation defined by an external process component. Additionally, in some variations, outbound operations can send messages after they are called. The process agents included and modeled within a particular process component can comprise inbound process agents, outbound process agents, or a combination of both. The inbound process agents can characterize inbound operations to handle incoming messages from one or more interfaces associated with the particular process component. The outbound process agents can characterize outbound operations to transmit outgoing messages to an external process component.

Generally, a task is a request at runtime to perform an elementary activity. To operate properly, each task can be identified by an appropriate task type at design-time in the modeling environment 116 associated with a particular business task model 412. A standard task is created or used when a business object enters a certain state that requires user interaction or triggers some type of user notification. In the business task model 402, a standard task is generally connected to a related task agent. In some implementations, a 1:1 relationship between task agents and standard tasks may exist.

An escalation task is created or used for instances where a standard task fails to complete in a timely manner or within a predefined set of conditions. In other words, the escalation task can escalate a standard task when the standard task fails to operate or complete properly. The effect of the escalation task may be to send notification messages to relevant users notifying them of the standard task's failure, or the escalation task may perform some other automated task to be used when the standard task fails. In the business task model 412, each escalation task is connected to the task it monitors and is used to escalate.

The inbound error handling task is a business task that is created if an error occurs during inbound processing (i.e., during message exchanges in a message-based system, or during navigation from one interface to another). Specifically, the inbound error handling task is used when, during inbound process agent processing for a particular interface, a certain error or error symptom occurs which requires particular user interaction. When modeling an inbound error handling task, the task should be connected to one or more interfaces in a particular process component. Particularly, the task can be connected to the interface that contains the message which contains information on the cause of the error. In some instances, assignment of a particular inbound error handling task to more than one interface that resides in a different process component is not permitted. If the inbound error handling task is needed for multiple interfaces in different process components, a copy of the particular inbound error handling task (but not the same instance thereof) may be included in each process component. This restriction may be needed in certain physical modeling environments. For example, in an inbound error case the business object that normally would be triggered by the inbound agent is not involved. Thus, the error information is captured in a generic task error business object. A generic task agent triggers the inbound error task. In some instances, such as those illustrated in FIGS. 7A-7D, generic objects may not be included in the business task models due to the redundancy of the generic task agent. Instead, generic task agents are implicitly available for inbound error handling task.

In addition to the tasks which are provided to a user, systems tasks are also available. System tasks allow for the ability to decouple automation of system reactions to certain triggers. This information can be used, for example, for extensibility. In one instance, due to the decoupling, a partner or customer can create new tasks, as well as an implementation of an action that needs to be performed in order to complete the created task. To do so, a customer can create an extension model with the same layout as those business task models of FIG. 7A-C. Differentiation of system tasks from other task types can be provided by the attribute definitions of the system task.

To emphasize ease of understanding and use of the business task model 412, consistent naming conventions can be applied to the different task types. For instance, standard business task names may typically start with a verb in imperative form to indicate clearly the operations and usages associated with the task, which follows the name of the particular business object being acted upon or related to the task. Some exceptions to the normal naming conventions may exist. For example, notifications and some alerts may be named using a verb in passive form after the name of the related business object. However, any task may be named differently when the standard naming conventions make the task name uninformative, misleading, or unwieldy. The following table includes examples for the names of several standard tasks based upon common task usages and categories. Exceptions to each of the conventions are not only possible, but may be common in particular implementations.

| Usage Pattern/Category | Naming Convention | Example |
|---|---|---|
| Business Task: Approval | Approve <BO> | "Approve Internal Request" |
| | Revise <BO> | "Approve Internal Request Revision" |
| | | "Revise Internal Request" |
| Business Task: Generally (except for inbound error handling) | <Verb> <BO> | "Review Compensation Agreement" |
| | Resolve <BO> Error | "Resolve Compensation Agreement Error" |
| | Correct <BO> | "Correct Compensation Agreement" |
| Business Task: Completion | Complete <BO> | "Complete Purchase Order" |
| Business Task: Notification | <BO>* | "Internal Request Approved" |
| | * = Notification dependent | "Internal Request Rejected" |
| | | "Internal Request Not Cancelled" |
| | | "Internal Request Quantity Deviation" |
| Business Task: Alert | * | "Bidder is not a vendor" |
| | * = Alert dependent | |

The typical naming convention for exception tasks can be the name of the task the escalation task is related to, combined with the reason for the task's escalation. For instance, if the related task's name is "Complete Employee Compensation Agreement," and the reason for escalation is that the completion process is overdue, then the name of the escalation task may be "Complete Employee Compensation Agreement—Overdue." Alternative naming conventions can be used where appropriate.

For inbound error handling tasks, a typical naming convention of "Solve <Error Symptom Group> in <Message Type>" may be used when applicable. Error symptom groups can be defined in the architecture for an application, and may include, for instance, the error symptom groups of "Lock Issue," "Configuration Inconsistency," "Business Object Inconsistency," or "Error." Some example inbound error handling task names may include "Solve Error in Supplier Invoice Notification" and "Solve Lock Issue in Project Task Confirmation." The Message Type for a particular error may represent the message received via the interface associated with the inbound error handling task. Similar to the naming conventions for both standard tasks and escalation tasks, the example naming convention can be modified when using the standard naming convention would cause confusion or be unclear.

Still further, each task may be associated with a definition guideline that provides a succinct and understandable explanation of the operations of or purpose for a particular task. These definition guidelines can be added as attributes that are stored in memory 105 and associated with each of the particular tasks created or defined in a particular business task model 412. In general, definition guidelines may be represented by a single sentence or set of sentences defining the task. Each task type may be associated with a standard sentence. The following are examples of the definition guidelines for the various task types:

Standard Tasks—Generally: "A request to <the operation of the task>."

Escalation Tasks: "An escalation of a request to <repeat text from corresponding business task definition>."

Standard Task—Alert: "An alert to <reason for alert>."

Standard Task—Notification: "A notification that <what is being notified>."

Inbound Error Handling Task: "A request to solve a(n) <Error Symptom Group> in the <related interface> inbound service interface of <process component name>."

Each task added to a business task model may include additional attributes further defining the task. Some example attributes for a particular task include Usage Type, Task Category, Access Context, Error Description, Event Business Object (the business object that triggers the task's creation due to a certain state of the business object), and Reference Business Object (the business object a task references—generally the business object an end user will work on after clicking on or working though the task, or the business object that will be modified when the task represents an automatic process), among others. These attributes allow developers to further define the tasks included in the business task model 412 and to allow business users to better understand the various tasks associated with a particular application 124.

In general, a task agent (as shown in FIG. 7A) is a piece of software used for sending tasks to their responsibilities. In other words, a particular task agent defines whether a task has to be created. Each task agent associated with a standard business task listens to or is associated with exactly one business object. For ease in identifying the proper correlation between a task agent and its related task, the task agent can generally be named identically to the task it triggers or is used to create. For instance, the task agent associated with the task "Approve Supplier Quote" can also be named "Approve Supplier Quote." This clear connection allows users to quickly and easily understand the relationships between tasks and their agents.

Each task agent can be defined with a set of conditions that specify when the task agent will create or trigger its related task. For example, the following conditions can be set for a task agent associated with the standard business task named "Approve Purchase Order":

Relevance Condition: Always relevant
Start Condition: Purchase Order is "in approval"
Cancel Condition: Purchase Order is "withdrawn from approval"
Change Condition: Never change
Completion Condition: Purchase Order is "approved," "rejected," or "in revision."

Interpreting the conditions for the Approve Purchase Order task agent, the Approve Purchase Order task agent will always be active ("always relevant") and the Approve Purchase Order task will be started (or triggered) when the Purchase Order business object's attributes define it as "in approval." If the Purchase Order business object attributes are modified to indicate that it has been "withdrawn from approval," the task agent will cancel the Approve Purchase Order task. When the Purchase Order business object's attributes are defined as "approved," "rejected," or "in revision," the Approve Purchase Order task agent can complete the Approve Purchase Order task.

A second example related to the Purchase Order business object is the notification task "Missed Purchase Order Delivery." A Missed Purchase Order Delivery task agent can be associated with the following conditions:

Relevance Condition: Always relevant
Start Condition: Purchase Order has at least one ordered Item which is not delivered in time. Additionally the Purchase Order is not marked as finally delivered.
Cancel Condition: Never cancel
Change Condition: Never change
Completion Condition: Never complete.

The Missed Purchase Order Delivery task agent is thus always active, and is started when two conditions are satisfied: (1) an ordered item associated with the Purchase Order business object has not been delivered by a predefined deadline, and (2) the Purchase Order is not marked as finally delivered. When both conditions are satisfied, the task agent can trigger (or start) the Missed Purchase Order Delivery task to present a notification to the user responsible for a particular purchase order that at least one item has not been delivered in time. Because the Missed Purchase Order Delivery task agent is associated with a notification task, the values for the Cancel Condition, Change Condition, and Completion Condition attributes may be unnecessary, as the notification task may be considered complete upon its triggering.

Similar to the tasks, each task agent can be associated with or have a definition guideline providing a short and precise explanation of what actions or tasks the task agent is responsible for as well as what the actions or tasks do. An example standard definition guideline that can be used uniformly across an organization may be the following sentence (and variations thereupon): "A task agent that creates <a request/a notification/an escalation/an alert/etc.> that <repeat definition of the corresponding task>." An example for the Approve Supplier Quote task agent would be as follows: "A task agent that create a request to approve a supplier quote." An example for the Check Purchasing Contract Approval—Overdue task agent could be as follows: "A task agent that creates an escalation of a request to approve a purchasing contract that was not approved on time." A Value Based Evaluation Critical Result task agent may be defined as "[a] task agent that creates an alert to indicate that a result of a value-based evaluation is critical." Another example is for an Internal Request Approval Rejected task agent, defined as "[a] task agent that creates a notification that the relates of an internal request has been rejected."

Returning to the flowchart of FIG. 6A, process 600 illustrates the creation and/or modification of a business task model. At 603, a process component associated with the business task model is selected. In some instances, a list of predefined or developed process components associated with application 124 or available in the modeling environment 116 may be provided to a developer or business user via GUI 142. In some of those instances, one or more of the predefined process components may be associated with a previously defined business task model. Upon selection of the process component via the GUI 142, the business task model associated with the process component may be presented to the user or developer at GUI 142. Where the process component has not been associated with a previously defined business task model, an empty or blank business task model may be presented to the developer upon selection of the process component. Process 600 can be used either when creating a new business task model or when modifying a preexisting task model for a particular process component. However, for ease of understanding, the situation of creating a new business task model for a particular process component is described herein. Therefore, in the embodiment described for FIG. 6A, a new and empty business task model is presented to the developer when the process component is selected at 603.

At 606, a triggering entity is identified. Depending on the types of tasks to be modeled, the triggering entity may be either an interface or a business object. Business task models may include multiple triggering entities associated with a plurality of tasks for a particular process component. For instance, FIG. 7A shows that the generic process component includes both an interface and a business object as triggering entities. Once a particular entity to be used as a triggering entity is identified, that entity can be added to the business task model using the modeling tool 140 or another appropriate method.

At 609, a task type associated with the triggering entity is defined, as well as the actual task associated with the defined task type. As described above, a number of task types are available for inclusion in the business task model. For instance, the developer may select a standard business task, an escalation task, or a inbound error handling task as the task type to be included in the business task model. In some instances, defining the new task type may include selecting the task type from a menu or other UI element associated with the modeling tool 140 in modeling environment 116. For example, a new task type can be added to the model by selecting (i.e., using drag-and-drop from a menu provided in the modeling environment 116) a visual representation of the desired task type into the business task model. In those instances, each task type can be visually defined by a particular graphical image included within the visual task type element. For instance, a standard business task can be illustrated as business task 740 in FIG. 7A (represented by a clipboard in the top-right corner of the UI element). An alert task can be identified as alert task 748 in FIG. 7A (represented by a crooked arrow in the top-right corner of the UI element). A notification task can be identified as notification task 752 in FIG. 7A (represented by the dialog image in the top-right corner of the UI element). An escalation task can be identified as escalation task 744 (represented by an exclamation point in the top-right corner of the UI element). An inbound error handling task can be identified as a normal business task, but can be identified by its link or connection to an interface in the process component. Generally, the inbound error handling task will present a notification to the user, and thus will use a notation or indication similar to that of the notification task 752. However, the inbound error handling task may also perform similar to a standard business task or alert task. In FIG. 7A, the inbound error handling task is a business task 720 associated with the interface and visually represented by the dialog image in the top-right corner of its UI element.

In some instances, the available task types may be determined based upon the triggering entities previously identified in the business task model. For instance, if only a business object has been identified as the triggering entity, then the developer may only be provided with the options of defining either a standard business task or an escalation task. Additionally, if no standard business tasks have been defined in the business task model, the developer may only be allowed to define a standard business task, as escalation tasks are generally not allowed without an available connection to a previously-defined standard task. Alternatively, if the developer defines a task type that is not supported yet by the business task model (i.e., an inbound error handling task type without an interface defined as a triggering entity, a standard business task without a business object defined as a triggering entity, or an escalation task without having defined a standard business task to escalate), the modeling tool 140 may automatically request or require the developer to create, define, or identify the prerequisite entities prior to defining the unsupported task type. Once the prerequisite entities have been defined (i.e., through the various steps of process 600), the developer can continue with defining and creating the desired task type.

Once a particular task type has been selected to be defined, the developer can provide a set of relevant attributes for the newly defined task type (e.g., the name of the newly defined task, as well as its operations). These attributes can be used to define the task and the operations performed by the task, including the one or more business objects that are affected, modified, or referenced by the task during its operations. In some instances, the developer can define a subset of the attributes associated with the task, such as its general operation, and the modeling tool 140, a task definition wizard, or another appropriate application, program, or sub-module associated with the modeling environment 116 can complete and/or determine the remaining attributes. Determining the remaining attributes may be done automatically by the particular application or tool by using one or more queries based on the information for the subset of attributes defined by the developer to find and insert the relevant attributes for the defined task type. In some instances, default values for the additional attributes may be set, while in other instances, specific values may be determined after the queries. In general, the more attributes of the task type that can be defined automatically by the modeling tool 140, the easier the development of the business task model can become for business (and other non-technical) users and developers.

Once the task type and the attributes (including the operations) of the specific task associated with the selected task type are defined, process 600 continues to 612. At 612, a task agent associated with the task modeled at 609 is defined. In some instances, the task agent can be added to the business task model by selecting a visual representation of the task agent from a menu or dropdown box provided to the developer via the GUI 142. In other instances, when a task type and task are defined that require or can be associated with a task agent, an appropriate task agent can be created and modeled when the task type and task are defined at 609. In some instances, the task agent can be added to the model in conjunction with the addition of the task to the model, while in other instances, the task agent may be added to the business task model after the attributes for the task have been defined. In still other instances, the task agent may be defined prior to defining the task type and task. As shown in FIG. 7A, business task 740, alert task 748, and notification task 752 are all associated with a related task agent 728, 732, and 736, respectively. As described earlier, the task agents will generally have names identical to their associated tasks.

In addition to simply adding the task agent to the business task model, defining the task agent at 612 can include defining a set of attributes and parameters associated with the task agent. As described above, those attributes may include a relevance condition (determining when the related task will be relevant to the process component), a start or creation condition (determining the event or timing for when the related task is triggered, started, and/or created), a change condition (determining the event or timing of when the related task should be changed or modified), a cancellation condition (determining the event or timing of when the related task should be cancelled, such as one or more parameters of the business object that may render the task moot), and a completion condition (determining the event or timing of when the related task is complete), among others. In some instances, all or a portion of the attributes can be defined by the developer when modeling the business task model. In other instances, the task agent attributes can be automatically generated by information stored in memory 105 of FIG. 1, as well as based on information defined for the related task types and task associated with the task agent. In still other instances, certain attributes that are not provided by the developer during the definition of the task agent can be defined using predefined default values (e.g., for the attribute Change Condition, the value of "Never Change" may be used), or in other instances, the attributes may be left empty when those attributes are optional or unnecessary for the task agent.

As a note, some tasks and task types may not require the definition of a related task agent at 712. For instance, an escalation task can be triggered directly from the operations of a standard business task, notification task, or alert task, and can be triggered based on properties associated with the related task, such as the failure of a business task to complete in accordance with the business task's attribute defining the required completion time. In those instances, there may be no need for a triggering task agent, as the escalation task can be triggered or started based on some failure or error occurring with regard to the related task. Additionally, an inbound error handling task may not need a task agent either, as the inbound error handling task can be triggered upon activation or use of the task's associated interface in the process component. While the inbound error handling task does not model its task agent, in some instances a generic task agent associated with all interfaces may be used for each inbound error handling task. Because a generic task agent may be used for each inbound error handling task, the generic task agent may not be modeled in the business task model described herein, although in some implementations, the business task model may show the generic task agent.

Once the tasks and task agents have been defined in 609 and 612, respectively, connections between the various entities in the business task model can be defined. Those connections can be modeled by a developer using the modeling tool 140 to connect the various components in order to create an understandable and working business task model. For example, a particular triggering entity (i.e., a particular business object or interface) can be connected to a task agent or a task type, such that the business task model defines the interactions between the various entities. For example, for standard task types and tasks, a connection from the triggering business object should be directed to the task agent defined in 612, and from that task agent to the appropriate task defined in 609. For escalation tasks, a connection can be defined between the escalation task and the task type that the escalation task that is used to escalate. In some instances, an escalation task can be connected to a standard business task, while in other, the escalation task may be connected to an inbound error handling task, depending on the attributes and purpose of the escalation task. For inbound error handling tasks, connections can be defined between the triggering interface of the process component and the inbound error handling task, as well as between the triggering interface, an inbound process agent, and a particular business object operated on or related to the interface. These connections can clearly explain how particular interfaces and business objects interact with their associated task agents and tasks in a particular process component. Additionally, modifications to the connections (as well as the individual elements) illustrated in the business task model can be easily made using the modeling tool 140 to add, remove, or change interactions between the entities illustrated in the business task model. In some instances, the connections between the various elements of the business task model can be generated automatically. For example, the attributes used to define each task and task agent may include information defining the appropriate triggering entity for each task and the task agent associated with each task. Using this information, the connections can be automatically generated once each of the elements needed for a particular connection has been defined. In some instances, partial connections can be added when only a portion of the elements needed for a complete connection have been defined. For instance, if a triggering entity has been identified and a task agent has been defined, the connection between the triggering entity and the task agent may be made before the associated task is also defined.

Once the connections for a particular task have been modeled, process 600 continues at 618 and determines whether additional entities are to be defined for the business task model of the process component. If process 600 determines that additional entities are to be added to the business task model, then process 600 can return to 606, where the triggering entity for the new task to be defined is identified. However, if process 600 determines that no additional tasks are to be defined for the process component, at 621 the business task model is stored in memory 105 along with the other previously defined models 104. While described in a particular order, process 600 may be performed in any appropriate order, including defining a task agent prior to defining a task, as well as defining either the task agent or task prior to identifying the triggering entity.

Figure 7B:
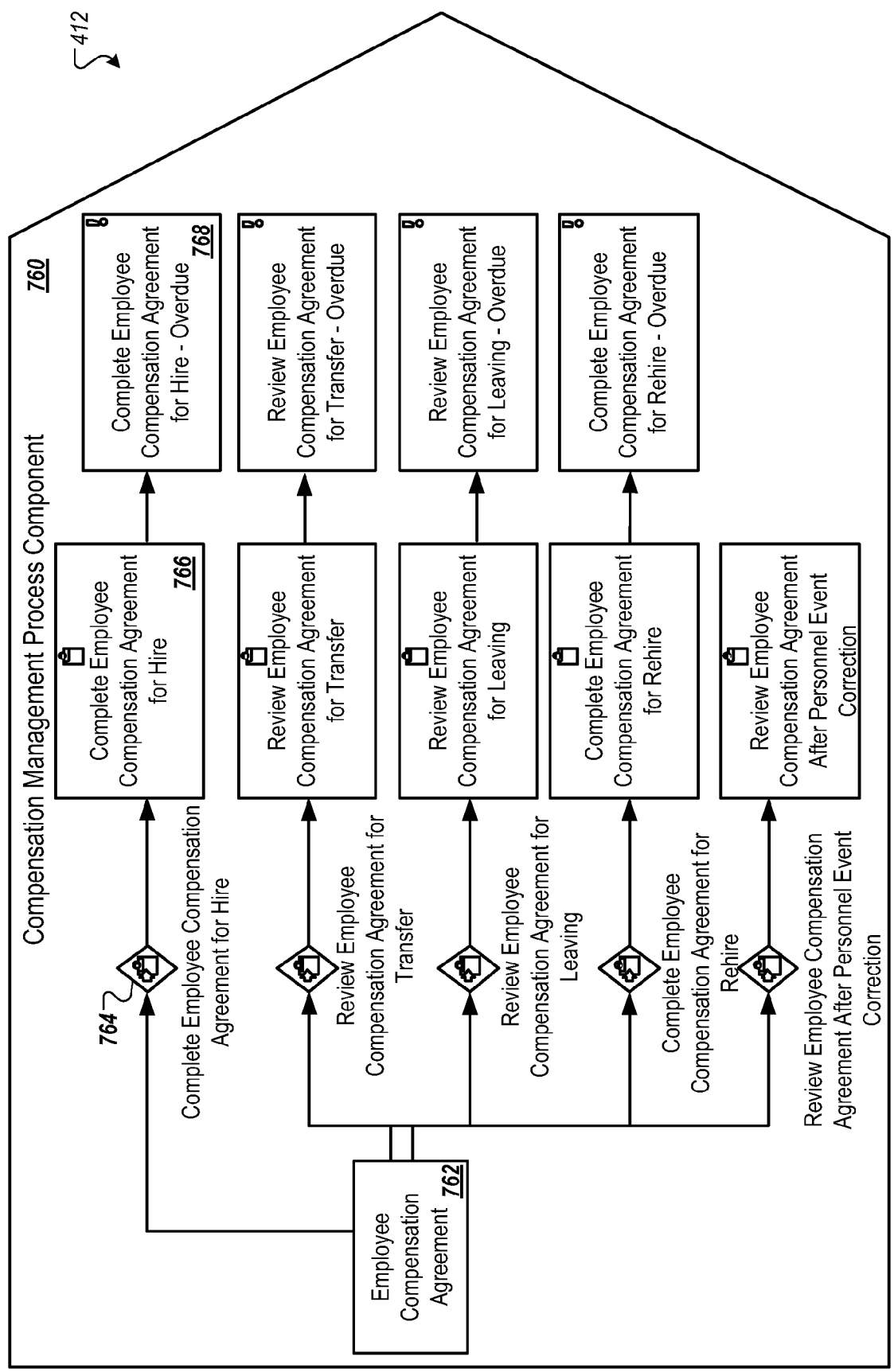

FIG. 7B is an example of a business task model created and/or modified using process 600 of FIG. 6A. In FIG. 7B, the Compensation Management process component 760 was selected by the developer at 603 as the process component for which to define a new or modify an existing business task model 412. At 606, the developer identified the Employee Compensation Agreement business object 762 as the triggering entity for a first task type and task. Having selected the Employee Compensation Agreement business object 762, the Complete Employee Compensation Agreement for Hire business task 766 was defined. The Complete Employee Compensation Agreement for Hire task agent 764 was then defined at 612, along with the various attributes defining when and how the Complete Employee Compensation Agreement for Hire task 766 is to be started, cancelled, and completed, as well as other attributes associated with the task agent. Thus, when the Employee Compensation Agreement business object 762 is in a state matching the start condition for task 766, then task 766 is triggered by the task agent 764. When the Employee Compensation Agreement business object's 762 state is such that the requirements for completing the task 766 are met, the task agent 764 will complete the task 766. At 615, the connections between the Employee Compensation Agreement 762 and the Complete Employee Compensation Agreement for Hire task agent 764, and the Complete Employee Compensation Agreement for Hire task agent 764 and the Complete Employee Compensation Agreement for Hire task 766 were defined. At step 618, the developer determined that additional tasks should be added to the business task model 412 for the Compensation Management process component 760.

For the second iteration of process 600, the developer identified the Complete Employee Compensation Agreement for Hire business task 766 as the triggering entity. The task type defined at 606 was an escalation task, and the Complete Employee Compensation Agreement for Hire—Overdue escalation task 768 was defined. The attributes defined by the escalation task 768 include a start condition of the Complete Employee Compensation Agreement for Hire task 766 failing to complete by a particular time defined either in the attributes of the business task 766 or the escalation task 768. Because the Complete Employee Compensation Agreement for Hire—Overdue escalation task 768 is triggered by the Complete Employee Compensation Agreement for Hire business task 766, and not a task agent, box 612 of process 600 was skipped, and the connection between the escalation task 768 and business task 766 was defined at 615. As shown by the elements in FIG. 7B, boxes 606 through 615 of process 600 were performed several times to complete the modeling and creation of the business task model 412 for the Compensation Management process component 760.

Figure 7C:
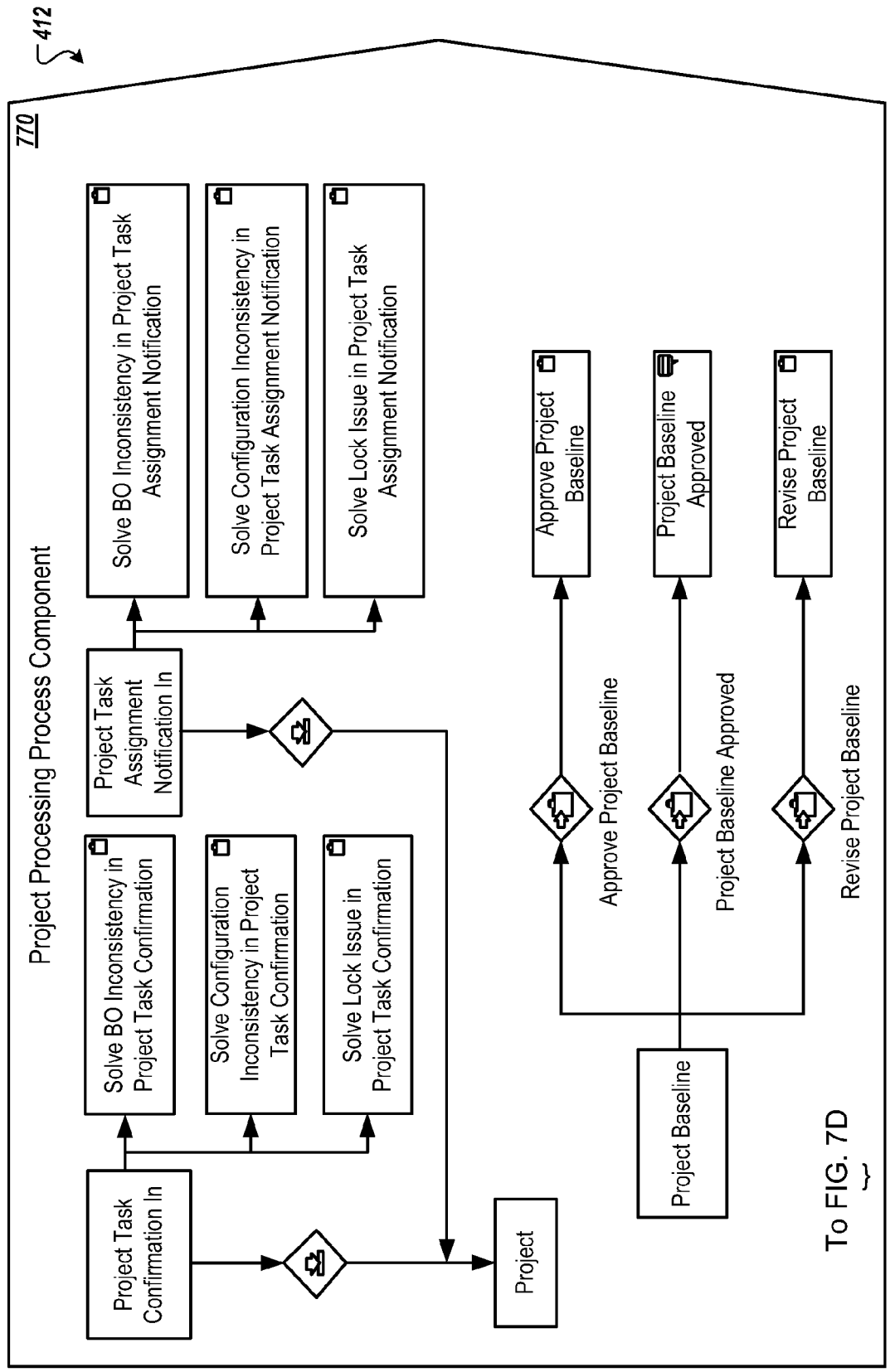
Figure 7D:
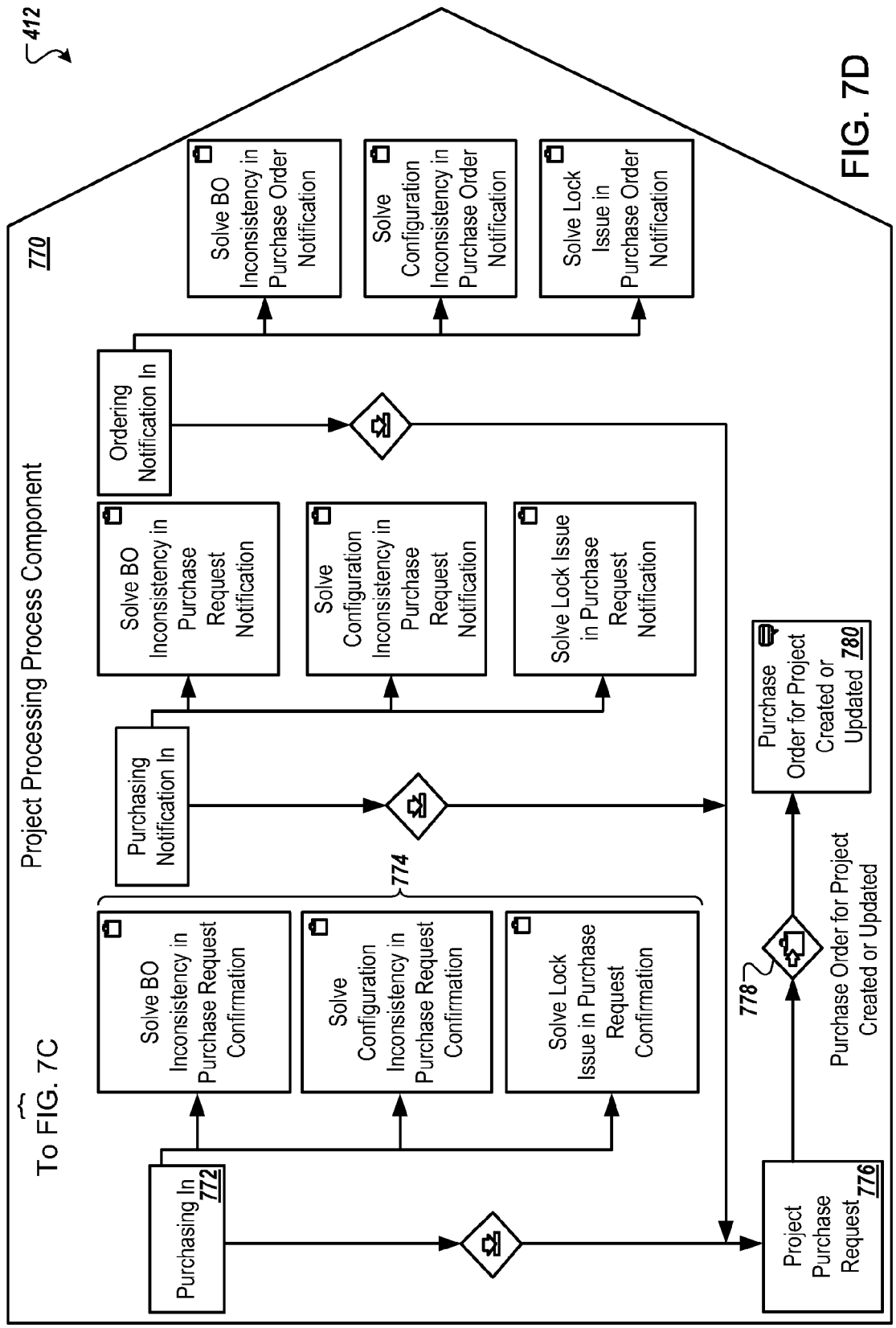

FIGS. 7C and 7D is a second example of a business task model created by process 600. While the business task model of FIG. 7B included only one triggering business object and no triggering interfaces, the business task model 412 of FIGS. 7C and 7D for the Project Processing process component 770 includes three (3) triggering business objects and five (5) triggering interfaces. As illustrated, the Purchasing In interface 772 has been associated with three (3) inbound error handling tasks 774 (Solve BO Inconsistency in Purchase Request Confirmation, Solve Configuration Inconsistency in Purchase Request Confirmation, and Solve Lock Issue in Purchase Request Confirmation), while the interface has also been connected to the Project Purchase Request business object 776. Further, the Project Purchase Request business object 776 is connected to a Purchase Order for Project Created or Updated task agent 778 which can be used to trigger the Purchase Order for Project Created or Updated notification task 780. The business task model 412 for the Project Processing process component 770 illustrates that a plurality of different triggering entities can be defined for a particular business task model. Further, FIG. 7B illustrates that two or more interfaces may be associated with a single business object in a business task model.

Figure 6B:
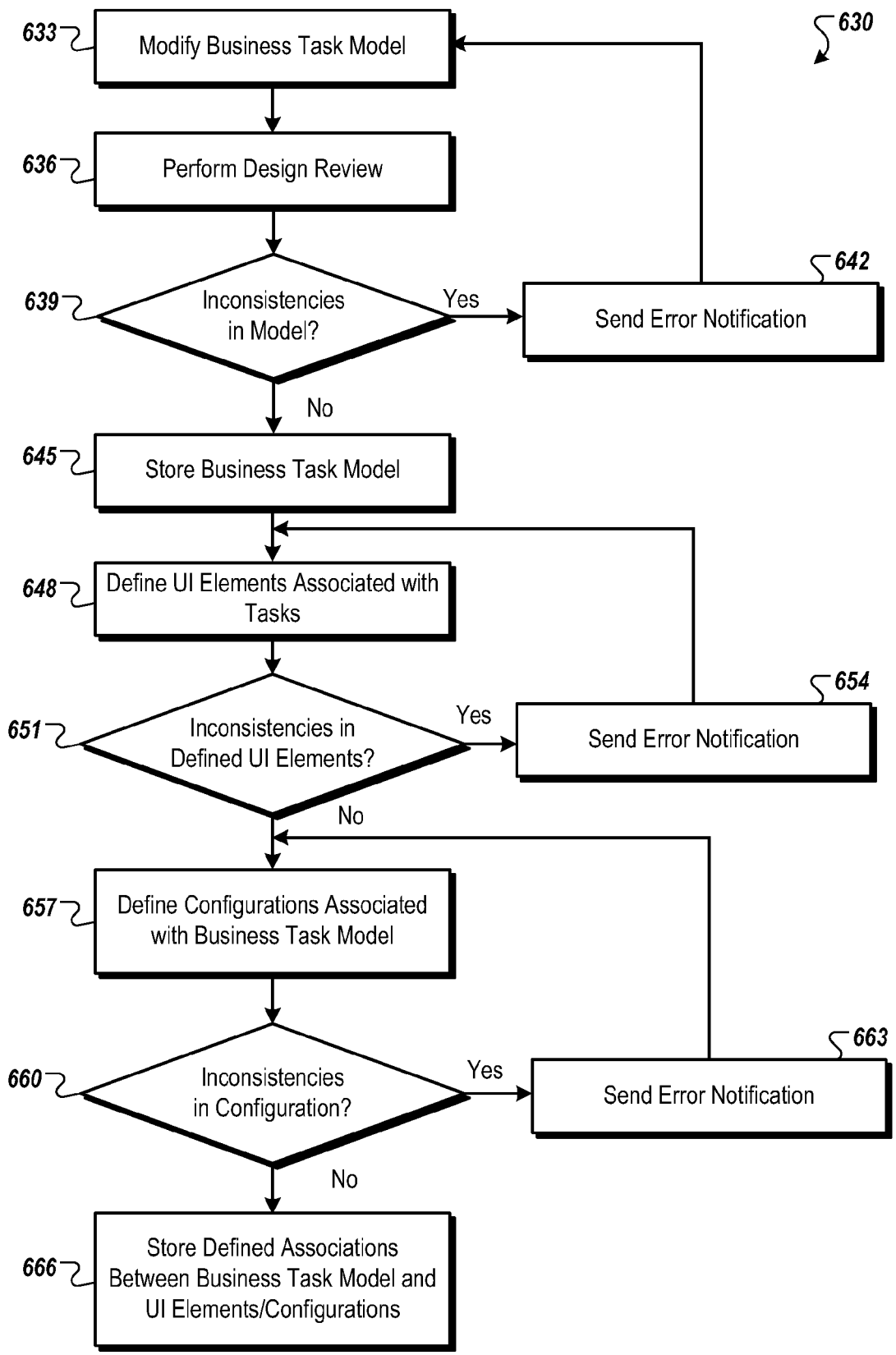
FIG. 6B is a flowchart illustrating an example method for integrating a business task model generated in accordance FIG. 6A into a UI modeling landscape illustrated in FIG. 4A.

Turning to FIG. 6B, process 630 for creating and/or modifying a business task model, reviewing the model, and integrating the business task model with other models generated in the UI modeling landscape 400 is illustrated. In some instances, boxes 633 through 645 may represent process 600 (or a variation thereof) as previously illustrated in FIG. 6A. At 633, a business task model is modified, or in some cases, created. Once the creation or modification of the model is complete, a review of the business task model design may be performed at step 636. The review may comprise a manual investigation of the various triggering entities, task agents, tasks, and connections defined in the business task model by process 600, while in other instances, the review may comprise an automated review of the business task model using the modeling tool 140 or other suitable software. The design review may comprise comparisons of an updated or modified business task model to a previous iteration of the model, a check of the business logic defined by the connections between the elements, as well as a review of the various attributes applied to both the task agents and tasks defined in the model. Additionally, the design review can comprise an integrity check of the business task model, including whether a particular interface is used in more than one process component already (which is generally not allowed), or whether the attributes defined for a particular task agent and/or task can coexist and are not inconsistent. In still other instances, the design review may include using a non-production implementation of the process component, including the defined tasks as modeled, in a design-time system to test whether the operations of the process component match the operations intended when creating and/or modifying the business task model.

At 639, process 630 determines whether the design review of the business task model revealed or identified any inconsistencies or errors in the business task model. If one or more inconsistencies are identified, those inconsistencies can be included in a error or inconsistency notification that can be sent to the one or more individuals or systems associated with the business task model development at 642. In some instances, the error notifications can be immediately provided to the developer via GUI 142 so that immediate action can be taken to repair or correct the errors within the business task model without delaying further implementation or development. In other instances, the error notification can be sent in a batch with one or more other error notifications at predefined intervals.

After the error notification is sent, process 630 returns to 633 where modifications to the business task model can be made. If it is determined that no inconsistencies or other errors are present in the business task model, then process 630 continues at 645, where the modified business task model is stored. The business task model can be stored in memory 105 with the other models 104 (as shown in FIG. 1). Further, information about the business task model (i.e., the defined tasks, the defined task agents, interfaces, business objects, and relevant process component, as well as the attributes of and the connections between each of the different entities, etc.) can be exported or saved to a backend system or repository appropriate for storing such information. By doing so, information about a particular business task model and/or any of the elements contained therein can be accessed and read (for instance, by modeling tool 140 or application 124) using an API defined to communicate with the backend system where the information is stored. In some instances, the backend system or repository storing the information on each of the business task models may be included within server 108 (such as with models 104 or the process content directory 106), while in other instances, the backend system or repository may be located remote from the server 108 at another location communicably coupled to the network 112.

At 648, one or more tasks from the business task model stored at 645 can be associated with one or more components (i.e., a work center view, floor plan, etc.) in a particular UI integration model 408 (as illustrated in FIG. 4F). The developer may add one or more tasks modeled in the business task model to the UI integration model 408, allowing particular components and interfaces to interact with the tasks. Alternatively, certain tasks from the business task model can be automatically integrated into one or more UI integration models 408 based on the defined attributes and connections in the business task model. Returning to FIG. 4F, the Correct Faulty Invoice Request task 446 has been integrated into the UI integration model 408. In some instances, the developer may manually add the business object affected by the added task to the integration model 408, while in other instances, the attributes of a particular task may define which business objects will be affected, modified, or associated with the task. In those instances, the addition of a particular task (in FIG. 4F, the Correct Faulty Invoice Request task 446) will automatically insert the associated business object, as well as a connection from the task to the business object associated with the task, into the UI integration model 408 (in FIG. 4F, the Customer Invoice Request business object 448). In some instances, a particular business object can be added to the UI integration model 408 based on the addition of a particular task using an API operable to access and read information associated with the business task model (wherever that information is stored, such as with the models 104 of FIG. 1, in a backend repository storing business task model data that is communicably coupled to server 108, or in any other appropriate storage location associated with the information defined in the business task model) to access the attributes associated with and/or defining a particular task. In this case, the attributes of the Correct Faulty Invoice Request task 446 may specify that the task 446 is related to or operates upon the Customer Invoice Request business object 448. In those instances, the Customer Invoice Request business object 448 can be added to the UI integration model 408 automatically. In an alternative implementation, when defining the Correct Faulty Invoice Request task 446 in process 600, the task 446 may be associated with one or more components via the attributes defined for the task, or through its connection to a particular interface in the business task model (such as the Due List OWL work center view 440 illustrated in FIG. 4F). In those instances, both the task and business object related to the particular component (in FIG. 4F, Due List OWL work center view 440) may automatically be inserted into and included with the UI integration model 408.

After one or more tasks are associated with one or more components in the UI modeling landscape 400, process 630 determines at 651 whether any inconsistencies are present in those associations. For instance, if a developer manually inserts a task and business object into the UI integration model 408 as described above, process 630 may access the task's attributes and compare those attributes to the modeled connections with the business object and/or the component associated with the task to determine whether those connections are proper and/or allowed. In some instances, this may include a manual review by the developer, while in other instances, the modeling tool 140, application 124, or another automated piece of software or module thereof may automatically review the proposed connections for inconsistencies with the business task model and its defined data. If one or more tasks are added to the UI integration model automatically, the determination for whether inconsistencies exist may be performed based on whether the tasks and business objects added to the UI integration model are appropriate or would cause any internal conflicts within the application 124. If no inconsistencies are identified, process 630 continues on at 657. However, if one or more errors and/or inconsistencies are identified, then an error notification is sent at 654. The error notification may be sent to the developer of the particular components associated with the tasks, the developer of the business task model, or another individual and/or application responsible for or associated with correction of the error/inconsistency. Once the error is sent, process 630 may return to 648 where the associations of one or more tasks to one or more components can be modified and/or corrected.

At 657, process 630 may optionally define one or more configurations in which a particular task associated with a business task model is contained. In some instances, a developer creating a customer-specific version of the application 124 may not require or want each task to be available for a particular process component. In those instances, the developer can specify which tasks are available for a particular configuration. Additionally, specific events or other parameters may occur which render certain tasks associated with the business task model unnecessary or misleading for a particular implementation. In those instances, specific configurations for the business task model can be set (and in some cases, modeled, as referenced by configuration model 414 in the UI modeling landscape 400 of FIG. 4A). Therefore, certain tasks may be unavailable in some cases, and available in others, depending on the needs of the particular customer-specific version of the application 124 and/or based on the events or actions occurring within the application 124. Therefore, at 657 one or more configurations can be defined by the developer and associated with the business task model to describe when and how a particular business task will be available. At 660, process 630 determines whether any inconsistencies with the configurations defined at 657 are identified. The determination can be made in some instances by comparing the attributes of particular tasks to the configuration parameters defined at 657, specifically whether one or more tasks are unavailable (or available) in configurations where they should (or should not) be used by the process component. Again, this determination can be made by a manual review of the configuration parameters in light of the business task model, an automatic process comparing the relevancy attribute of the tasks affected by the configuration parameters, or by any other appropriate steps. If an error or inconsistency is identified, then an error notification can be sent at 663. The notification can be sent to the developer of the business task model, the developer of the particular configuration where an error is identified, to application 124 or another appropriate software module, or to any other appropriate recipients. In addition to the error notification being sent, process 630 can return to 657 to allow for correction of, modifications to, or removal of the offending configurations. Alternatively, changes to the business task model may be made to allow a particular configuration to be allowed and/or error-free. If no errors or inconsistencies are located, process 630 can continue at 666.

At 666, the associations of the business task model with one or more components as well as with one or more configuration sets and parameters can be stored in memory 105 to allow for later uses of the associations during the runtime of the application 124. In some instances, the defined associations can be stored in memory 105, either with models 104, the process content directory 106, or another appropriate repository. Additionally, the defined associations can be stored elsewhere in server 108, or in some instances, external to but communicably coupled to server 108. Specifically, the defined associations can be used to create additional models, such as the UI integration model 408 or the configuration models 414. In some instances, the information defining which tasks are available in a particular configuration can be used to create a process flow model. For example (and as described in relation to 657 of process 630), tasks may be defined to be available for certain implementations of customer-specific solutions based on the application 124, as well as for certain events that may occur during operations of the application 124. The tasks for a particular process component can be activated based on certain events or for certain users/solutions. Using the information defining which tasks are available in certain situations or for certain solutions, tasks defined in the business task model can be integrated into one or more process flow models that can provide users the ability to review process flows for the various configured situations and/or solutions, along with the tasks that are performed or available during that process flow.

The subject matter has been described in terms of particular variations, but other variations can be implemented and are within the scope of the following claims. For example, the actions described herein can be performed in a different order than as described and still achieve desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

What is claimed is:

1. A computer-accessible, non-transitory, storage medium encoded with computer-readable instructions configured to cause one or more data processing apparatus to:

identify at least one user interface (UI) component associated with a particular work center, wherein the particular work center is a collection of UI components, and wherein particular UI components of the collection of UI components are available to a user for the particular business area based on the user's role or authorized level of access associated with the particular business area;

collect modeling information from the at least one identified UI component associated with the particular work center associated with a particular business area;
integrate the collected modeling information into a UI integration model associated with the work center; and
store the UI integration model associated with the particular work center.

2. The medium of claim 1, wherein the particular work center is associated with a corresponding work center model illustrating the UI layout for the particular work center.

3. The medium of claim 2, wherein the UI layout for the particular work center comprises at least a portion of the at least one identified UI component associated with the particular work center.

4. The medium of claim 3, wherein the at least one UI component associated with the particular work center comprises one or more UI elements associated with the work center.

5. The medium of claim 4, wherein the one or more UI elements associated with the work center comprise at least one of a work center view or a floor plan.

6. The medium of claim 3, wherein identifying the at least one UI component associated with a particular work center comprises analyzing the work center model corresponding with the particular work center for the at least one UI component associated included within the UI layout.

7. The medium of claim 1 further operable when executed to present the UI integration model to a user via an interface from storage.

8. The medium of claim 7 further operable when executed to:
receive a navigational request from a user, the navigational request comprising one of the following:
a navigational request from a UI map model to a work center model;
a navigational request from a work center model to a UI navigation model;
a navigational request from a work center model to the UI integration model;
a navigational request from a UI navigation model to the UI integration model; or
a navigational request from the UI integration model to a business object model, a business task model, or a configuration model;
a navigational request from a work center, work center view, or floor plan to an associated process flow model or scenario flow model; or
a navigational request from a process flow model or a scenario flow model to a work center mode
a navigational request from a work center view model to a floor plan model;
a navigational request from a work center model to a work center view model; and
a navigational request from a floor plan model to a second floor plan model; and
process the navigational request to perform the requested navigation via the interface.

9. The medium of claim 1 further operable when executed to:
export at least a portion of the UI integration model associated with the particular work center to a documentation system; and
generate one or more support documents associated with the UI integration model based at least in part on the exported portion of the UI integration model.

10. The medium of claim 1, wherein at least one particular UI component of the at least one UI component associated with the particular work center is associated with a model defining one or more attributes of the at least one particular UI component.

11. The medium of claim 1, wherein the identified component associated with a particular work center comprises a business area.

12. The medium of claim 1, wherein the UI model associated with the work center comprises a model of a UI map illustrating at least one business area, the work center, and at least one additional work center associated with the business area.

13. The medium of claim 4, wherein at least one of the UI elements associated with the work center is associated with at least one business task, wherein the at least one business task is defined by a business task model representing one or more triggering entities and tasks associated with a particular process component, and the at least one business task performs operations on a particular business object.

14. The medium of claim 13 further operable when executed to integrate the at least one business task into the UI integration model associated with the particular work center, wherein integrating the at least one business task comprises adding one or more UI components representing the at least one business task and the particular business object associated with the at least one business task into the UI integration model associated with the particular work center.

15. The medium of claim 14 further operable when executed to integrate at least a portion of the UI integration model with a defined process flow model to create an enhanced process flow model, wherein the process flow model comprises one or more process steps associated with a particular business object and process component, and further wherein each of the one or more process steps is associated with a particular business task integrated with the UI integration model.

16. The medium of claim 15, wherein each of the one or more process steps is further associated with one or more tasks associated with the particular business object.

17. The medium of claim 15, wherein integrating at least a portion of the UI integration model with the defined process flow model comprises modeling one or more connections from the one or more the process steps associated with the particular process component to the at least one business task integrated into the UI integration model.

18. The medium of claim 17 further operable when executed to display, for a particular business object within a process flow model, each work center associated with the particular business object, including one or more work center views and floor plans associated with each work center.

19. The medium of claim 17 further operable when executed to integrate at least one enhanced process flow model into a defined scenario flow model to create an enhanced scenario flow model, wherein the scenario flow model models the connections between one or more process components used to perform a particular business activity, including at least a portion of the process flow models associated with the one or more process components, and further wherein at least one of the one or more of the process flow models in the scenario flow model is replaced by the corresponding enhanced process flow model.

20. The medium of claim 5, wherein each of the at least one work center view or floor plan is associated with at least one business object or controller object.

21. The medium of claim 20, wherein the at least one controller object is associated with at least one business object.

22. The medium of claim 20, wherein the at least one floor plan is assigned one or more services bound to the at least one associated business object or controller object.

23. The medium of claim 22, wherein the at least one service allows the floor plan to read or modify the attributes of the at least one associated business object or controller object.

24. The medium of claim 20, wherein the at least one controller object is associated with at least one service, the at least one service associated with at least one business object associated with the at least one controller object.

25. The medium of claim 20, wherein at least one work center view or floor plan is associated with a configuration control, the configuration control determining whether the work center view or floor plan is activated based on one or more events associated with the work center.

* * * * *